(12) United States Patent
Kimura

(10) Patent No.: US 7,564,764 B2
(45) Date of Patent: Jul. 21, 2009

(54) OPTICAL ELEMENT, OPTICAL PICKUP DEVICE AND OPTICAL INFORMATION RECORDING AND REPRODUCING APPARATUS

(75) Inventor: Tohru Kimura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 769 days.

(21) Appl. No.: 10/973,246

(22) Filed: Oct. 27, 2004

(65) Prior Publication Data

US 2005/0094536 A1    May 5, 2005

(30) Foreign Application Priority Data

Oct. 31, 2003    (JP)    ............... 2003-373234

(51) Int. Cl.
*G11B 7/135* (2006.01)
(52) U.S. Cl. .................. 369/112.06; 369/112.23
(58) Field of Classification Search .......... None
See application file for complete search history.

(56) References Cited

U.S. PATENT DOCUMENTS

| | | | |
|---|---|---|---|
| 6,191,889 B1 * | 2/2001 | Maruyama | 359/566 |
| 6,449,095 B1 | 9/2002 | Ohtaki et al. | |
| 6,473,387 B1 * | 10/2002 | Maruyama et al. | 369/112.23 |
| 2003/0185134 A1 * | 10/2003 | Kimura et al. | 369/112.08 |
| 2003/0189886 A1 * | 10/2003 | Sakamoto | 369/112.08 |
| 2004/0022164 A1 * | 2/2004 | Nishioka et al. | 369/112.05 |
| 2004/0036972 A1 | 2/2004 | Kimura et al. | |
| 2004/0085662 A1 * | 5/2004 | Mimori et al. | 359/883 |
| 2004/0109242 A1 * | 6/2004 | Komma et al. | 359/738 |
| 2004/0190426 A1 | 9/2004 | Ikenaka | |

FOREIGN PATENT DOCUMENTS

| | | |
|---|---|---|
| EP | 1 202 259 A2 | 5/2002 |
| EP | 1 313 095 A2 | 5/2003 |
| EP | 1 422 696 A2 | 5/2004 |
| EP | 1 465 170 A2 | 10/2004 |
| JP | 2001-060336 | 3/2001 |
| JP | 2001-093179 | 4/2001 |
| JP | 2002-298422 | 10/2002 |
| WO | WO 02/082437 A1 | 10/2002 |

OTHER PUBLICATIONS

European Search Report.
European Search Report, dated Apr. 17, 2008 for Application No. 07112567.8.

* cited by examiner

*Primary Examiner*—Michael V. Battaglia
(74) *Attorney, Agent, or Firm*—Finnegan, Henderson, Farabow, Garrett & Dunner, LLP.

(57) ABSTRACT

An optical element for use in an optical pickup device to conduct reproducing and/or recording information for a first disk including a protective substrate by the use of a first light flux emitted from a first light source and to conduct reproducing and/or recording information for a second disk including a protective substrate by the use of a second light flux emitted from a first light source, the optical element includes: an optical surface on which a first phase structure is formed to have a function to correct a spherical aberration; an optical surface on which a second phase structure is formed such that when the wavelength of the first light flux changes, the second phase structure generates a spherical aberration in a direction reverse to the direction of a spherical aberration generated by the first phase structure.

40 Claims, 17 Drawing Sheets

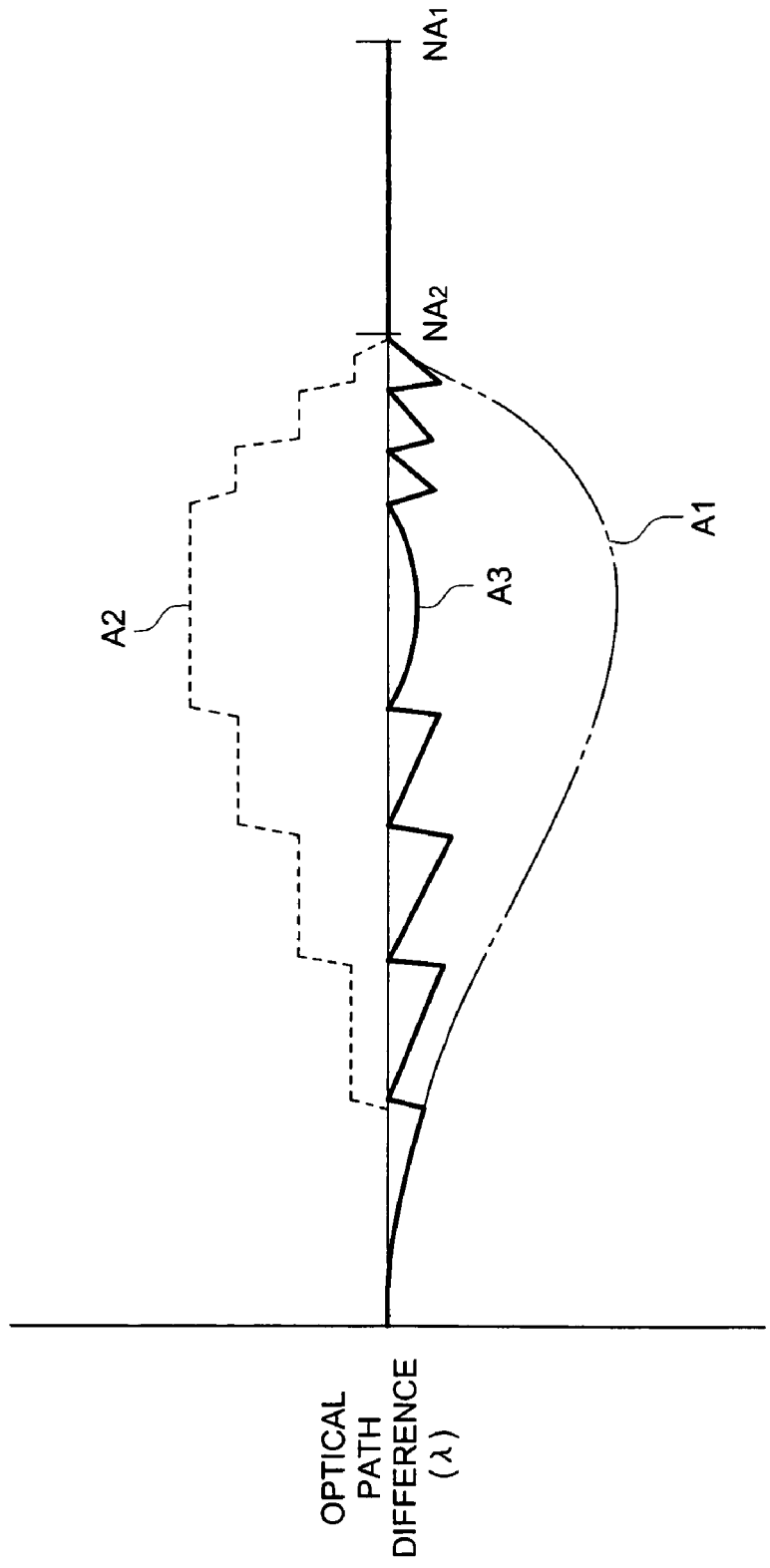

OPTICAL ELEMENT, OPTICAL PICKUP DEVICE AND OPTICAL INFORMATION RECORDING AND REPRODUCING APPARATUS

FIELD OF THE INVENTION

The present invention relates an optical element, an optical pickup device and an optical information recording and reproducing apparatus.

There has so far been known an optical pickup device capable of conducting recording/reproducing for plural types of optical disks each being different from others in terms of recording density. An example of the optical pickup device is one which conducts recording/reproducing by using an optical pickup device for DVD (Digital Versatile Disk) and CD (Compact Disc). In recent years, there has been a demand for an optical pickup device that is compatible for a high density optical disk (hereinafter, optical disks using a violet laser light source as a laser light source are named generically as "high density disk") using a violet laser light source (for example, a violet semiconductor laser or a violet SHG laser), conventional DVD and further for CD, as optical disks each being different from others in terms of recording density.

With respect to an optical pickup device having compatibility for the high density optical disk and DVD, there are known technologies to utilize, as described in the following Patent Documents 1-3, a diffractive optical element on which a diffractive structure composed of ring-shaped zones in a prescribed number whose centers are on the optical axis is formed.

(Patent Document 1) TOKKAI No. 2001-60336
(Patent Document 2) TOKKAI No. 2002-298422
(Patent Document 3) TOKKAI No. 2001-93179

Technologies described in the Patent Documents above are represented by a technology to utilize a beam having the diffraction order number lower than that of the beam for recording/reproducing for the high density optical disk, like utilizing the second order (or third order) diffracted light as a beam for recording/reproducing for high density optical disk, and utilizing first order (or second order) diffracted light as a beam for recording/reproducing for DVD. These technologies make it possible to control fluctuations of focus positions for microscopic wavelength changes in a violet wavelength area, while securing high diffraction efficiency for the beam for recording/reproducing for each optical disk.

For securing the high diffraction efficiency for the beam for recording/reproducing for respective high density optical disks, it is necessary to select a combination of diffraction order number $n_1$ of the beam for recording/reproducing for high density optical disk and diffraction order number $n_2$ of the beam for recording/reproducing for DVD, so that ratio $\delta\Phi_D$ of an optical path length added to $\lambda 1$ by the diffractive structure defined by $\delta\Phi_D = \{n_1 \times \lambda_1/(N_1-1)\}/\{n_2 \times \lambda_2/(N_2-1)\}$ to an optical path length to be added to $\lambda_2$ may be a value close to 1, when $\lambda_1$ represents a wavelength of the beam for recording/reproducing for high density optical disk, $\lambda_2$ represents a wavelength of the beam for recording/reproducing for DVD and $N_1$ and $N_2$ represent respectively refractive indexes of diffractive optical elements respectively for $\lambda_1$ and $\lambda_2$.

Nevertheless, when using the diffractive structure that generates diffracted light with combination of diffraction order number $n_1$ and diffraction order number $n_2$ both satisfying the aforesaid relationship, for realizing compatibility between a high density optical disk and DVD, an amount of change of spherical aberration per unit wavelength of the diffractive structure grows greater, thus, the laser light source needs to be selected, resulting in the problem that an increase in manufacturing cost for the laser light source and an increase in manufacturing cost for the optical pickup device are caused.

Since this amount of change of spherical aberration per unit wavelength change increases in proportion to the-fourth power of the numerical aperture (NA) of an objective optical system, the problem stated above becomes more obvious, especially in the objective optical system with numerical aperture (NA) 0.85 represented by the Blu-ray Disc representing a standard of a high density optical disk and in a high density optical disk with standard using a 0.1 mm—thick protective layer (hereinafter referred to as 0.1 mm standard).

SUMMARY OF THE INVENTION

In view of the problems stated above, an object of the invention is to make it possible to control an amount of changes of spherical aberration per unit wavelength change, and thereby to provide an optical element, an optical pickup device and an optical information recording and reproducing apparatus wherein the yield in mass production of laser light sources is improved and manufacturing cost can be reduced.

To solve the problems stated above, an optical element described in Item 1-1 for use in an optical pickup device to conduct reproducing and/or recording information for a first disk including a protective substrate having a thickness $t_1$ by the use of a first light flux having a wavelength $\lambda_1$ (nm) emitted from a first light source and to conduct reproducing and/or recording information for a second disk including a protective substrate having a thickness $t_2$ ($t_2 \geqq t_1$) by the use of a second light flux having a wavelength $\lambda 2$ ($\lambda_2 > \lambda_1$) (nm) emitted from a first light source, the optical element has an optical surface on which a first phase structure is formed to have a function to correct a spherical aberration caused by a difference in thickness of the protective substrate between the first optical disk and the second optical disk or a function to correct a spherical aberration caused by a difference in wavelength between the first light flux and the second light flux; an optical surface on which a second phase structure is formed such that when the wavelength of the first light flux changes, the second phase structure generates a spherical aberration in a direction reverse to the direction of a spherical aberration generated by the first phase structure.

In the embodiment described in Item 1-2, the first phase structure described in the Item 1-1 is a diffractive structure.

An embodiment described in Item 1-3 is represented by the optical element described in Item 1-1, wherein the first phase structure is a diffractive structure that generates $n_1^{th}$ order diffracted ray as a diffracted ray having the maximum diffraction efficiency when the first light flux comes in and generates $n_2^{th}$ order diffracted ray ($|n_1| \geqq |n_2|$) as a diffracted ray having the maximum diffraction efficiency when the second light flux comes in.

An embodiment described in Item 1-4 is represented by the optical element described in Item 1-1 or Item 1-2, wherein the second phase structure is an optical path difference providing structure including a plurality of ring-shaped zones divided with stepped sections each formed in an optical axis direction.

An embodiment described in Item 1-5 is represented by the optical element described in Item 1-1, wherein when the wavelength of the first light flux changes within a range of ($\lambda_1-5$) (nm) to ($\lambda_1+5$) (nm), the second phase structure has a function to generate a spherical aberration in a direction reverse to the direction of a spherical aberration generated by the first phase structure.

The embodiments described in Item 1-1 through Item 1-4 make it possible to correct spherical aberration caused by actions of the diffractive structure and by a difference of protective layer thickness between a high density disk of 0.1 mm standard and DVD, to correct spherical aberration caused by wavelength dispersion in an objective optical system between a violet wavelength area and a red wavelength area, and to control fluctuations of focus positions for the microscopic change of a wavelength in the violet wavelength area to be small. However, with respect to the diffractive structure, a wavelength dependency of spherical aberration is great, and therefore, a change of spherical aberration for the wavelength change of about ±5 nm grows greater. Since the amount of change of spherical aberration of this kind grows greater in proportion to $NA^4$, a tolerance for an oscillation wavelength of a violet laser light source becomes severe in the high density disk of 0.1 mm standard that uses an objective optical system with NA of 0.85. In the optical element in the invention, therefore, a tolerance for an oscillation wavelength of a violet laser light source is eased by employing the structure wherein the optical path difference providing structure controls spherical aberration changes to be small for wavelength changes of about ±5 nm for a light flux of incidence. Due to this, the yield in mass production of violet laser light sources can be improved and manufacturing cost for violet laser light sources and optical pickup device can be reduced.

Incidentally, in the present specification, optical disks employing violet semiconductor lasers or violet SHG lasers as a light source for recording/reproducing of information are called "high density optical disks" generically, recording/reproducing of information is conducted by objective optical system with NA 0.85, and recording/reproducing of information is conducted by an objective optical system with NA 0.65 in addition to the optical disk in the standard where a protective layer thickness is about 0.1 mm, and an optical disk in the standard where a protective layer thickness is about 0.6 mm is also included. Further, in addition to the optical disk having on its information recording surface the protective layer of this kind, an optical disk having on its information recording surface the protective layer having a thickness of about several nm-several tens nm and an optical disk having the aforesaid protective layer or having the protective layer whose thickness is zero are also included. Further, in the present specification, the high density disk includes a magneto-optical disk that uses a violet semiconductor laser and a violet SHG laser as a light source for recording/reproducing of information.

In the present specification, optical disks in DVD series such as DVD-ROM, DVD-Video, DVD-Audio, DVD-RAM, DVD-R, DVD-RW, DVD+R and DVD+RW are called "DVD" generically, and optical disks in CD series such as CD-ROM, CD-Audio, CD-Video, CD-R and CD-RW are called "CD" generically.

In the present specification again, "a diffractive structure" means a structure that provides a phase difference to a light flux having at least one wavelength among those of light sources used in an optical pickup devicees. For example, it includes a diffractive structure that generates diffracted light and an optical path difference providing structure that has steps to provide an optical path difference, and a refracting interface having steps can also be included provided that the refracting interface has the structure to generate a phase difference.

Further, in the present specification, "the diffractive structure generates $n^{th}$ order diffracted ray" is synonymous with that a diffraction efficiency of the $n^{th}$ order diffracted ray among diffracted rays in various orders which are generated when a light flux with wavelength λ enters in the diffractive structure, is the maximum, and "the diffractive structure that generates $n^{th}$ order diffracted ray" is synonymous with "the diffractive structure that is blazed so that the $n^{th}$ order diffracted ray may generate the maximum diffraction efficiency when a light flux with wavelength λ enters". Therefore, "using $n^{th}$ order diffracted ray as a beam for recording/reproducing of an optical disk" is synonymous with that to record information on an optical disk and/or to reproduce information recorded on an optical disk, by converging $n^{th}$ order diffracted ray having the maximum diffraction efficiency among diffracted rays in various orders which are generated when a light flux with wavelength λ enters, in the diffractive structure.

Further, in the present specification, "correction of spherical aberration" means that the spherical aberration is corrected to be smaller than those generated in the case of no corresponding structures such as the first phase structure and the second phase structure.

Figure 6A:
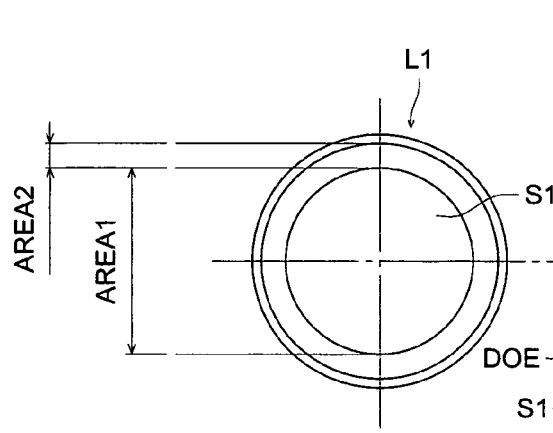
Figure 6B:
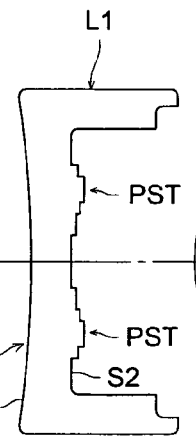

Each of FIGS. 6(*a*)-6(*c*) shows the structure of an aberration correcting element.

FIG. 7 is a graph showing the wavefront aberration in the case of wavelength fluctuations of the objective optical system.

Figure 8:
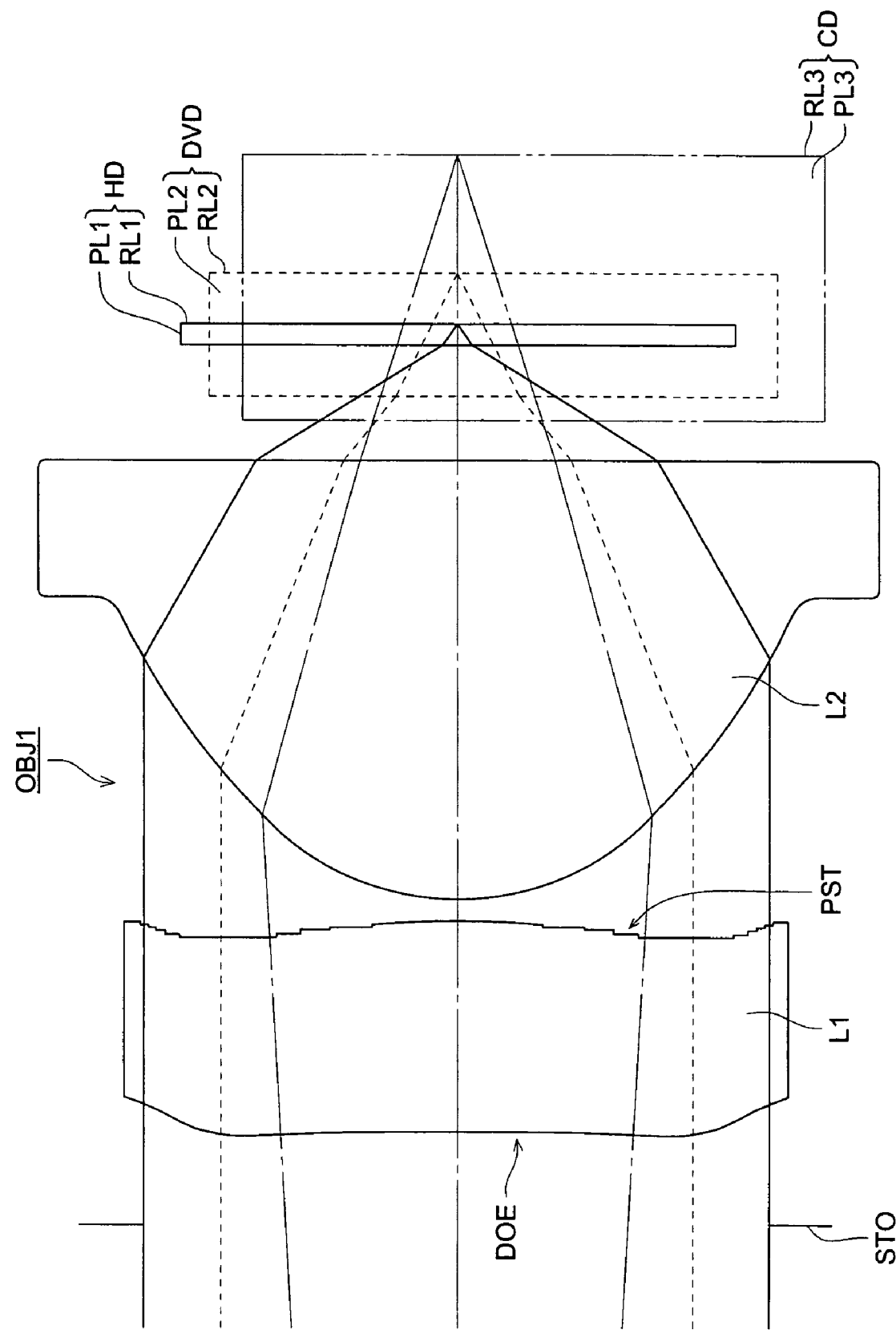

FIG. 8 is a diagram of an optical path of the objective optical system.

Figure 9:
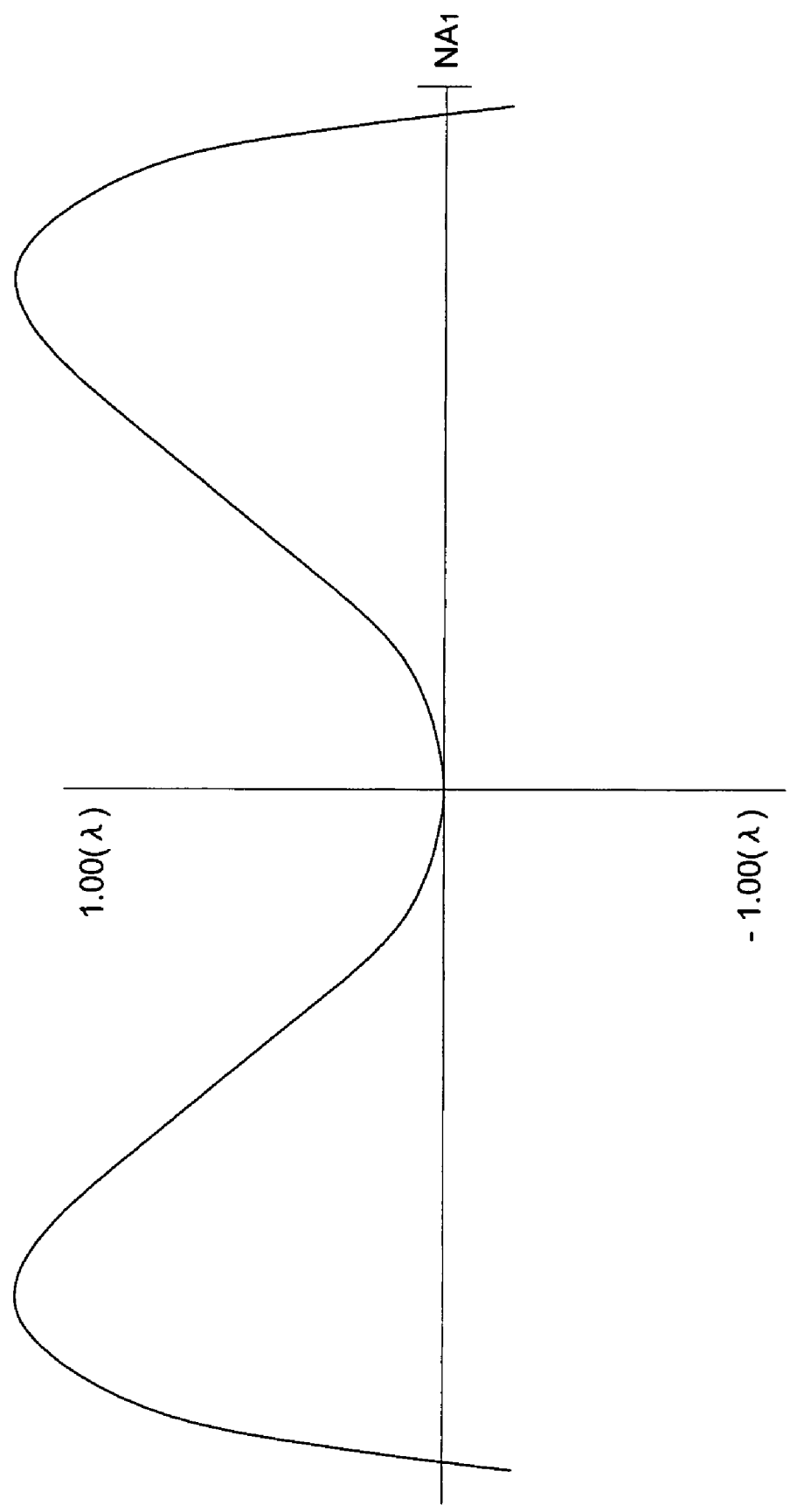

FIG. 9 is a graph showing the wavefront aberration in the case of wavelength fluctuations under the assumption that an optical path difference providing structure is not formed.

Figure 10:
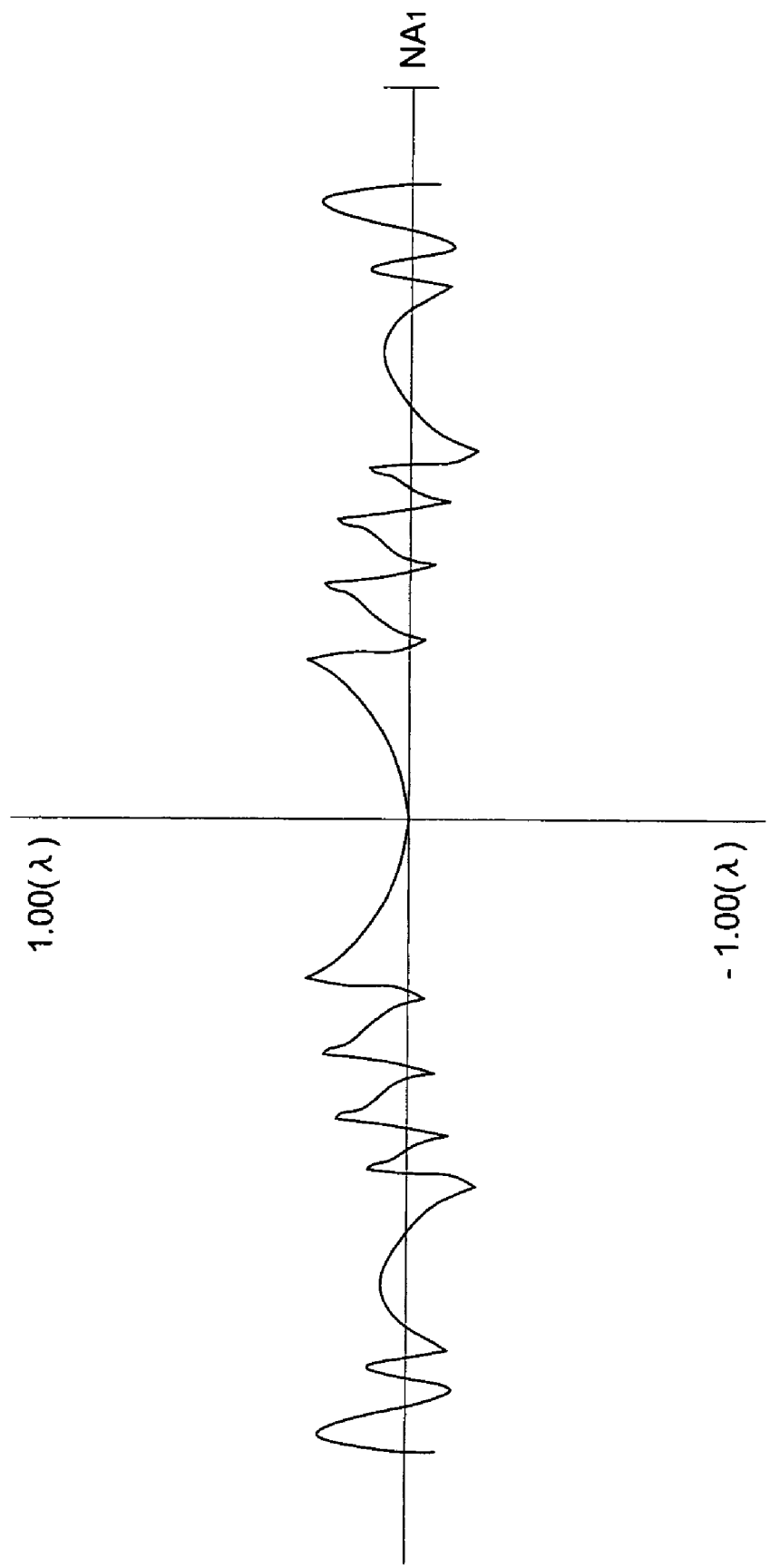

FIG. 10 is a graph showing the wavefront aberration in the case of wavelength fluctuations in the example.

Figure 11:
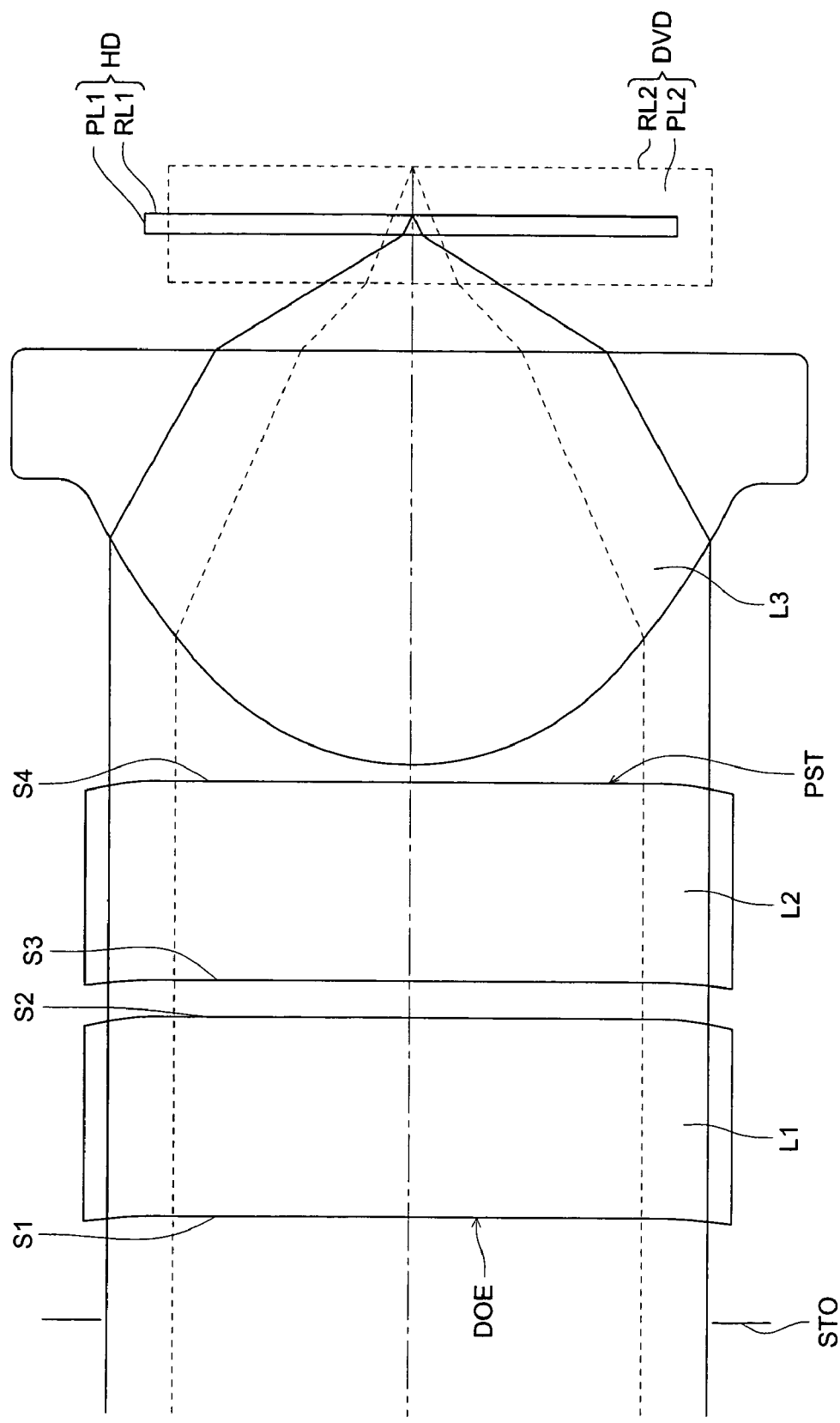

FIG. 11 is a diagram of an optical path of the objective optical system.

Figure 12:
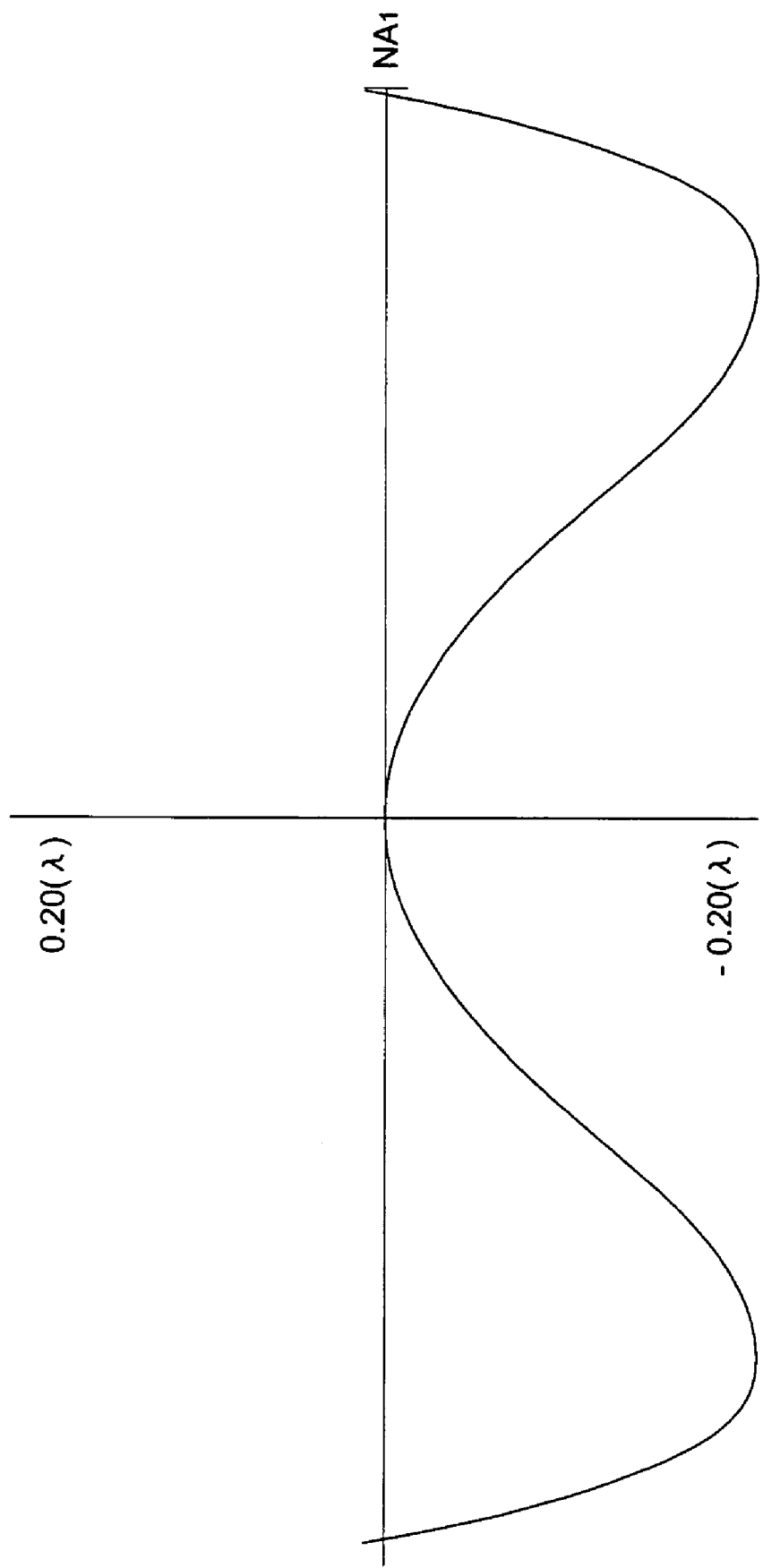

FIG. 12 is a graph showing the wavefront aberration in the case of wavelength fluctuations under the assumption that an optical path difference providing structure is not formed.

Figure 13:
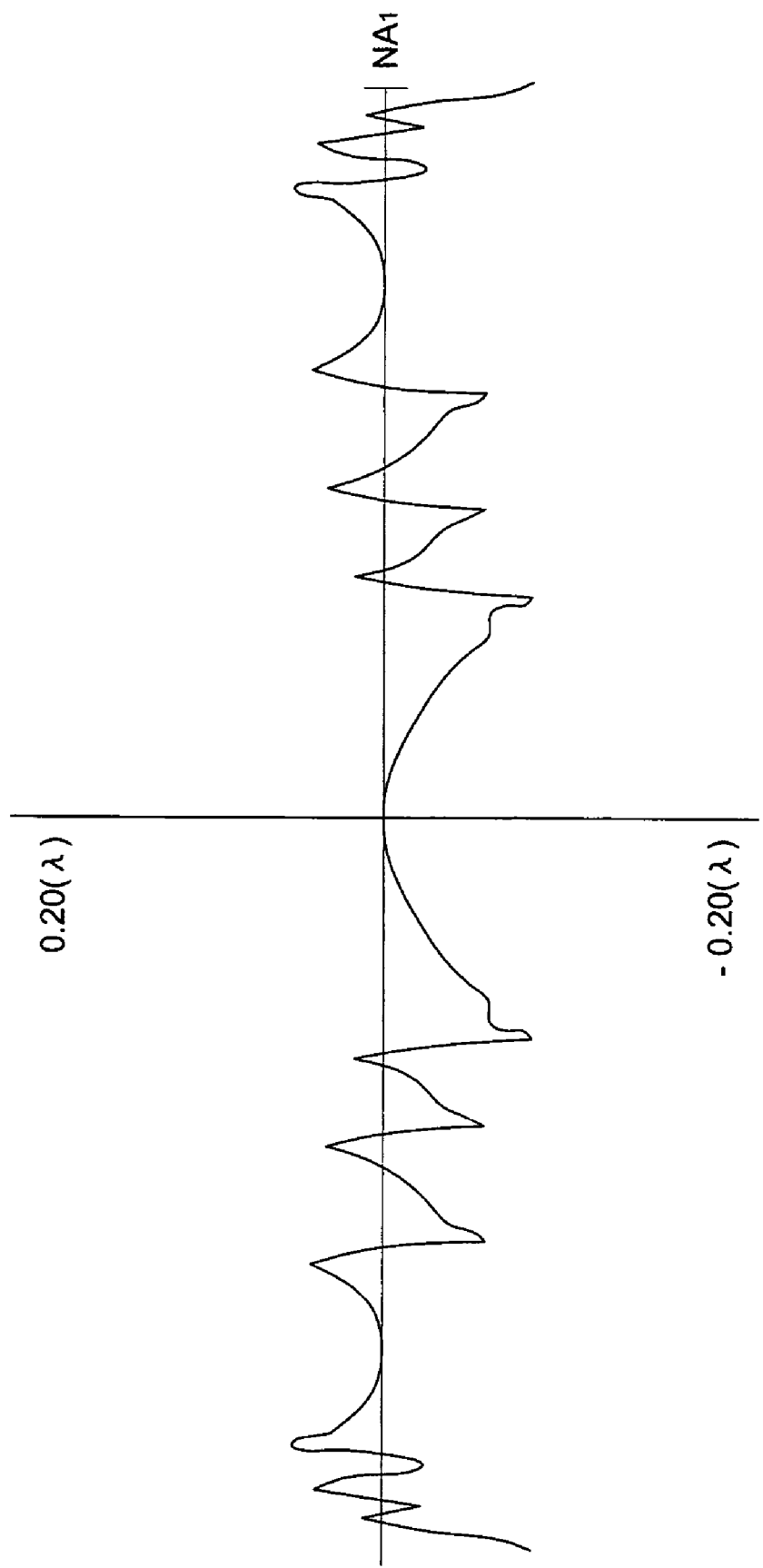

FIG. 13 is a graph showing the wavefront aberration in the case of wavelength fluctuations in the example.

Figure 14:
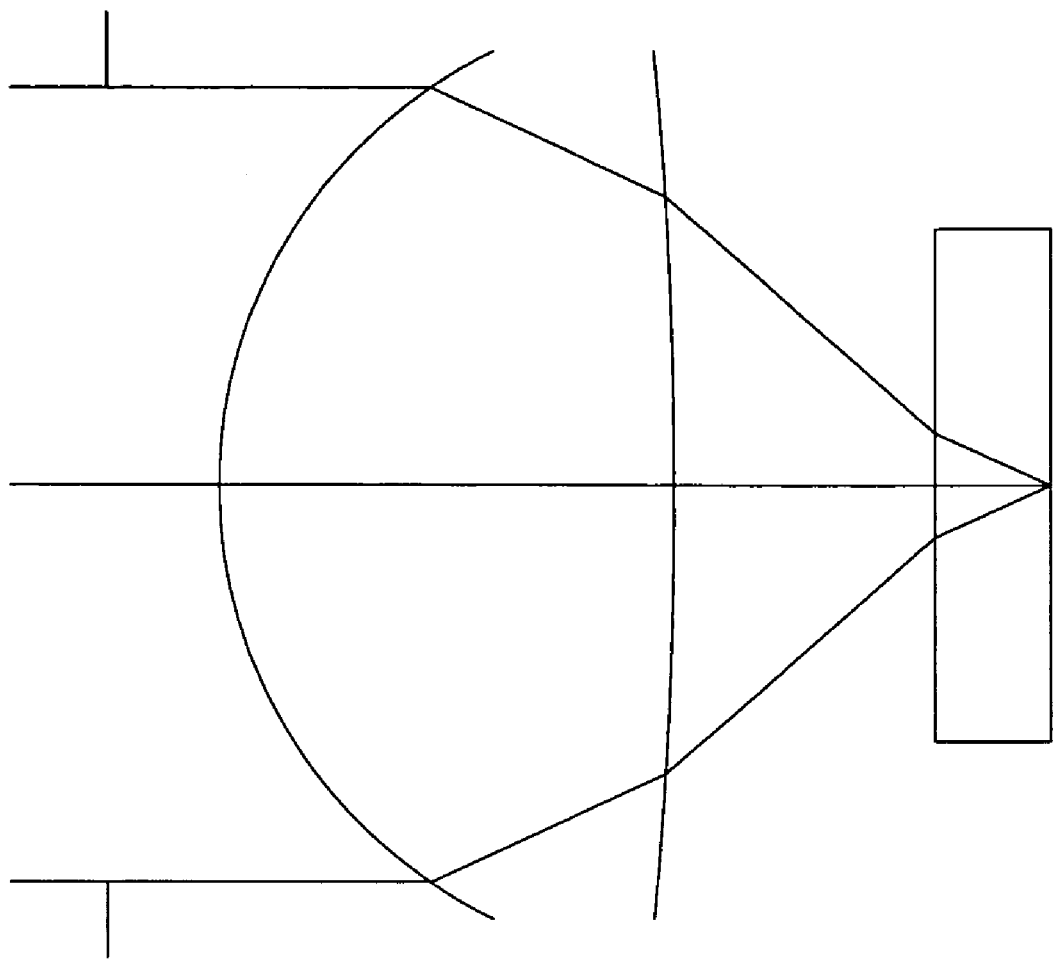

FIG. 14 is a diagram of an optical path of the objective optical system.

Figure 15:
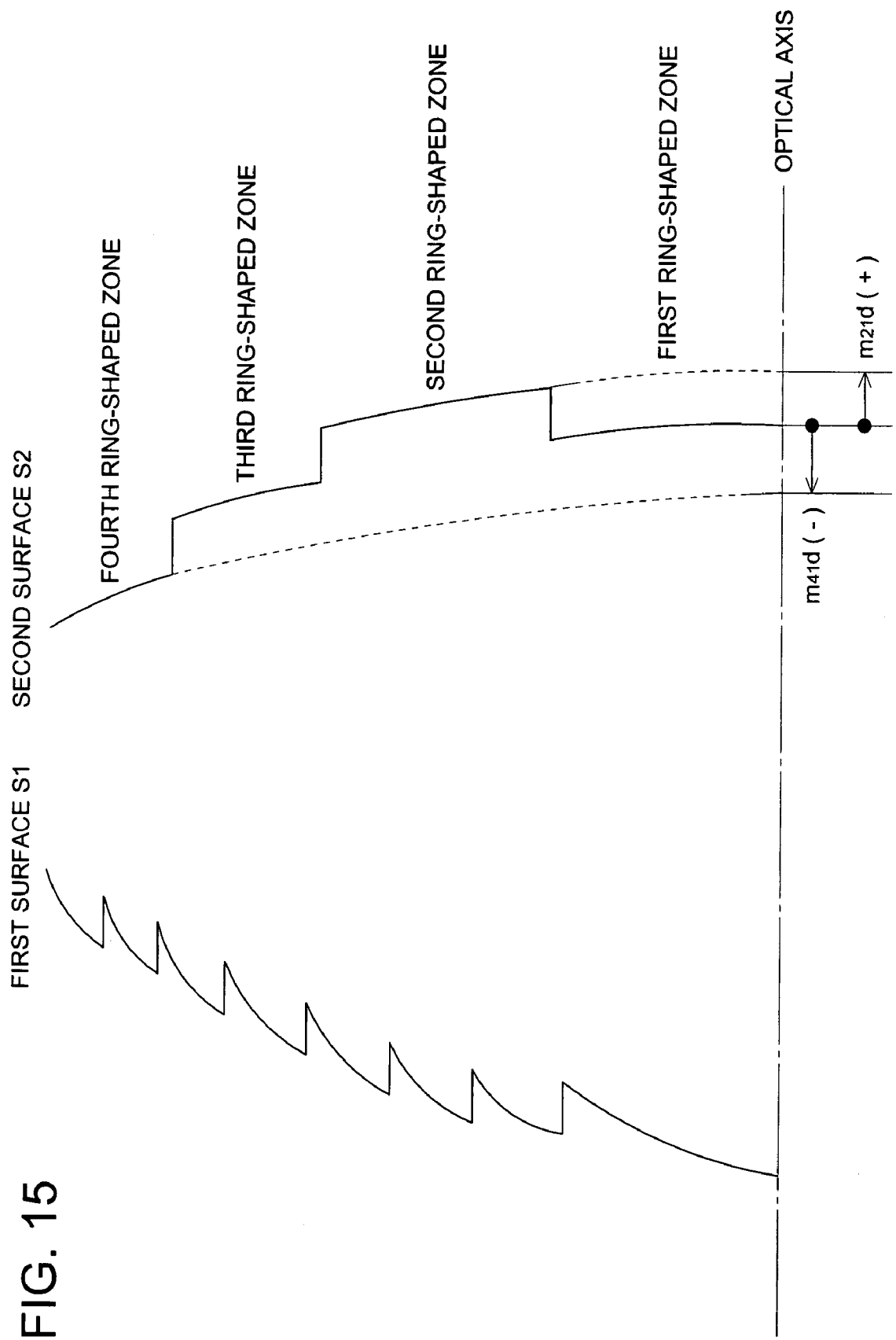

FIG. 15 is a diagram showing the structure of an objective optical system.

Figure 16:
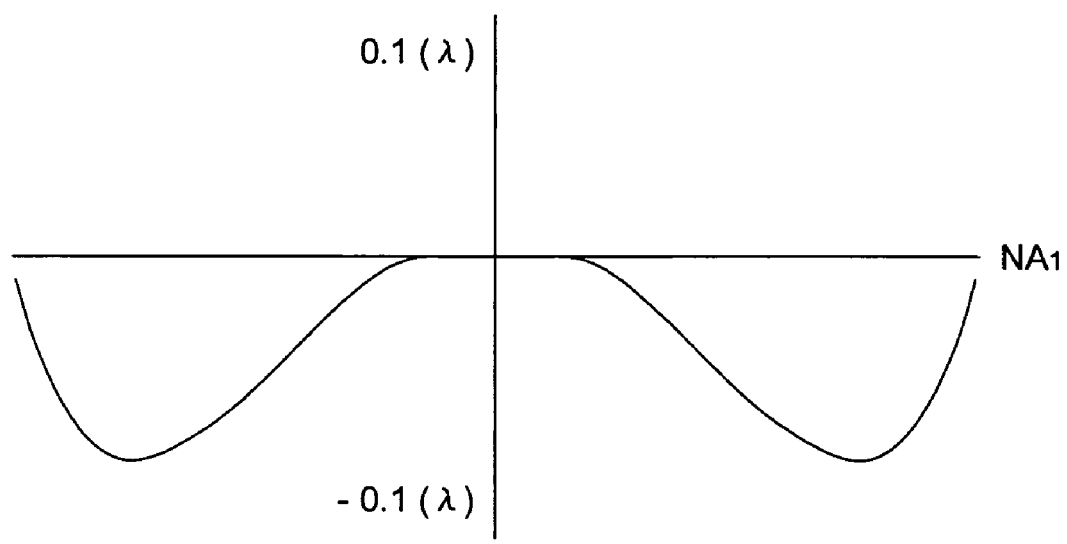

FIG. 16 is a graph showing the wavefront aberration in the case of wavelength fluctuations under the assumption that an optical path difference providing structure is not formed.

Figure 17:
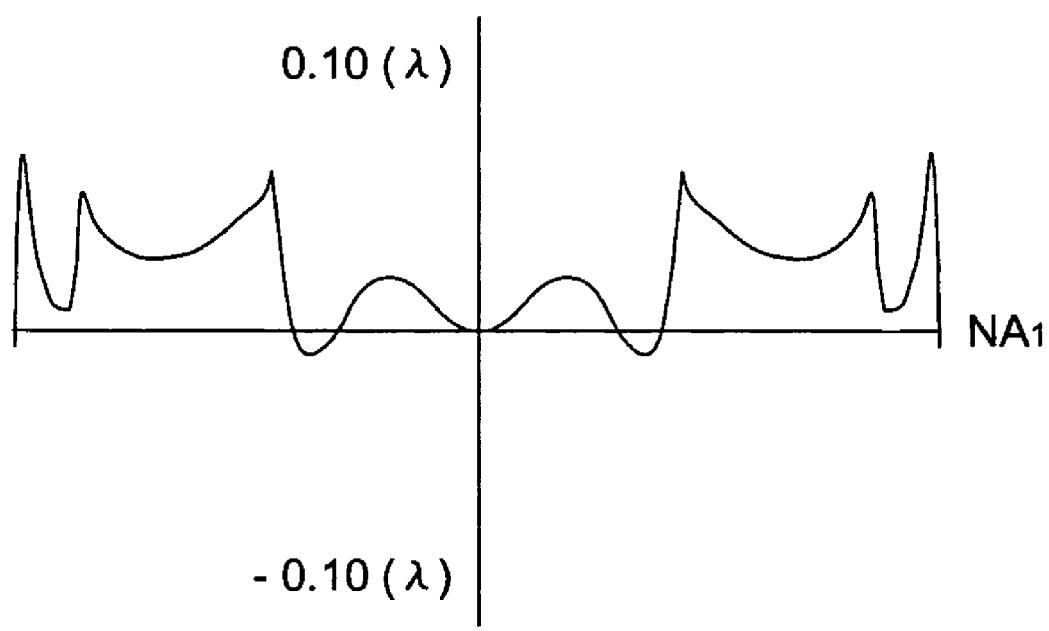

FIG. 17 is a graph showing the wavefront aberration in the case of wavelength fluctuations in the example.

SUMMARY OF THE INVENTION

Preferred embodiments of the invention will be explained below.

An embodiment described in Item 1-6 is represented by the optical element described in Item 1-3, wherein when $N_1$ and $N_2$ are the refractive index of the optical element for the first light flux having a wavelength $\lambda_1$ and the second light flux having a wavelength $\lambda_2$ respectively and INT(X) is an integer closest to X, the following formulas are satisfied:

$$\text{INT}(\delta\phi_D) - \delta\phi_D < 0 \qquad (1)$$

$$\delta\phi_D = \{n_1 \times \lambda_1/(N_1-1)\}/\{n_2 \times \lambda_2/(N_2-1)\} \qquad (2), \text{and}$$

wherein the first phase structure has a spherical aberration characteristic such that when the wavelength of an incident light flux shifts to a longer wavelength side, a spherical aberration changes to be over corrected.

An embodiment described in Item 1-7 is represented by the optical element described in Item 1-6, wherein a manufacturing wavelength $\lambda_B$ for the first phase structure satisfies the following formula:

$$\lambda_B < \lambda_1$$

An embodiment described in Item 1-8 is represented by the optical element described in Item 1-6 or Item 1-7, wherein the second phase structure has a spherical aberration characteristic such that when the wavelength of the first light flux shifts to a longer wavelength side within a range of $(\lambda_1-5)$ (nm) to $(\lambda_1+5)$ (nm), a spherical aberration changes to be under corrected.

Wavelength-dependency of the spherical aberration that is caused by the diffractive structure is utilized for correcting the spherical aberration resulting from a difference of protective layer thickness between a high density disk in 0.1 mm standard and DVD, and the spherical aberration resulting from the wavelength dispersion of the objective optical system existing between a violet wavelength area and a red wavelength area. In this case, when expressions (1) and (2) representing relationships hold between wavelength $\lambda_1$ and diffraction order number $n_1$ of a beam for recording/reproducing for high density optical disk and wavelength $\lambda_2$ and diffraction order number $n_2$ of a beam for recording/reproducing for DVD, as in the embodiment in Item 1-3, it is preferable to make the diffractive structure to have spherical aberration characteristics in which the spherical aberration is changed in the direction of excessive correction when a wavelength of a light flux of incidence is shifted toward the long wavelength side.

In this case, it is preferable that manufacturing wavelength (which is also called a blaze wavelength) $\lambda_B$ of the diffractive structure is a prescribed wavelength that is shorter than $\lambda 1$, as in the embodiment in Item 1-7, which makes it possible to maintain high diffraction efficiency at the wavelength region for each optical disk. This is synonymous with an occasion wherein the following expression (3) is satisfied when $\Delta_D$ (μm) represents the step closest to the optical axis among steps in the optical axis direction of the diffractive structure in the optical axis direction, and $N_B$ represents the refractive index of the optical element for the wavelength $\lambda_B$ respectively.

$$\Delta_D = n_1 \times \lambda_B \times 10^{-3}/(N_B-1) \qquad (3)$$

It is preferable to offset spherical aberration characteristics of the diffractive structure, by giving to the optical path difference providing structure the spherical aberration characteristics in which the spherical aberration is changed in the direction of insufficient correction when a wavelength of a light flux of incidence is shifted toward the long wavelength side within a range from $\lambda_1-5$ (nm) to $\lambda_1+5$ (nm), as in the embodiment in Item 1-8. Due to this, a tolerance for an oscillation wavelength of a violet laser light source can be eased.

An embodiment described in Item 1-9 is represented by the optical element described in Item 1-3, wherein when $N_1$ and $N_2$ are the refractive index of the optical element for the first light flux having a wavelength $\lambda_1$ and the second light flux having a wavelength $\lambda_2$ respectively and INT(X) is an integer closest to X, the following formulas are satisfied:

$$\text{INT}(\delta\phi_D) - \delta\phi_D > 0 \qquad (4)$$

$$\delta\phi_D = \{n_1 \times \lambda_1/(N_1-1)\}/\{n_2 \times \lambda_2/(N_2-1)\} \qquad (5), \text{and}$$

wherein the first phase structure has a spherical aberration characteristic such that when the wavelength of an incident light flux shifts to a longer wavelength side, a spherical aberration changes to be under corrected.

An embodiment described in Item 1-10 is represented by the optical element described in Item 1-6, wherein a manufacturing wavelength $\lambda_B$ for the first phase structure satisfies the following formula:

$$\lambda_1 < \lambda_B < \lambda_2$$

An embodiment described in Item 1-11 is represented by the optical element described in Item 1-9 or Item 1-10, wherein the second phase structure has a spherical aberration characteristic such that when the wavelength of the first light flux shifts to a longer wavelength side within a range of $(\lambda_1-5)$ (nm) to $(\lambda_1+5)$ (nm), a spherical aberration changes to be over corrected.

Wavelength-dependency of the spherical aberration that is caused by the diffractive structure is utilized for correcting the spherical aberration resulting from a difference of protective layer thickness between a high density disk in 0.1 mm standard and DVD, and the spherical aberration resulting from the wavelength dispersion of the objective optical system existing between a violet wavelength area and a red wavelength area. In this case, when expressions (4) and (5) representing relationships hold between wavelength $\lambda_1$ and diffraction order number $n_1$ of a beam for recording/reproducing for high density optical disk and wavelength $\lambda_2$ and diffraction order number $n_2$ of a beam for recording/reproducing for DVD, as in the embodiment in Item 1-9, it is preferable to make the diffractive structure to have spherical aberration characteristics in which the spherical aberration is changed in the direction of insufficient correction when a wavelength of a light flux of incidence is shifted toward the long wavelength side.

In this case, it is preferable that manufacturing wavelength (which is also called a blaze wavelength) $\lambda_B$ of the diffractive structure is a prescribed wavelength that is in a range from $\lambda_1$ to $\lambda_2$ as in the embodiment in Item 1-10, which makes it possible to maintain high diffraction efficiency at the wavelength region for each optical disk. This is synonymous with an occasion wherein the following expression (6) is satisfied when $\Delta_D$ (μm) represents the step closest to the optical axis among steps in the optical axis direction of the diffractive structure in the optical axis direction, and $N_B$ represents the refractive index of the optical element for the wavelength $\lambda_B$ respectively.

$$\Delta_D = n_1 \times \lambda_B \times 10^{-3}/(N_B-1) \qquad (6)$$

It is preferable to offset spherical aberration characteristics of the diffractive structure, by giving to the optical path difference providing structure the spherical aberration characteristics in which the spherical aberration is changed in the direction of excessive correction when a wavelength of a light flux of incidence is shifted toward the long wavelength side within a range of $\lambda1-5$ (nm) to $\lambda1+5$ (nm), as in the embodiment in Item 1-11. Due to this, a tolerance for an oscillation wavelength of a violet laser light source can be eased.

An embodiment described in Item 1-12 is represented by the optical element described in any one of Items 1-1 through 1-11, wherein the first phase structure is formed on an aspherical surface formed such that as the position of an optical path on the aspherical surface is distant more from the optical axis, the length of the optical path becomes longer.

In the embodiment described in Item 1-13, when an addition amount of an optical path length by the diffractive structure is defined with the following expression (7) by the use of optical path difference function coefficients $B_2$, $B_4$, $B_6$, $B_8$, $B_{10}$ . . . and diffraction order number n, in the optical element described in any one of Items 1-2, 1-3, and 1-6 though 1-11, the sign for $B_2$ and sign for $B_4$ are different each other.

$$\Phi_b = n \times (B_2 h^2 + B_4 h^4 + B_6 h^6 + B_8 h^8 + B_{10} h^{10} + \ldots) \quad (7)$$

The embodiment described in Item 1-13 represents conditions for controlling a loss of an amount of light caused by an error in a form of the diffractive structure to be small, by preventing a width of a ring-shaped zone of the diffractive structure from becoming too small, and thereby, by making it easy to process a die. It is possible to increase an amount of change of h per unit amount of change of optical path difference function $\Phi_b$, by making a sign of second order optical path difference function coefficient and a sign of fourth order optical path difference function coefficient $B_4$ to be different each other. This corresponds to that a width of a ring-shaped zone of the diffractive structure grows greater, resulting in achievement of easy processing of a die and of control of a loss in an amount of light. For further achievement of these effects, it is preferable to establish sizes of $B_2$ and B4 so that optical path difference function $\Phi_b$ may have an inflection point. It is further possible to secure a working distance of DVD to be large by establishing signs of $B_2$ and $B_4$ to be different each other.

An embodiment described in Item 1-14 is represented by the optical element described in any one of Items 1-1 through 1-13, wherein on the optical surface on which the first phase structure is formed, the first phase structure is formed within at least a range of 0% to 70% of the maximum effective diameter of the optical surface and the first phase structure is not formed within at least a range of 85% to 100% of the maximum effective diameter.

In the embodiment described in Item 1-14, the spherical aberration caused by a difference of protective layer thickness between a high density disk in 0.1 mm standard and DVD is corrected by the action of the diffractive structure only within NA necessary for recording/reproducing for DVD, and therefore, a spot on the information recording surface of DVD is not narrowed down more than necessary, and thereby, an amount of comatic aberration caused by a tilt of DVD does not become too great. The second light flux passing through an area outside NA of DVD has spherical aberration caused by a difference of protective layer thickness between the high density disk and DVD, to become flare components which do not contribute to formation of a spot on the information recording surface of DVD. Since this is equivalent to that the optical element itself has a function to restrict an aperture for DVD, an optical pickup device equipped with an optical element of the invention does not need to be provided separately with a diaphragm corresponding to NA of DVD, and its structure can be simple.

An embodiment described in Item 1-15 is represented by the optical element described in any one of Items 1-1 though 1-14, wherein on the optical surface on which the second phase structure is formed, the second phase structure is formed within at least a range of 0% to 70% of the maximum effective diameter of the optical surface and the second phase structure is not formed within at least a range of 85% to 100% of the maximum effective diameter.

In the case of the structure described in Item 1-15, wavelength-dependency of spherical aberration of the diffractive structure has only to be offset within NA necessary for recording/reproducing for DVD, and therefore, it is preferable to form an optical path difference providing structure only within NA of DVD. Further, it is preferable to determine the optical path difference providing structure so that a phase of wavefront for the first light flux passing through an area outside NA of DVD and that for the first light flux passing through an area within NA of DVD may be aligned in the wavelength area in at least a range from $\lambda_1-5$ (nm) to $\lambda_1+5$ (nm).

Incidentally, "maximum effective diameter" mentioned here means an effective diameter of the optical element for the first light flux with wavelength $\lambda_1$.

An embodiment described in Item 1-16 is represented by the optical element described in Item 1-8, wherein the second phase structure does not provide an optical path difference for the first light flux having a wavelength $\lambda_1$ and provides an optical path difference for the first light flux having a wavelength $(\lambda_1+5)$ (nm) and the first light flux having a wavelength $(\lambda_1-5)$ (nm).

An embodiment described in Item 1-17 is represented by the optical element described in Item 1-11, wherein the second phase structure does not provide an optical path difference for the first light flux having a wavelength $\lambda_1$ and provides an optical path difference for the first light flux having a wavelength $(\lambda_1+5)$ (nm) and the first light flux having a wavelength $(\lambda_1-5)$ (nm).

The optical path difference providing structure is preferably the structure that does not give an optical path difference substantially to $\lambda_1$ representing a design wavelength of the optical element as in the embodiments in Item 1-16 and Item 1-17, but gives an optical path difference to wavelength $\lambda_1+5$ (nm) and wavelength $\lambda_1-5$ (nm), which makes it possible to conduct properly an offset of wavelength-dependency of spherical aberration caused by the diffractive structure. Specifically, it is preferable to determine the step $\Delta_P$ (μm) closest to the optical axis in the optical path difference providing structure so that the following expression is satisfied;

$$\Delta_P = m \times \lambda_1 \times 10^{-3}/(N_1-1)$$

wherein, m represents a positive integer and $N_1$ represents refractive index of the optical element for the light flux with wavelength $\lambda_1$.

An embodiment described in Item 1-18 is represented by the optical element described in any one of Items 1-3, 1-6 through 1-11, 1-16 and 1-17, wherein the following formulas are satisfied:

$$|\lambda_2-\lambda_1|>50 \text{ nm and } |n_1|>|n_2|$$

In the embodiment described in Item 1-18, when a difference between $\lambda_2$ and $\lambda_1$ is greater than 50 nm, it is possible to maintain high efficiency of diffraction in a wavelength region for each optical disk, by using the diffracted light whose diffraction order is lower than that of a beam for recording/reproducing for the high density optical disk, as a beam for recording/reproducing for DVD. Since the wavelength-dependency of the spherical aberration is great for the diffractive structure determined to use diffracted light having different order number as a beam for recording/reproducing for each optical disk, compared with an occasion to use the diffracted light with the same order number, as stated above, a tolerance for an oscillation wavelength of a violet laser light source becomes extremely severe. In the optical element of the invention, however, a tolerance for an oscillation wavelength of a violet laser light source can be eased by employing the structure wherein the optical path difference providing structure controls spherical aberration changes to be small for wavelength changes of about ±5 nm for a light flux of incidence.

An embodiment described in Item 1-19 is represented by the optical element described in Item 1-18, wherein $\lambda_1$ is within a range of 350 nm to 450 nm, $\lambda_2$ is within a range of 600 nm to 700 nm, and a combination $(n_1, n_2)$ of $n_1$ and $n_2$ satisfies the following formula:

$(n_1, n_2)=(2, 1), (3, 2), (5, 3), (8, 5)$ or $(10, 6)$

When $\lambda_1$ represents a wavelength within a range of 350 nm-450 nm representing a violet wavelength area and $\lambda_2$ represents a wavelength within a range of 600 nm-700 nm representing a red wavelength area as in the embodiment described in Item 1-19, it is preferable that the specific combination of diffraction order numbers $n_1$ and $n_2$ is any one of $(n_1, n_2)=(2, 1), (3, 2), (5, 3), (8, 5), (10, 6)$, and a selection of this combination makes it possible to maintain high diffraction efficiency in a wavelength region for each optical disk. Further, even in the case where diffraction order number $n_1$ becomes greater than 10, there is present a combination of diffraction order numbers which can maintain high diffraction efficiency at a wavelength region for each optical disk. However, if the diffraction order number $n_1$ is made to be smaller than 10, diffraction efficiency fluctuations do not become too large for the wavelength changes of about ±5 (nm) from $\lambda_1$, which is preferable.

An embodiment described in Item 1-20 is represented by the optical element described in Item 1-19, wherein the optical wherein the optical element is made of a material whose refractive index for the first light flux having a wavelength $\lambda_1$ is within a range of 1.5 to 1.6 and Abbe constant for d-line (587.6 nm) is within a range of 50 to 60 and the diffractive structure includes a predetermined number of ring-shaped zones divided with stepped sections each formed in an optical axis direction, and a stepped section $\Delta_D$ (μm) closest to the optical axis among the stepped sections satisfies one of the following formulas:

$1.25 < \Delta_D < 1.65$ (8)

$2.05 < \Delta_D < 2.55$ (9)

$3.40 < \Delta_D < 4.10$ (10)

$5.70 < \Delta_D < 6.45$ (11)

$7.00 < \Delta_D < 8.00$ (12)

It is preferable that the embodiment described in Item 1-20 relates to the more specific structure of the diffractive structure in the aforesaid combination of the diffraction order numbers, and the step $\Delta_D$ (μm) closest to the optical axis in the diffractive structure satisfies the expressions (8)-(12). The combination $(n_1, n_2)=(2, 1)$ corresponds to expression (8), $(n_1, n_2)=(3, 2)$ corresponds to expression (9), $(n_1, n_2)=(5, 3)$ corresponds to expression (10), $(n_1, n_2)=(8, 5)$ corresponds to expression (11), and $(n_1, n_2)=(10, 6)$ corresponds to expression (12). Incidentally, for manufacturing an optical element having a diffractive structure like the optical element of the invention with a high precision, a plastic lens excellent in transferability is preferable. In most plastic materials usable in a violet wavelength area, the refractive index for the first light flux with wavelength $\lambda_1$ is in a range of 1.5-1.6 and Abbe's number for d line is in a range of 50-60.

An embodiment described in Item 1-21 is represented by the optical element described in any one of Items 1-18 through 1-20, wherein the second phase structure is an optical path difference providing structure including a plurality of ring-shaped zones divided with stepped sections each formed in an optical axis direction, and when $\Delta_P$ (μm) is a stepped section closest to the optical axis among the stepped sections in the second phase structure, $N_1$ and $N_2$ are the refractive index of the optical element for the first light flux having a wavelength $\lambda_1$ and the second light flux having a wavelength $\lambda_2$ respectively and INT(X) is an integer closest to X, the following formula satisfies the following formulas:

$0 \leq |INT(\phi_{1P}) - \phi_{1P}| \leq 0.4$ (13)

$0 \leq |INT(\phi_{2P}) - \phi_{2P}| \leq 0.4$ (14)

$\phi_{1P} = \Delta_P \times (N_1-1)/(\lambda_1 \times 10^{-3})$ (15)

$\phi_{2P} = \Delta_P \times (N_2-1)/(\lambda_2 \times 10^{-3})$ (16)

When determining the step $\Delta_P$ (μm) closest to the optical axis of the optical path difference providing structure, it is preferable that neither design wavelength $\lambda_1$ on the high density optical disk side nor design wavelength $\lambda_2$ on the DVD side is given a substantial optical path difference. Due to this, characteristics of the optical element for $\lambda_2$ in the invention can be made excellent. Specifically, it is preferable to determine $\Delta_P$ (μm) so that the expressions (13)-(16) may be satisfied, as in the embodiment of Item 1-21.

An embodiment described in Item 1-22 is represented by the optical element described in Item 1-21, wherein when $\lambda_1$ is within a range of 350 nm to 450 nm, $\lambda_2$ is within a range of 600 nm to 700 nm, the optical element is made of a material whose refractive index for the first light flux having a wavelength $\lambda_1$ is within a range of 1.5 to 1.6 and Abbe constant for d-line (587.6 nm) is within a range of 50 to 60 and p is a positive integer, the following formulas are satisfied:

$INT(\phi_{1P}) = 5p$ (17)

$INT(\phi_{2P}) = 3p$ (18)

The embodiment described in Item 1-22 relates to the structure that is more specific in the case where neither design wavelength $\lambda_1$ on the high density optical disk side nor design wavelength $\lambda_2$ on the DVD side is given a substantial optical path difference by the optical path difference providing structure, and it is preferable that $\Delta_P$ (μm) satisfies expressions (17) and (18). Incidentally, for manufacturing an optical element having an optical path difference providing structure like the optical element of the invention with a high precision, a plastic lens excellent in transferability is preferable. In most plastic materials usable in a violet wavelength area, the refractive index for the first light flux with wavelength $\lambda_1$ is in a range of 1.5-1.6 and Abbe's number for d line is in a range of 50-60.

An embodiment described in Item 1-23 is represented by the optical element described in any one of Items 1-3, 1-6 through 1-11, 1-13 and 1-16 though 1-22, wherein the first phase structure generates a $n_3^{th}$ order diffracted ray ($|n_2| \geq |n_3|$) when the third light flux comes in.

In the embodiment described in Item 1-23, when each of the difference between $\lambda_2$ and $\lambda_1$, the difference between $\lambda_3$ and $\lambda_2$ and the difference between $\lambda_3$ and $\lambda_1$ is greater than 50 nm, it is possible to maintain the high diffraction efficiency in the wavelength region for each optical disk, by using the diffracted light with the order number lower the beam for recording/reproducing for the high density disk as the beam for recording/reproducing for DVD, and by using the diffracted light with the order number that is the same as or lower than the beam for recording/reproducing for DVD as the beam for recording/reproducing for CD. In the diffractive structure determined to use the diffracted light having the different order number as a beam for recording/reproducing for each optical disk of at lease high density optical disk and DVD as stated above, the wavelength-dependency of the spherical aberration is great compared with an occasion to use the diffracted light with the same order number, and a tolerance for the oscillation wavelength of the violet laser light source becomes to be extremely severe accordingly. However, in the optical element in the invention, a tolerance for oscillation wavelength of the violet laser light source can be eased, because of the structure where changes in spherical aberration for wavelength changes of about ±5 nm in the light flux of incidence in the violet wavelength area is controlled to be small by the optical path difference structure.

An embodiment described in Item 1-24 is represented by the optical element described in Item 1-23, wherein $\lambda_1$ is within a range of 350 nm to 450 nm, $\lambda_2$ is within a range of 600 nm to 700 nm, $\lambda_3$ is within a range of 700 nm to 850 nm, and a combination ($n_1$, $n_2$, $n_3$) of $n_1$, $n_2$ and $n_3$ satisfies the following formula:

$$(n_1, n_2, n_3) = (2, 1, 1), (8, 5, 4), \text{ or } (10, 6, 5)$$

When $\lambda_1$ is a wavelength within a range of 350 nm-450 nm representing a violet wavelength area, $\lambda_2$ is a wavelength within a range of 600 nm-700 nm representing a red wavelength area, and $\lambda_3$ is a wavelength within a range of 700 nm-850 nm representing a infrared wavelength area, as in the embodiment described in Item 1-24, it is preferable that a specific combination of diffraction order numbers $n_1$, $n_2$ and $n_3$ is any one of ($n_1$, $n_2$, $n_3$)=(2, 1, 1) (8, 5, 4) and (10, 6, 5), and a high efficiency of diffraction can be maintained in the wavelength region for each optical disk, by selecting the aforesaid combination. Further, even when the diffraction order number $n_1$ is greater than 10, a combination of diffraction order numbers which make it possible to maintain high efficiency of diffraction still exists at a wavelength region for each optical disk. In that case, however, changes in diffraction efficiency become too great for the wavelength changes of about ±5 (nm) from $\lambda_1$, which is not preferable.

An embodiment described in Item 1-25 is represented by the optical element described in Item 1-24, wherein the optical element is made of a material whose refractive index for the first light flux having a wavelength $\lambda_1$ is within a range of 1.5 to 1.6 and Abbe constant for d-line (587.6 nm) is within a range of 50 to 60 and the diffractive structure includes a predetermined number of ring-shaped zones divided with stepped sections each formed in an optical axis direction, and a stepped section $\Delta_D$ (μm) closest to the optical axis among the stepped sections satisfies one of the following formulas:

$$1.25 < \Delta_D < 1.65 \tag{19}$$

$$5.70 < \Delta_D < 6.45 \tag{20}$$

$$7.00 < \Delta_D < 8.00 \tag{21}$$

The embodiment described in Item 1-25 relates to the more specific structure of the diffractive structure in the combination of the diffraction order numbers and it is preferable that step $\Delta_D$ (μM) closest to the optical axis in the diffractive structure satisfies the following expressions (19)-(21). With respect to correspondence between the combination of diffraction order numbers and expressions (19)-(21), ($n_1$, $n_2$, $n_3$)=(2, 1, 1) corresponds to expression (19), ($n_1$, $n_2$, $n_3$)=(8, 5, 4) corresponds to expression (20) and ($n_1$, $n_2$, $n_3$)=(10, 6, 5) corresponds to expression (21). Incidentally, for manufacturing an optical element having a diffractive structure like the optical element of the invention with a high precision, a plastic lens excellent in transferability is preferable. In most plastic materials usable in a violet wavelength area, the refractive index for the first light flux with wavelength $\lambda_1$ is in a range of 1.5-1.6 and Abbe's number for d line is in a range of 50-60.

An embodiment described in Item 1-26 is represented by the optical element described in any one of Items 1-23 through 1-25, wherein the second phase structure is an optical path difference providing structure including a plurality of ring-shaped zones divided with stepped sections each formed in an optical axis direction, and when $\Delta_P$ (μm) is a stepped section closest to the optical axis among the stepped sections in the second phase structure, $N_1$, $N_2$ and $N_3$ are the refractive index of the optical element for the first light flux having a wavelength $\lambda_1$, the second light flux having a wavelength $\lambda_2$ and the third light flux having a wavelength $\lambda_3$ respectively and INT(X) is an integer closest to X, the following formula satisfies the following formulas:

$$0 \leq |\text{INT}(\phi_{1P}) - \phi_{1P}| \leq 0.4 \tag{22}$$

$$0 \leq |\text{INT}(\phi_{2P}) - \phi_{2P}| \leq 0.4 \tag{23}$$

$$0 \leq |\text{INT}(\phi_{3P}) - \phi_{3P}| \leq 0.4 \tag{24}$$

$$\phi_{1P} = \Delta_P \times (N_1 - 1)/(\lambda_1 \times 10^{-3}) \tag{25}$$

$$\phi_{2P} = \Delta_P \times (N_2 - 1)/(\lambda_2 \times 10^{-3}) \tag{26}$$

$$\phi_{3P} = \Delta_P \times (N_3 - 1)/(\lambda_3 \times 10^{-3}) \tag{27}$$

When determining the step $\Delta_P$ (μm) closest to the optical axis of the optical path difference providing structure, it is preferable that none of design wavelength $\lambda_1$ on the high density optical disk side, design wavelength $\lambda_2$ on the DVD side and design wavelength $\lambda_3$ on the CD side is given a substantial optical path difference. Due to this, characteristics of the optical element in the invention for the second and third light fluxes with wavelength $\lambda_2$ and wavelength $\lambda_3$ can be made excellent. Specifically, it is preferable to determine $\Delta_P$ (μm) so that the expressions (22)-(27) may be satisfied, as in the embodiment of Item 1-26.

An embodiment described in Item 1-27 is represented by the optical element described in Item 1-26, wherein when $\lambda_1$ is within a range of 350 nm to 450 nm, $\lambda_2$ is within a range of 600 nm to 700 nm, $\lambda_3$ is within a range of 700 nm to 850 nm, the optical element is made of a material whose refractive index for the first light flux having a wavelength $\lambda_1$ is within a range of 1.5 to 1.6 and Abbe constant for d-line (587.6 nm) is within a range of 50 to 60 and p is a positive integer, the following formulas are satisfied:

$$\text{INT}(\phi_{1P}) = 10p \tag{28}$$

$$\text{INT}(\phi_{2P}) = 6p \tag{29}$$

$$\text{INT}(\phi_{3P}) = 5p \tag{30}$$

The embodiment described in Item 1-27 relates to the structure that is more specific in the case where none of design wavelength $\lambda_1$ on the high density optical disk side, design wavelength $\lambda_2$ on the DVD side and design wavelength $\lambda_3$ on the CD side is given a substantial optical path difference by the optical path difference providing structure, and it is preferable that $\Delta_P$ (μm) satisfies expressions (28) and (30). Incidentally, for manufacturing an optical element having an optical path difference providing structure like the optical element of the invention with a high precision, a plastic lens excellent in transferability is preferable. In most plastic materials usable in a violet wavelength area, the refractive index for the first light flux with wavelength $\lambda_1$ is in a range of 1.5-1.6 and Abbe's number for d line is in a range of 50-60.

An embodiment described in Item 1-28 is represented by the optical element described in any one of Items 1-1 through 1-27, wherein the optical element comprises a first structural element on which the first phase structure is formed and a second structural element on which the second phase structure is formed.

As in Item 1-28, the optical element of the invention may also be composed of the first constituent element on which the diffractive structure is formed and the second constituting element on which the optical path difference providing structure is formed. By forming the diffractive structure and the optical path difference providing structure to be different constituent elements, optical performances and errors of forms of each structure can easily grasped in the course of manufacturing, which makes it easy to manufacture the optical element.

An embodiment described in Item 1-29 is represented by the optical element described in any one of Items 1-1 through 1-28, wherein the optical element is a plastic lens.

For manufacturing an optical element having a diffractive structure or an optical path difference providing structure with a high precision, like the embodiment in Item 1-29, a plastic lens excellent in transferability is preferable.

An embodiment described in Item 1-30 is represented by the optical element described in any one of Items 1-1 through 1-29, wherein the optical element is a structural element of an objective optical system for use in an optical pickup device.

An embodiment described in Item 1-30 makes it possible to provide an optical pickup device having compatibility for a high density optical disk and DVD by using the optical element described in any one of Items 1-1 through 1-29 as a constituent element of an objective optical system.

An embodiment described in Item 1-31 is represented by the optical element described in Item 1-30, wherein the objective optical system comprises an aberration correcting element and a light converging element to converge a light flux emitted from the aberration correcting element on an information recording surface of an optical disk.

When an optical element of the invention is used as a constituent factor of the objective optical system as in the embodiment in Item 1-31, it is preferable that the optical element is arranged between the light converging element that converges a light flux emitted from a laser light source on an information recording surface of an optical disk and the laser light source. With respect to the light converging element having NA 0.85, if a diffractive structure or an optical path difference providing structure is formed on an optical surface of the light converging element, an influence of the eclipse of a ray of light by steps makes a loss of an amount of light large, because an angle formed by a normal on an aspheric surface and an optical axis grows greater. However, it is possible to control such loss of an amount of light to be small by making the optical element of the invention to be powerless.

An embodiment described in Item 1-32 is represented by the optical element described in Item 1-30, wherein the objective optical system is one group-structured light converging element and the light converging element is the optical element.

The embodiment of Item 1-32 makes it possible to obtain an optical element having a same effect as that of Item 1-31.

An embodiment described in Item 1-33 is an optical pickup device to conduct reproducing and/or recording information for a first disk including a protective substrate having a thickness $t_1$ by the use of a first light flux having a wavelength $\lambda_1$ (nm) emitted from a first light source and to conduct reproducing and/or recording information for a second disk including a protective substrate having a thickness $t_2$ ($t_2 \geq t_1$) by the use of a second light flux having a wavelength $\lambda_2$ ($\lambda_2 > \lambda_1$) (nm) emitted from a first light source, the optical pickup device comprises the optical element described in Item 1-1.

The embodiment described in Item 1-33 makes it possible to obtain an optical pickup device having the same effect as that in any one of Items 1-1 through 1-32.

An embodiment described in Item 1-34 is represented by the optical pickup device described in Item 1-33, wherein the optical pickup device further conducts reproducing and/or recording information for a second disk including a protective substrate having a thickness $t_3$ ($t_3 \geq t_2$) by the use of a second light flux having a wavelength $\lambda_3$ ($\lambda_3 > \lambda_2$) (nm) emitted from a first light source, and the third light flux comes in the optical element on a state of a divergent light flux.

In order to provide compatibility even for the third optical disk (CD), it is preferable to cause the third light flux to enter the optical element as a divergent light flux as in the embodiment in Item 1-36. Due to this, a working distance for CD having a thick protective layer can be secured sufficiently.

The embodiment described in Item 1-35 includes the optical pickup device described in Item 1-33 or Item 1-34, so as to conduct at least one of recording information for an optical disk and reproducing information for an optical disk.

According to the embodiment of Item 1-35, an optical information recording reproducing device having a same effect to the embodiment of Item 1-33 or Item 1-34 can be provided.

An embodiment described in Item 1-36 is an optical element for use in an optical pickup device to conduct reproducing and/or recording information for a first disk including a protective substrate having a thickness $t_1$ by the use of a first light flux having a wavelength $\lambda_1$ (nm) emitted from a first light source and to conduct reproducing and/or recording information for a second disk including a protective substrate having a thickness $t_2$ ($t_2 \geq t_1$) by the use of a second light flux having a wavelength $\lambda 2$ ($\lambda_2 \geq \lambda_1$) (nm) emitted from a first light source, the optical element including an optical surface on which a diffractive structure is formed to generate $n_1^{th}$ order diffracted ray as a diffracted ray having the maximum diffraction efficiency when the first light flux comes in and to generate $n_2^{th}$ order diffracted ray ($|n_1| \geq |n_2|$) as a diffracted ray having the maximum diffraction efficiency when the second light flux comes in; and an optical surface on which an optical path difference providing structure including a plurality of ring-shaped zones divided with stepped sections each formed in an optical axis direction is formed.

The embodiment described in Item 1-36 makes it possible to obtain an optical element having the same effect as that of Item 1-1.

An embodiment described in Item 1-37 is represented by the optical element in Item 1-36, wherein when the wavelength of the first light flux changes within a range of ($\lambda_1 - 5$) (nm) to ($\lambda_1 + 5$) (nm), the optical path difference providing structure has a function to generate a spherical aberration in a direction reverse to the direction of a spherical aberration generated by the diffractive structure.

The embodiment described in Item 1-37 makes it possible to obtain an optical element having the same effect as that of Item 1-5.

An embodiment described in Item 1-38 is represented by the optical element in Item 1-37, wherein when $N_1$ and $N_2$ are the refractive index of the optical element for the first light flux having a wavelength $\lambda_1$ and the second light flux having a wavelength $\lambda_2$ respectively and INT(X) is an integer closest to X, the following formulas are satisfied:

$$\text{INT}(\delta\phi_D) - \delta\phi_D < 0 \quad (1)$$

$$\delta\phi_D = \{n_1 \times \lambda_1/(N_1-1)\}/\{n_2 \times \lambda_2/(N_2-1)\} \quad (2), \text{ and}$$

wherein the diffractive structure has a spherical aberration characteristic such that when the wavelength of an incident light flux shifts to a longer wavelength side, a spherical aberration changes to be over corrected.

The embodiment described in Item 1-38 makes it possible to obtain an optical element having the same effect as that of Item 1-6.

An embodiment described in Item 1-39 is represented by the optical element in Item 1-38, wherein the diffractive structure includes a plurality of ring-shaped zones divided with stepped sections each formed in an optical axis direction and when $\Delta_D$ (μm) is a stepped section closest to the optical axis among the stepped sections, a manufacturing wavelength is $\lambda_B$ (nm) ($\lambda_B < \lambda_1$), NB is the refractive index of the optical element for the manufacturing wavelength $\lambda_B$, the following formula is satisfied:

$$\Delta_D = n_1 \times \lambda_B \times 10^{-3}/(N_B - 1) \quad (3)$$

The embodiment described in Item 1-39 makes it possible to obtain an optical element having the same effect as that of Item 1-7.

An embodiment described in Item 1-40 is represented by the optical element in Item 1-38 or Item 39, wherein the diffractive structure has a spherical aberration characteristic such that when the wavelength of the first light flux shifts to a longer wavelength side within a range of $(\lambda_1-5)$ (nm) to $(\lambda_1+5)$ (nm), a spherical aberration changes to be under corrected.

The embodiment described in Item 1-40 makes it possible to obtain an optical element having the same effect as that of Item 1-8.

An embodiment described in Item 1-41 is represented by the optical element in Item 1-37, wherein when $N_1$ and $N_2$ are the refractive index of the optical element for the first light flux having a wavelength $\lambda_1$ and the second light flux having a wavelength $\lambda_2$ respectively and INT(X) is an integer closest to X, the following formulas are satisfied:

$$\text{INT}(\delta\phi_D) - \delta\phi_D > 0 \quad (4)$$

$$\delta\phi_D = \{n_1 \times \lambda_1/(N_1-1)\}/\{n_2 \times \lambda_2/(N_2-1)\} \quad (5), \text{ and}$$

wherein the diffracive structure has a spherical aberration characteristic such that when the wavelength of an incident light flux shifts to a longer wavelength side, a spherical aberration changes to be under corrected.

The embodiment described in Item 1-41 makes it possible to obtain an optical element having the same effect as that of Item 1-9.

An embodiment described in Item 1-42 is represented by the optical element in Item 1-41, wherein the diffractive structure includes a plurality of ring-shaped zones divided with stepped sections each formed in an optical axis direction and when $\Delta_D$ (μm) is a stepped section closest to the optical axis among the stepped sections, a manufacturing wavelength is $\lambda_B$ (nm) ($\lambda_1 < \lambda_B < \lambda_2$), $N_B$ is the refractive index of the optical element for the manufacturing wavelength $\lambda_B$, the following formula is satisfied:

$$\Delta_D = n_1 \times \lambda_B \times 10^{-3}/(N_B - 1) \quad (6)$$

The embodiment described in Item 1-42 makes it possible to obtain an optical element having the same effect as that of Item 1-10.

An embodiment described in Item 1-43 is represented by the optical element in any one of Item 1-41 or Item 1-42, wherein the optical path difference providing structure has a spherical aberration characteristic such that when the wavelength of the first light flux shifts to a longer wavelength side within a range of $(\lambda_1-5)$ (nm) to $(\lambda_1+5)$ (nm), a spherical aberration changes to be over corrected.

The embodiment described in Item 1-43 makes it possible to obtain an optical element having the same effect as that of Item 1-11.

An embodiment described in Item 1-44 is represented by the optical element in one of Items 1-36 through 1-43, wherein the optical path difference providing structure is formed on an aspherical surface formed such that as the position of an optical path on the aspherical surface is distant more from the optical axis, the length of the optical path becomes longer.

The embodiment described in Item 1-44 makes it possible to obtain an optical element having the same effect as that of Item 1-12.

An embodiment described in Item 1-45 is represented by the optical element in one of Items 1-36 through 1-44, wherein on the optical surface on which the optical path difference providing structure is formed, the diffractive structure is formed within at least a range of 0% to 70% of the maximum effective diameter of the optical surface and the diffractive structure is not formed within at least a range of 85% to 100% of the maximum effective diameter.

The embodiment described in Item 1-45 makes it possible to obtain an optical element having the same effect as that of Item 1-14.

An embodiment described in Item 1-46 is represented by the optical element in Item 1-36, wherein the optical element is made of a material whose refractive index for the first light flux having a wavelength $\lambda_1$ is within a range of 1.5 to 1.6 and Abbe constant for d-line (587.6 nm) is within a range of 50 to 60 and the diffractive structure includes a predetermined number of ring-shaped zones divided with stepped sections each formed in an optical axis direction, and a stepped section $\Delta_D$ (μm) closest to the optical axis among the stepped-sections satisfies one of the following formulas:

$$1.25 < \Delta_D < 1.65 \quad (8)$$

$$2.05 < \Delta_D < 2.55 \quad (9)$$

$$3.40 < \Delta_D < 4.10 \quad (10)$$

$$5.70 < \Delta_D < 6.45 \quad (11)$$

$$7.00 < \Delta_D < 8.00 \quad (12)$$

The embodiment described in Item 1-46 makes it possible to obtain an optical element having the same effect as that of Item 1-20.

An embodiment described in Item 1-47 is represented by the optical element in one of Items 1-36 through 1-46, wherein when $\lambda_1$ is within a range of 350 nm to 450 nm, $\lambda_2$ is within a range of 600 nm to 700 nm, the optical element is made of a material whose refractive index for the first light flux having a wavelength $\lambda_1$ is within a range of 1.5 to 1.6 and Abbe constant for d-line (587.6 nm) is within a range of 50 to 60, $\Delta_P$ (μm) is a stepped section closest to the optical axis among the stepped sections in the optical path difference providing structure, $N_1$ and $N_2$ are the refractive index of the optical element for the first light flux having a wavelength $\lambda_1$ and the second light flux having a wavelength $\lambda_2$ respectively and INT(X) is an integer closest to X and p is a positive integer, the following formulas are satisfied:

$$\phi_{1P}=\Delta_P\times(N_1-1)/(\lambda_1\times10^{-3}) \qquad (15)$$

$$\phi_{2P}=\Delta_P\times(N_2-1)/(\lambda_2\times10^{-3}) \qquad (16)$$

$$\mathrm{INT}(\phi_{1P})=5p \qquad (17)$$

$$\mathrm{INT}(\phi_{2P})=3p \qquad (18)$$

The embodiment described in Item 1-47 makes it possible to obtain an optical element having the same effect as that of Item 1-22.

An embodiment described in Item 1-48 is represented by the optical element in Item 1-36 through 1-47, wherein the diffractive structure generates a $n_3^{th}$ order diffracted ray ($|n_2|\geq|n_3|$) when the third light flux comes in.

The embodiment described in Item 1-48 makes it possible to obtain an optical element having the same effect as that of Item 1-23.

An embodiment described in Item 1-49 is represented by the optical element in Item 1-48, wherein $\lambda_1$ is within a range of 350 nm to 450 nM, $\lambda_2$ is within a range of 600 nm to 700 nm, $\lambda_3$ is within a range of 700 nm to 850 nm, and a combination ($n_1$, $n_2$, $n_3$) of $n_1$, $n_2$ and $n_3$ satisfies the following formula:

$$(n_1, n_2, n_3)=(2, 1, 1), (8, 5, 4), \text{ or } (10, 6, 5)$$

The embodiment described in Item 1-49 makes it possible to obtain an optical element having the same effect as that of Item 1-24.

An embodiment described in Item 1-50 is represented by the optical element in Item 1-49, wherein the optical element is made of a material whose refractive index for the first light flux having a wavelength $\lambda_1$ is within a range of 1.5 to 1.6 and Abbe constant for d-line (587.6 nm) is within a range of 50 to 60 and the diffractive structure includes a predetermined number of ring-shaped zones divided with stepped sections each formed in an optical axis direction, and a stepped section $\Delta_D$ (μm) closest to the optical axis among the stepped sections satisfies one of the following formulas:

$$1.25<\Delta_D<1.65 \qquad (19)$$

$$5.70<\Delta_D<6.45 \qquad (20)$$

$$7.00<\Delta_D<8.00 \qquad (21)$$

The embodiment described in Item 1-50 makes it possible to obtain an optical element having the same effect as that of Item 1-25.

An embodiment described in Item 1-51 is represented by the optical element in any one of Items 1-48 through 1-50, wherein when $\Delta_P$ (μm) is a stepped section closest to the optical axis among the stepped sections in the optical path difference providing structure, $N_1$, $N_2$ and $N_3$ are the refractive index of the optical element for the first light flux having a wavelength $\lambda_1$, the second light flux having a wavelength $\lambda_2$ and the third light flux having a wavelength $\lambda_3$ respectively and INT(X) is an integer closest to X, the following formula satisfies the following formulas:

$$0\leq|\mathrm{INT}(\phi_{1P})-\phi_{1P}|\leq0.4 \qquad (22)$$

$$0\leq|\mathrm{INT}(\phi_{2P})-\phi_{2P}|\leq0.4 \qquad (23)$$

$$0\leq|\mathrm{INT}(\phi_{3P})-\phi_{3P}|\leq0.4 \qquad (24)$$

$$\phi_{1P}=\Delta_P\times(N_1-1)/(\lambda_1\times10^{-3}) \qquad (25)$$

$$\phi_{2P}=\Delta_P\times(N_2-1)/(\lambda_2\times10^{-3}) \qquad (26)$$

$$\phi_{3P}=\Delta_P\times(N_3-1)/(\lambda_3\times10^{-3}) \qquad (27)$$

The embodiment described in Item 1-51 makes it possible to obtain an optical element having the same effect as that of Item 1-26.

An embodiment described in Item 1-52 is represented by the optical element in Item 1-51, wherein when $\lambda_1$ is within a range of 350 nm to 450 nm, $\lambda_2$ is within a range of 600 nm to 700 nm, $\lambda_3$ is within a range of 700 nm to 850 nm, the optical element is made of a material whose refractive index for the first light flux having a wavelength $\lambda_1$ is within a range of 1.5 to 1.6 and Abbe constant for d-line (587.6 nm) is within a range of 50 to 60 and p is a positive integer, the following formulas are satisfied:

$$\mathrm{INT}(\phi_{1P})=10p \qquad (28)$$

$$\mathrm{INT}(\phi_{2P})=6p \qquad (29)$$

$$\mathrm{INT}(\phi_{3P})=5p \qquad (30)$$

The embodiment described in Item 1-52 makes it possible to obtain an optical element having the same effect as that of Item 1-27.

An embodiment described in Item 1-53 is represented by the optical element in any one of Items 1-36 through 1-52, wherein the optical element is a plastic lens.

The embodiment described in Item 1-53 makes it possible to obtain an optical element having the same effect as that of Item 1-29.

An embodiment described in Item 1-54 is an optical pickup device to conduct reproducing and/or recording information for a first disk including a protective substrate having a thickness $t_1$ by the use of a first light flux having a wavelength $\lambda_1$ (nm) emitted from a first light source and to conduct reproducing and/or recording information for a second disk including a protective substrate having a thickness $t_2$ ($t_2\geq t_1$) by the use of a second light flux having a wavelength $\lambda_2$ ($\lambda_2>\lambda_1$) (nm) emitted from a first light source, the optical pickup device comprises the optical element described in claim 36 and the third light flux comes in the optical element on a state of a divergent light flux.

The embodiment described in Item 1-54 makes it possible to obtain an optical pickup device having the same effect as that of Item 1-33.

Then, another preferred embodiments of the invention will be explained below.

To solve the problems stated above, the embodiment described in Item 2-1 has at least one optical surface on which a diffractive structure that generates $n_1^{th}$ order diffracted light when the first light flux with wavelength $\lambda_1$ (nm) enters and generates $n_2^{th}$ order diffracted light ($|n_1|\geq|n_2|$) when the second light flux with wavelength $\lambda_2$ (nm) ($\lambda_2>\lambda_1$) enters is formed, and at least one optical surface on which an optical path difference providing structure that is composed of plural ring-shaped zones formed by division by steps in the optical axis direction is formed.

In the embodiment described in Item 2-2, the optical path difference providing structure in the optical element described in the Item 2-1 has a function to control a change to be small for spherical aberration that is generated at the diffractive structure when the wavelength of the first light flux is changed within a range from $\lambda_1-5$ (nm) to $\lambda_1+5$ (nm).

The embodiments described in Item 2-1 through Item 2-2 make it possible to correct spherical aberration caused by actions of the diffractive structure and by a difference of protective layer thickness between a high density disk of 0.1 mm standard and DVD, to correct spherical aberration caused by wavelength dispersion in an objective optical system between a violet wavelength area and a red wavelength area, and to control fluctuations of focus positions for the microscopic change of a wavelength in the violet wavelength area to be small. However, with respect to the diffractive structure, a wavelength dependency of spherical aberration is great, and therefore, a change of spherical aberration for the wavelength change of about ±5 nm grows greater. Since the amount of change of spherical aberration of this kind grows greater in proportion to $NA^4$, a tolerance for an oscillation wavelength of a violet laser light source becomes severe in the high density disk of 0.1 mm standard that uses an objective optical system with NA of 0.85. In the optical element in the invention, therefore, a tolerance for an oscillation wavelength of a violet laser light source is eased by employing the structure wherein the optical path difference providing structure controls spherical aberration changes to be small for wavelength changes of about ±5 nm for a light flux of incidence. Due to this, the yield in mass production of violet laser light sources can be improved and manufacturing cost for violet laser light sources and optical pickup device can be reduced.

An embodiment described in Item 2-3 is represented by the optical element described in Item 2-1 or Item 2-2, wherein the following expressions are satisfied when $N_1$ and $N_2$ represent refractive indexes of the optical element respectively for the first light flux with wavelength $\lambda_1$ and the second light flux with wavelength $\lambda_2$, and when $INT(X)$ is made to be an integer closest to X, $$INT(\delta\Phi_D)-\delta\Phi_D<0 \quad (1)$$

$$\delta\Phi_D=\{n_1\times\lambda_1/(N_1-1)\}/\{n_2\times\lambda_2/(N_2-1)\} \quad (2)$$

and the diffractive structure has spherical aberration characteristics in which the spherical aberration is changed in the direction of excessive correction when a wavelength of a light flux of incidence is shifted toward the long wavelength side.

An embodiment described in Item 2-4 is represented by the optical element described in Item 2-3, wherein the following expression (3) is satisfied substantially when the diffractive structure is composed of a plurality of ring-shaped zones divided by steps in the optical axial direction, and when $\Delta_D$ (μm) represents the step closest to the optical axis among the aforesaid steps, $\lambda_B$ (nm) represents a prescribed wavelength that is shorter than the aforementioned wavelength $\lambda_1$ and $N_B$ represents the refractive index of the optical element for the wavelength $\lambda_B$ respectively.

$$\Delta_D=n_1\times\lambda_B\times10^{-3}/(N_B-1) \quad (3)$$

An embodiment described in Item 2-5 is represented by the optical element described in Item 2-3 or Item 2-4, wherein the optical path difference providing structure has spherical aberration characteristics in which the spherical aberration is changed in the direction of insufficient correction when a wavelength of a light flux of incidence is shifted toward the long wavelength side within a range from $\lambda_1-5$ (nm) to $\lambda_1+5$ (nm).

Wavelength-dependency of the spherical aberration that is caused by the diffractive structure is utilized for correcting the spherical aberration resulting from a difference of protective layer thickness between a high density disk in 0.1 mm standard and DVD, and the spherical aberration resulting from the wavelength dispersion of the objective optical system existing between a violet wavelength area and a red wavelength area. In this case, when expressions (1) and (2) representing relationships hold between wavelength $\lambda_1$ and diffraction order number $n_1$ of a beam for recording/reproducing for high density optical disk and wavelength $\lambda_2$ and diffraction order number $n_2$ of a beam for recording/reproducing for DVD, as in the embodiment in Item 2-3, it is preferable to make the diffractive structure to have spherical aberration characteristics in which the spherical aberration is changed in the direction of excessive correction when a wavelength of a light flux of incidence is shifted toward the long wavelength side.

In this case, it is preferable that manufacturing wavelength (which is also called a blaze wavelength) $\lambda_B$ Of the diffractive structure is a prescribed wavelength that is shorter than $\lambda 1$, as in the embodiment in Item 2-4, which makes it possible to maintain high diffraction efficiency at the wavelength region for each optical disk. Specifically it is preferable that the step closest to the optical axis among steps in the optical axis direction of the diffractive structure in the optical axis direction $\lambda_D$ (μm) satisfies the expression (3).

It is preferable to offset spherical aberration characteristics of the diffractive structure, by giving to the optical path difference providing structure the spherical aberration characteristics in which the spherical aberration is changed in the direction of insufficient correction when a wavelength of a light flux of incidence is shifted toward the long wavelength side within a range from $\lambda 1-5$ (nm) to $\lambda 1+5$ (nm), as in the embodiment in Item 2-5. Due to this, a tolerance for an oscillation wavelength of a violet laser light source can be eased.

An embodiment described in Item 2-6 is represented by the optical element described in Item 2-1 or Item 2-2, wherein the following expressions are satisfied when refractive indexes of the optical element respectively for the first light flux with wavelength $\lambda_1$ and the second light flux with wavelength $\lambda_2$ are represented respectively by $N_1$ and $N_2$ and when $INT(X)$ is made to be an integer closest to X, $$INT(\delta\Phi_D)-\delta\Phi_D>0 \quad (4)$$

$$\delta\Phi_D=\{n_1\times\lambda_1/(N_1-1)\}/\{n_2\times\lambda_2/(N_2-1)\} \quad (5)$$

and the diffractive structure has spherical aberration characteristics in which the spherical aberration is changed in the direction of insufficient correction when a wavelength of a light flux of incidence is shifted toward the long wavelength side.

An embodiment described in Item 2-7 is represented by the optical element described in Item 2-6, wherein the following expression (6) is satisfied substantially when the diffractive structure is composed of a plurality of ring-shaped zones divided by steps in the optical axial direction, and when $\Delta_D$ (μm) represents the step closest to the optical axis among the aforesaid steps, $\lambda_B$ (nm) represents a prescribed wavelength within a range from $\lambda_1$ to $\lambda_2$ and $N_B$ represents the refractive index of the optical element for the wavelength $\lambda_B$ respectively.

$$\Delta_D=n_1\times\lambda_B\times10^{-3}/(N_B-1) \quad (6)$$

In the embodiment described in Item 2-8, the optical path difference providing structure has spherical aberration characteristics in which the spherical aberration is changed in the direction of excessive correction when a wavelength of a light flux of incidence is shifted toward the long wavelength side within a range from $\lambda_1-5$ (nm) to $\lambda_1+5$ (nm), in the optical element described in Item 2-6 or Item 2-7.

Wavelength-dependency of the spherical aberration that is caused by the diffractive structure is utilized for correcting the spherical aberration resulting from a difference of protective layer thickness between a high density disk in 0.1 mm standard and DVD, and the spherical aberration resulting from the wavelength dispersion of the objective optical system existing between a violet wavelength area and a red wavelength area. In this case, when expressions (4) and (5) representing relationships hold between wavelength $\lambda_1$ and diffraction order number $n_1$ of a beam for recording/reproducing for high density optical disk and wavelength $\lambda_2$ and diffraction order number $n_2$ of a beam for recording/reproducing for DVD, as in the embodiment in Item 2-6, it is preferable to make the diffractive structure to have spherical aberration characteristics in which the spherical aberration is changed in the direction of insufficient correction when a wavelength of a light flux of incidence is shifted toward the long wavelength side.

In this case, it is preferable that manufacturing wavelength (which is also called a blaze wavelength) $\lambda_B$ of the diffractive structure is a prescribed wavelength that is in a range from $\lambda_1$ to $\lambda_2$ as in the embodiment in Item 2-7, which makes it possible to maintain high diffraction efficiency at the wavelength region for each optical disk. This is synonymous with an occasion wherein the following expression (6) is satisfied when $\Delta_D$ (μm) represents the step closest to the optical axis among steps in the optical axis direction of the diffractive structure in the optical axis direction, and $N_B$ represents the refractive index of the optical element for the wavelength $\lambda_B$ respectively.

$$\Delta_D = n_1 \times \lambda_B \times 10^{-3}/(N_B-1) \quad (6)$$

It is preferable to offset spherical aberration characteristics of the diffractive structure, by giving to the optical path difference providing structure the spherical aberration characteristics in which the spherical aberration is changed in the direction of excessive correction when a wavelength of a light flux of incidence is shifted toward the long wavelength side within a range from $\lambda_1-5$ (nm) to $\lambda_1+5$ (nm), as in the embodiment in Item 2-5. Due to this, a tolerance for an oscillation wavelength of a violet laser light source can be eased.

An embodiment described in Item 2-9 is represented by the optical element described in any one of Items 2-1 through 2-8, wherein the optical element stated above has an aspheric surface within a range of height of at least 0%-75% of the maximum effective diameter.

In the embodiment described in Item 2-10, the diffractive structure stated above is formed on the aspheric surface in the optical element described in Item 2-9.

As in the embodiment described in Item 2-9, it is preferable that an optical element on which a diffractive structure is formed has an aspheric surface whose optical path length is longer as it is farther away from the optical axis, within a range of height of at least 0%-75% of the maximum effective diameter. Owing to this, the spherical aberration resulting from a difference of protective layer thickness between a high density optical disk in 0.1 mm standard and DVD, and the spherical aberration resulting from the wavelength dispersion of the objective optical system existing between a violet wavelength area and a red wavelength area can be corrected properly, by combining actions of the aspheric surface and actions of the diffractive structure.

In addition, it is most preferable that a diffractive structure is formed on such aspheric surface as in the embodiment described in Item 2-10, for exhibiting the maximum correcting effect for the spherical aberration.

Incidentally, "the maximum effective diameter" mentioned here means an effective diameter of an optical element for the first light source with wavelength $\lambda_1$.

In the embodiment described in Item 2-11, when an addition amount of an optical path length by the diffractive structure is defined with the following expression (7) by the use of optical path difference function coefficients $B_2$, $B_4$, $B_6$, $B_8$, $B_{10}$ ... and diffraction order number n, in the optical element described in any one of Items 2-1 through 2-10, the sign for $B_2$ and sign for $B_4$ are different each other.

$$\Phi_b = n \times (B_2 h^2 + B_4 h^4 + B_6 h^6 + B_8 h^8 + B_{10} h^{10} + \ldots) \quad (7)$$

The embodiment described in Item 2-11 represents conditions for controlling a loss of an amount of light caused by an error in a form of the diffractive structure to be small, by preventing a width of a ring-shaped zone of the diffractive structure from becoming too small, and thereby, by making it easy to process a die. It is possible to increase an amount of change of h per unit amount of change of optical path difference function $\Phi_b$, by making a sign of second order optical path difference function coefficient and a sign of fourth order optical path difference function coefficient $B_4$ to be different each other. This corresponds to that a width of a ring-shaped zone of the diffractive structure grows greater, resulting in achievement of easy processing of a die and of control of a loss in an amount of light. For further achievement of these effects, it is preferable to establish sizes of $B_2$ and $B_4$ so that optical path difference function $\Phi_b$ may have an inflection point. It is further possible to secure a working distance of DVD to be large by establishing signs of $B_2$ and $B_4$ to be different each other.

An embodiment described in Item 2-12 is represented by the optical element described in any one of Items 2-1 through 2-11, wherein on the optical surface on which the diffractive structure is formed, the diffractive structure is formed within a range of height of at least 0%-75% of the maximum effective diameter, and the diffractive structure is not formed in a range from a height of at least 85% of the maximum effective diameter to a height of 100% of the maximum effective diameter.

In the embodiment described in Item 2-12, the spherical aberration caused by a difference of protective layer thickness between a high density disk in 0.1 mm standard and DVD is corrected by the action of the diffractive structure only within NA necessary for recording/reproducing for DVD, and therefore, a spot on the information recording surface of DVD is not narrowed down more than necessary, and thereby, an amount of comatic aberration-caused by a tilt of DVD does not become too great. The second light flux passing through an area outside NA of DVD has spherical aberration caused by a difference of protective layer thickness between the high density disk and DVD, to become flare components which do not contribute to formation of a spot on the information recording surface of DVD. Since this is equivalent to that the optical element itself has a function to restrict an aperture for DVD, an optical pickup device equipped with an optical element of the invention does not need to be provided separately with a diaphragm corresponding to NA of DVD, and its structure can be simple.

An embodiment described in Item 2-13 is represented by the optical element described in Item 2-12, wherein the optical path difference providing structure is formed within a range of height of at least 0%-75% of the maximum effective diameter, and the optical path difference providing structure is not formed in a range from a height of at least 85% of the maximum effective diameter to a height of 100% of the maximum effective diameter.

In the case of the structure described in Item 2-12, wavelength-dependency of spherical aberration of the diffractive structure has only to be offset within NA necessary for recording/reproducing for DVD, and therefore, it is preferable to form an optical path difference providing structure only within NA of DVD as the embodiment of Item 2-13. Further, it is preferable to determine the optical path difference providing structure so that a phase of wavefront for the first light flux passing through an area outside NA of DVD and that for the first light flux passing through an area within NA of DVD may be aligned in the wavelength area in at least a range from $\lambda_1-5$ (nm) to $\lambda_1+5$ (nm).

Incidentally, "maximum effective diameter" mentioned here means an effective diameter of the optical element for the first light flux with wavelength $\lambda_1$.

An embodiment described in Item 2-14 is represented by the optical element described in Item 2-5 or Item 2-8, wherein the optical path difference providing structure does not give an optical path difference to the first light flux with wavelength $\lambda 1$, and it adds an optical path difference to the first light fluxes respectively with wavelength $\lambda_1+5$ (nm) and wavelength $\lambda_1-5$ (nm).

The optical path difference providing structure is preferably the structure that does not give an optical path difference substantially to $\lambda_1$ representing a design wavelength of the optical element as in the embodiment in Item 2-14, but gives an optical path difference to wavelength $\lambda_1+5$ (nm) and wavelength $\lambda_1-5$ (nm), which makes it possible to conduct properly an offset of wavelength-dependency of spherical aberration caused by the diffractive structure. Specifically, it is preferable to determine the step $\Delta_p$ (μm) closest to the optical axis in the optical path difference providing structure so that the following expression is satisfied;

$$\Delta_p = m \times \lambda_1 \times 10^{-3}/(N_1-1)$$

wherein, m represents a positive integer and $N_1$ represents refractive index of the optical element for the light flux with wavelength $\lambda_1$.

An embodiment described in Item 2-15 is represented by the optical element described in any one of Items 2-1 through 2-14 wherein the ring-shaped zones of the optical path difference providing structure change aperiodically in terms their widths. This "aperiodic change" means, in this case, that the width is not expressed by a function of height h from the optical axis.

An embodiment described in Item 2-16 is represented by the optical element described in any one of Items 2-1-2-15, wherein the steps of the optical path difference providing structure change places in terms of directions within an effective diameter.

An embodiment described in Item 2-17 is represented by the optical element described in any one of Items 2-1 through 2-15, wherein the steps of the optical path difference providing structure are entirely the same in terms of directions within an effective diameter.

In design of the optical path difference providing structure, a width of each ring-shaped zone and the direction of the step depend on a wavefront form which is to be corrected by the optical path difference providing structure. A specific structure of the optical path difference structure may also be one wherein a width of each ring-shaped zone changes aperiodically as in the embodiment of Item 2-15. Further, the specific-structure may be either one wherein the direction of the step changes places within the effective diameter as in the embodiment of Item 2-16 or one wherein the steps are entirely the same in terms of directions within an effective diameter as in the embodiment of Item 2-17.

Incidentally, "effective diameter" mentioned here means the effective diameter of the optical element for the first light flux with wavelength $\lambda_1$.

An embodiment described in Item 2-18 is represented by the optical element described in any one of Items 2-1 through 2-17 wherein $|\lambda 2-\lambda 1|$ greater than 50 nm and $|n_1|>|n_2|$ is satisfied.

In the embodiment described in Item 2-18, when a difference between $\lambda_2$ and $\lambda_1$ is greater than 50 nm, it is possible to maintain high efficiency of diffraction in a wavelength region for each optical disk, by using the diffracted light whose diffraction order is lower than that of a beam for recording/reproducing for the high density optical disk, as a beam for recording/reproducing for DVD. Since the wavelength-dependency of the spherical aberration is great for the diffractive structure determined to use diffracted light having different order number as a beam for recording/reproducing for each optical disk, compared with an occasion to use the diffracted light with the same order number, as stated above, a tolerance for an oscillation wavelength of a violet laser light source becomes extremely severe. In the optical element of the invention, however, a tolerance for an oscillation wavelength of a violet laser light source can be eased by employing the structure wherein the optical path difference providing structure controls spherical aberration changes to be small for wavelength changes of about ±5 nm for a light flux of incidence.

An embodiment described in Item 2-19 is represented by the optical element described in Item 2-18, wherein the $\lambda_1$ is in a range of 350 nm-450 nm, the $\lambda_2$ is in a range of 600 nm-700 nm, and the combination of the $n_1$ and $n_2$ is any one of $(n_1, n_2)=(2, 1), (3, 2), (5, 3), (8, 5), (10, 6)$.

When $\lambda_1$ represents a wavelength within a range of 350 nm-450 nm representing a violet wavelength area and $\lambda_2$ represents a wavelength within a range of 600 nm-700 nm representing a red wavelength area as in the embodiment described in Item 2-19, it is preferable that the specific combination of diffraction order numbers $n_1$ and $n_2$ is any one of $(n_1, n_2)=(2, 1), (3, 2), (5, 3), (8, 5), (10, 6)$, and a selection of this combination makes it possible to maintain high diffraction efficiency in a wavelength region for each optical disk. Further, even in the case where diffraction order number $n_1$ becomes greater than 10, there is present a combination of diffraction -order numbers which can maintain high diffraction efficiency at a wavelength region for each optical disk. However, if the diffraction order number $n_1$ is made to be smaller than 10, diffraction efficiency fluctuations do not become too large for the wavelength changes of about ±5 (nm) from $\lambda_1$, which is preferable.

An embodiment described in Item 2-20 is represented by the optical element described in Item 2-19, wherein the optical element is formed by a material wherein the refractive index for the first light flux with wavelength $\lambda_1$ is within a range of 1.5-1.6, and Abbe's number for d line (587.6 nm) is in a range of 50-60, the diffractive structure is composed of-ring-shaped zones in a prescribed quantity divided by steps- in the optical axis direction, and step $\Delta_D$ (μm) closest to the optical axis among the aforesaid steps satisfies any one of the following expressions (8)-(12).

$$1.25 < \Delta_D < 1.65 \qquad (8)$$

$$2.05 < \Delta_D < 2.55 \qquad (9)$$

$$3.40 < \Delta_D < 4.10 \qquad (10)$$

$$5.70 < \Delta_D < 6.45 \qquad (11)$$

$$7.00 < \Delta_D < 8.00 \qquad (12)$$

It is preferable that the embodiment described in Item 2-20 relates to the more specific structure of the diffractive structure in the aforesaid combination of the diffraction order numbers, and the step $\Delta_D$ (μm) closest to the optical axis in the diffractive structure satisfies the expressions (8)-(12). The combination $(n_1, n_2)=(2, 1)$ corresponds to expression (8), $(n_1, n_2)=(3, 2)$ corresponds to expression (9), $(n_1, n_2)=(5, 3)$ corresponds to expression (10), $(n_1, n_2)=(8, 5)$ corresponds to expression (11), and $(n_1, n_2)=(10, 6)$ corresponds to expression (12). Incidentally, for manufacturing an optical element having a diffractive structure like the optical element of the invention with a high precision, a plastic lens excellent in transferability is preferable. In most plastic materials usable in a violet wavelength area, the refractive index for the first light flux with wavelength $\lambda_1$ is in a range of 1.5-1.6 and Abbe's number for d line is in a range of 50-60.

An embodiment described in Item 2-21 is represented by the optical element described in any one of Items 2-18 through 2-20, wherein the following expressions (13)-(16) are satisfied when $\Delta_p$ (μm) represents the step closest to the optical axis among the aforesaid steps of the optical path difference providing structure, $N_1$ and $N_2$ represent respectively refractive indexes of the optical element respectively for the first light flux with wavelength $\lambda_1$ and the second light flux with wavelength $\lambda_2$ and INT(X) represents an integer closest to X.

$$0 \leq |INT(\Phi_{1P}) - \Phi_{1P}| \leq 0.4 \quad (13)$$

$$0 \leq |INT(\Phi_{2P}) - \Phi_{2P}| \leq 0.4 \quad (14)$$

$$\Phi_{1P} = \Delta_P \times (N_1 - 1)/(\lambda_1 \times 10^{-3}) \quad (15)$$

$$\Phi_{2P} = \Delta_P \times (N_2 - 1)/(\lambda_2 \times 10^{-3}) \quad (16)$$

When determining the step $\Delta_P$ (μm) closest to the optical axis of the optical path difference providing structure, it is preferable that neither design wavelength $\lambda_1$ on the high density optical disk side nor design wavelength $\lambda_2$ on the DVD side is given a substantial optical path difference. Due to this, characteristics of the optical element for $\lambda_2$ in the invention can be made excellent. Specifically, it is preferable to determine $\lambda_P$ (μm) so that the expressions (13)-(16) may be satisfied, as in the embodiment of Item 2-21.

An embodiment described in Item 2-22 is represented by the optical element described in Item 2-21, wherein the following expressions (17) and (18) are satisfied when $\lambda_1$ is within a range of 350 nm-450 nm, $\lambda_2$ is within a range of 600 nm-700 nm, the optical element is made of a material in which the refractive index for the first light flux with wavelength $\lambda_1$ is within a range of 1.5-1.6, and Abbe's number for d line (587.6 nm) is in a range of 50-60, and p represents a positive integer.

$$INT(\Phi_{1P}) = 5p \quad (17)$$

$$INT(\Phi_{2P}) = 3p \quad (18)$$

The embodiment described in Item 2-22 relates to the structure that is more specific in the case where neither design wavelength $o_1$ on the high density optical disk side nor design wavelength $\lambda_2$ on the DVD side is given a substantial optical path difference by the optical path difference providing structure, and it is preferable that $\Delta_P$ (μm) satisfies expressions (17) and (18). Incidentally, for manufacturing an optical element having an optical path difference providing structure like the optical element of the invention with a high precision, a plastic lens excellent in transferability is preferable. In most plastic materials usable in a violet wavelength area, the refractive index for the first light flux with wavelength $\lambda_1$ is in a range of 1.5-1.6 and Abbe's number for d line is in a range of 50-60.

An embodiment described in Item 2-23 is represented by the optical element described in any one of Items 2-1 through 2-22, wherein the diffractive structure generates $n_3^{th}$ order ($|n_2| \geq |n_3|$) diffracted light, when the third light flux with wavelength $\lambda_3$ (nm) ($\lambda_3 > \lambda_2$) enters.

An embodiment described in Item 2-24 is represented by the optical element described in Item 2-23, wherein each of $|\lambda_2 - \lambda_1|$, $|\lambda_3 - \lambda_2|$ and $|\lambda_3 - \lambda_1|$ is greater than 50 nm and satisfies, $|n_1| > |n_2| \geq |n_3|$.

In the embodiments described in Items 2-23 and 2-24, when each of the difference between $\lambda_2$ and $\lambda_1$, the difference between $\lambda_3$ and $\lambda_2$ and the difference between $\lambda_3$ and $\lambda_1$ is greater than 50 nm, it is possible to maintain the high diffraction efficiency in the wavelength region for each optical disk, by using the diffracted light with the order number lower the beam for recording/reproducing for the high density disk as the beam for recording/reproducing for DVD, and by using the diffracted light with the order number that is the same as or lower than the beam for recording/reproducing for DVD as the beam for recording/reproducing for CD. In the diffractive structure determined to use the diffracted light having the different order number as a beam for recording/reproducing for each optical disk of at lease high density optical disk and DVD as stated above, the wavelength-dependency of the spherical aberration is great compared with an occasion to use the diffracted light with the same order number, and a tolerance for the oscillation wavelength of the violet laser light source becomes to be extremely severe accordingly. However, in the optical element in the invention, a tolerance for oscillation wavelength of the violet laser light source can be eased, because of the structure where changes in spherical aberration for wavelength changes of about ±5 nm in the light flux of incidence in the violet wavelength area is controlled to be small by the optical path difference structure.

An embodiment described in Item 2-25 is represented by the optical element described in Item 2-24, wherein $\lambda_1$ is within a range of 350 nm-450 nm, $\lambda_2$ is within a range of 600 nm-700 nm and $\lambda_3$ is within a range of 700 nm-850 nm and a combination of $n_1$, $n_2$ and $n_3$ is any one of $(n_1, n_2, n_3)=(2, 1, 1)$ $(8, 5, 4)$ and $(10, 6, 5)$.

When $\lambda_1$ is a wavelength within a range of 350 nm-450 nm representing a violet wavelength area, $\lambda_2$ is a wavelength within a range of 600 nm-700 nm representing a red wavelength area, and $\lambda_3$ is a wavelength within a range of 700 nm-850 nm representing a infrared wavelength area, as in the embodiment described in Item 2-25, it is preferable that a specific combination of diffraction order numbers $n_1$, $n_2$ and $n_3$ is any one of $(n_1, n_2, n_3)=(2, 1, 1)$ $(8, 5, 4)$ and $(10, 6, 5)$, and a high efficiency of diffraction can be maintained in the wavelength region for each optical disk, by selecting the aforesaid combination. Further, even when the diffraction order number $n_1$ is greater than 10, a combination of diffraction order numbers which make it possible to maintain high efficiency of diffraction still exists at a wavelength region for each optical disk. In that case, however, changes in diffraction efficiency become too great for the wavelength changes of about ±5 (nm) from $\lambda_1$, which is not preferable.

An embodiment described in Item 2-26 is represented by the optical element described in Item 2-25, wherein the optical element is made of a material whose refractive index for the first light source with wavelength $\lambda_1$ is in a range of 1.5-1.6, and whose Abbe's number for d line (587.6 nm) is in a range of 50-60, the diffractive structure is composed of ring-shaped zones in a prescribed quantity divided by the steps in the optical axis direction, and step $\Delta_D$ (μm) closest to the optical axis among the aforesaid steps satisfies any one of the following expressions (19)-(21).

$$1.25 < \Delta_D < 1.65 \quad (19)$$

$$5.70 < \Delta_D < 6.45 \quad (20)$$

$$7.00 < \Delta_D < 8.00 \quad (21)$$

The embodiment described in Item 2-26 relates to the more specific structure of the diffractive structure in the combination of the diffraction order numbers and it is preferable that step $\Delta_D$ (μm) closest to the optical axis in the diffractive structure satisfies the following expressions (19)-(21). With respect to correspondence between the combination of diffraction order numbers and expressions (19) -(21), ($n_1$, $n_2$, $n_3$)=(2, 1, 1) corresponds to expression (19), ($n_1$, $n_2$, $n_3$)=(8, 5, 4) corresponds to expression (20) and ($n_1$, $n_2$, $n_3$)=(10, 6, 5) corresponds to expression (21). Incidentally, for manufacturing an optical element having a diffractive structure like the optical element of the invention with a high precision, a plastic lens excellent in transferability is preferable. In most plastic materials usable in a violet wavelength area, the refractive index for the first light flux with wavelength $\lambda_1$ is in a range of 1.5-1.6 and Abbe's number for d line is in a range of 50-60.

An embodiment described in Item 2-27 is represented by the optical element described in any one of Items 2-23 through 2-26, wherein the following expressions (22)-(27) are satisfied when $\Delta_P$ (μm) represents the step closest to the optical axis among the aforesaid steps of the optical path difference providing structure, $N_1$, $N_2$ and $N_3$ represent respectively refractive indexes of the optical element respectively for the first light flux with wavelength $\lambda_1$, the second light flux with wavelength $\lambda_2$ and the third light flux with wavelength $\lambda_3$ and INT(X) represents an integer closest to X.

$$0 \leq |INT(\Phi_{1P}) - \Phi_{1P}| \leq 0.4 \quad (22)$$

$$0 \leq |INT(\Phi_{2P}) - \Phi_{2P}| \leq 0.4 \quad (23)$$

$$0 \leq |INT(\Phi_{3P}) - \Phi_{3P}| \leq 0.4 \quad (24)$$

$$\Phi_{1P} = \Delta_P \cdot (N_1 - 1)/(\lambda_1 \times 10^{-3}) \quad (25)$$

$$\Phi_{2P} = \Delta_P \cdot (N_2 - 1)/(\lambda_2 \times 10^{-3}) \quad (26)$$

$$\Phi_{3P} = \Delta_P \cdot (N_3 - 1)/(\lambda_3 \times 10^{-3}) \quad (27)$$

When determining the step $\Delta_P$ (μm) closest to the optical axis of the optical path difference providing structure, it is preferable that none of design wavelength $\lambda_1$ on the high density optical disk side, design wavelength $\lambda_2$ on the DVD side and design wavelength $\lambda_3$ on the. CD side is given a substantial optical path difference. Due to this, characteristics of the optical element in the invention for the second and third light fluxes with wavelength $\lambda_2$ and wavelength $\lambda_3$ can be made excellent. Specifically, it is preferable to determine $\Delta_P$ (μm) so that the expressions (22)-(27) may be satisfied, as in the embodiment of Item 2-27.

An embodiment described in Item 2-28 is represented by the optical element described in Item 2-27, wherein the following expressions (28) and (30) are satisfied when $\lambda_1$ is within a range of 350 nm-450 nm, $\lambda_2$ is within a range of 600 nm-700 nm, $\lambda_3$ is within a range of 700 nm-850 nm, the optical element is made of a material in, which the refractive index for the first light flux with wavelength $\lambda_1$ is within a range of 1.5-1.6, and Abbe's number for d line (587.6 nm) is in a range of 50-60, and p represents a positive integer.

$$INT(\Phi_{1P}) = 10p \quad (28)$$

$$INT(\Phi_{2P}) = 6p \quad (29)$$

$$INT(\Phi_{3P}) = 5p \quad (30)$$

The embodiment described in Item 2-28 relates to the structure that is more specific in the case where none of design wavelength $\lambda_1$ on the high density optical disk side, design wavelength $\lambda_2$ on the DVD side and design wavelength $\lambda_3$ on the CD side is given a substantial optical path difference by the optical path difference providing structure, and it is preferable that $\Delta_P$ (μm) satisfies expressions (28) and (30). Incidentally, for manufacturing an optical element having an optical path difference providing structure like the optical element of the invention with a high precision, a plastic lens excellent in transferability is preferable. In most plastic materials usable in a violet wavelength area, the refractive index for the first light flux with wavelength Ad is in a range of 1.5-1.6 and Abbe's number for d line is in a range of 50-60.

An embodiment described in Item 2-29 is represented by the optical element described in any one of Items 2-1 through 2-28, wherein there are provided at least two constituent elements of the first constituting element on which the diffractive structure is formed and the second constituting element on which the optical path difference providing structure is formed.

As in Item 2-29, the optical element of the invention may also be composed of the first constituent element on which the diffractive structure is formed and the second constituting element on which the optical path difference providing structure is formed. By forming the diffractive structure and the optical path difference providing structure to be different constituent elements, optical performances and errors of forms of each structure can easily grasped in the course of manufacturing, which makes it easy to manufacture the optical element.

An embodiment described in Item 2-30 is represented by the optical element described in any one of Items 2-1 through 2-29, wherein the optical element is a plastic lens.

For manufacturing an optical element having a diffractive structure or an optical path difference providing structure with a high precision, like the embodiment in Item 2-30, a plastic lens excellent in transferability is preferable.

An embodiment described in Item 2-31 is represented by the optical element described in any one of Items 2-1 through 2-30, wherein there is shown a constituent element of the objective optical element used in an optical pickup device that conducts reproducing and/or recording of information for the first optical disk having $t_1$-thick protective layer by the use of the first light flux with wavelength $\lambda_1$ (nm) emitted from the first light source and conducts reproducing and/or recording of information for the second optical disk having $t_2$-thick ($t_2 \geq t_1$) protective layer by the use of the second light flux with wavelength $\lambda_2$ (nm) ($\lambda_2 > \lambda_1$) emitted from the second light source.

An embodiment described in Item 2-31 makes it possible to provide an optical pickup device having compatibility for a high density optical disk and DVD by using the optical element described in any one of Items 2-1 through 2-30 as a constituent element of an objective optical system.

An embodiment described in Item 2-32 is represented by the optical element described in Item 2-31, wherein the objective optical system is composed of an aberration correcting element and of a light converging element that converges a light flux emerging from the aberration correcting element on an information recording surface of an optical disk, and this aberration correcting-element is the aforesaid optical element.

An embodiment described in Item 2-33 is represented by the optical element described in Item 2-32, wherein each of the aberration correcting element and the light-converging element has an optical functional portion and a flange portion formed on a periphery of the optical functional portion, and the flange portion of the aberration correcting element and that of the light-converging element are formed to be capable of fixing the aberration correcting element and the light-converging element at the prescribed relative positions.

An embodiment described in Item 2-34 is represented by the optical element described in Item 2-32, wherein the aberration correcting element and the light converging element are formed to be fixed by holding members at the prescribed relative positions.

When an optical element of the invention is used as a constituent factor of the objective optical system as in the embodiment in Item 2-32, it is preferable that the optical element is arranged between the light converging element that converges a light flux emitted from a laser light source on an information recording surface of an optical disk and the laser light source. With respect to the light converging element having NA 0.85, if a diffractive structure or an optical path difference providing structure is formed on an optical surface of the light converging element, an influence of the eclipse of a ray of light by steps makes a loss of an amount of light large, because an angle formed by a normal on an aspheric surface and an optical axis grows greater. However, it is possible to control such loss of an amount of light to be small by making the optical element of the invention to be powerless.

In that case, it is preferable that the optical element and the light converging element are united solidly through the direct contact of their flanges or through separated holding members, as in the embodiment in Item 2-33 or Item 2-34. Due to this, even when the light-converging element is driven for tracking, no shifting of optical axis is not caused between the light converging element and the optical element, thus, excellent tracking characteristics can be obtained. Further, it is preferable that $d_s$ is established so that ratio $d_s/\Sigma d$ may be smaller than 1.5 when $d_s$ represents a distance between the optical element and the light-converging element on the optical axis and $\Sigma d$ represents a distance between an optical surface of the optical element on the laser light source side and an optical surface of the light-converging element on the optical disk side on the optical axis, and owing to this, weight of flange portions and holding members can be reduced, and a load for an actuator to drive the objective optical system can be lightened accordingly.

An embodiment described in Item 2-35 is an optical pickup device that conducts reproducing and/or recording of information for the first optical disk having $t_1$-thick protective layer by using the first light flux with wavelength $\lambda_1$ (nm) emitted from the first light source, and conducts reproducing and/or recording of information for the second optical disk having $t_2$-thick ($t_2 \geq t_1$) protective layer by using the second light flux with wavelength $\lambda_2$ (nm) ($\lambda_2 \geq \lambda_1$) emitted from the second light source, wherein the optical element described in any one of Items 2-1 through 2-34 is provided.

The embodiment described in Item 2-35 makes it possible to obtain an optical pickup device having the same effect as that in any one of Items 2-1 through 2-34.

An embodiment described in Item 2-36 is represented by the optical pickup device described in Item 2-35, wherein there is conducted reproducing and/or recording of information for the third optical disk having $t_3$-thick ($t_3 \geq t_2$) protective layer by using the third light flux with wavelength $\lambda_3$ (nm) ($\lambda_3 \geq \lambda_2$) emitted from the third light source, and the optical pickup device is structured so that the third light flux may enter the optical element under the state of a divergent light flux.

In order to provide compatibility even for the third optical disk (CD), it is preferable to cause the third light flux to enter the optical element as a divergent light flux as in the embodiment in Item 2-36. Due to this, a working distance-for CD having a thick protective layer can be secured sufficiently.

Carrying the optical pickup device described in Item 2-35 or Item 2-36, the embodiment described in Item 2-37 can conduct at least one of recording of information for an optical disk and reproducing of information recorded on an optical disk.

The embodiment described in Item 2-37 makes it possible to obtain an optical information recording/reproducing apparatus having the same effect as in Item 2-35 or Item 2-36.

The invention makes it possible to obtain an optical element, an optical pickup device and optical information recording/reproducing apparatus wherein an yield in mass production of laser light sources can be improved, and manufacturing cost can be reduced.

Preferred embodiments to practice the invention will be explained in detail as follows, referring to the drawings.

FIRST EMBODIMENT

Figure 1:
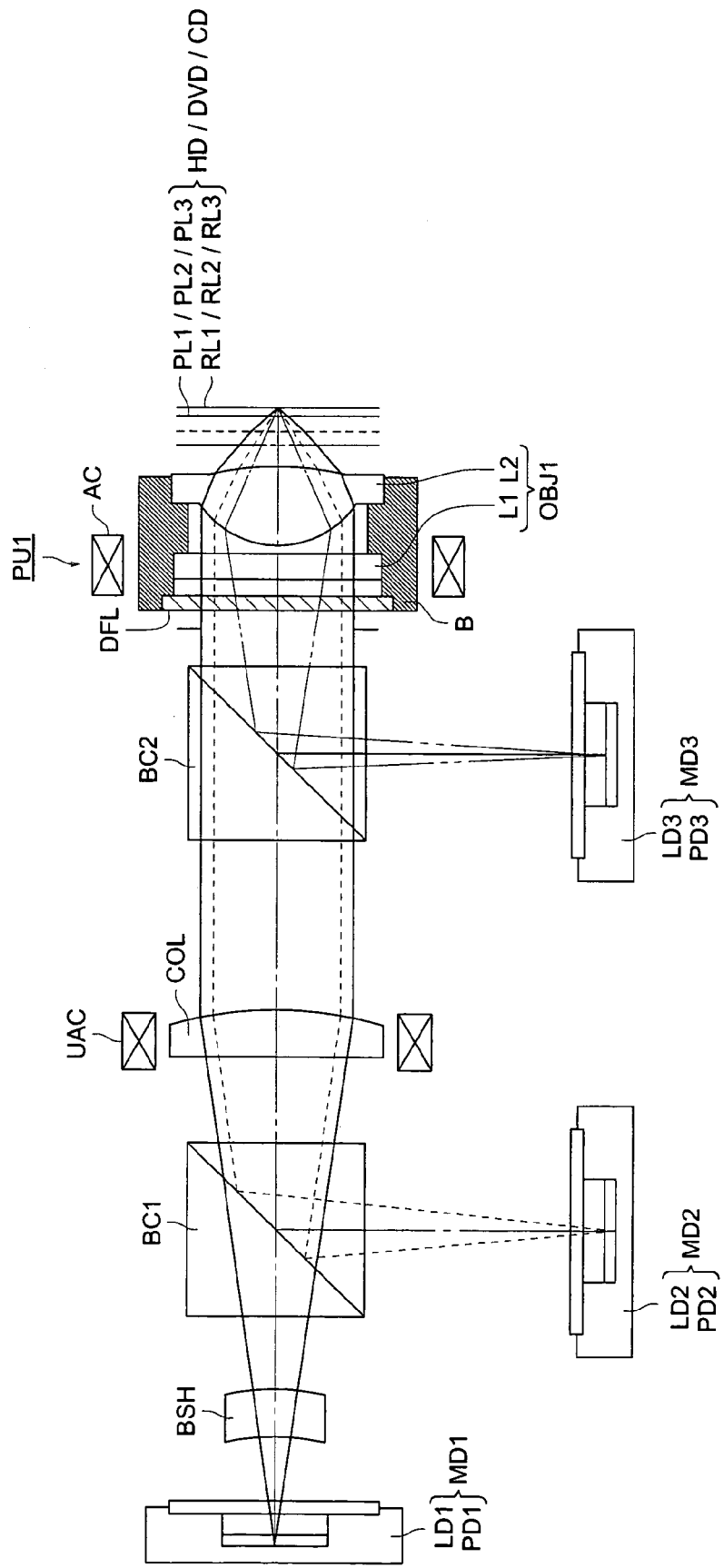
FIG. 1 is a plan view of primary portions showing the structure of an optical pickup device.

FIG. 1 is a diagram showing schematically the structure of the first optical pickup device PU1 that can conduct recording/reproducing of information properly for high density optical disk HD (first optical disk), DVD (second optical disk) and CD (third optical disk). The optical specifications of the high density optical disk HD include wavelength $\lambda_1$=405 nm, protective layer PL1 thickness $t_1$=0.1 mm and numerical aperture NA$_1$=0.85, the optical specifications of DVD include wavelength $\lambda_2$=655 nm, protective layer PL2 thickness $t_2$=0.6 mm and numerical aperture NA$_2$=0.65 and the optical specifications of CD include wavelength $\lambda_3$=785 nm, protective layer PL3 thickness $t_3$=1.2 mm and numerical aperture NA$_3$=0.45. However, the invention is not limited to the aforesaid combination of the wavelength, the thickness of a protective layer and the numerical aperture.

As shown in FIG. 1, the optical pickup device PU1 is composed of module MD1 for high density optical disk use in which violet semiconductor laser LD1 (first light source) that emits the first light flux and photodetector PD1 are united solidly, module MD2 for DVD use in which red semiconductor laser LD2 (second light source) that emits the second light flux and photodetector PD2 are united solidly, and module MD3 for CD use in which infrared semiconductor laser LD3 (third light source) that emits the third light flux and photodetector PD3 are united solidly, beam forming element BSH that forms a sectional shape of the laser light flux emitted from the violet semiconductor laser LD1 from an oval shape to a circular shape, collimating optical system COL, uniaxial actuator UAC, objective optical system OBJ1, biaxial actuator AC, first beam combiner BC1, second beam combiner BC2 and of diaphragm STO.

When conducting recording/reproducing of information for high density optical disk HD in the optical pickup device PU1, violet semiconductor laser LD1 is driven first to emit light as its light path is drawn with solid lines in FIG. 1. A divergent light flux emitted from the violet semiconductor laser LD1 passes through the beam forming element BSH to be formed therein from an oval shape to a circular shape in terms of its sectional form, then, it passes through the first beam combiner BC1 and is transmitted through the collimating optical system COL to be converted into a collimated light flux. After that, it passes through the second beam combiner BC2 in succession, and is formed on information recording surface RL1 through protective layer PL1 of the high density optical disk HD to become a spot.

Incidentally, detailed explanation of objective optical system OBJ1 will be given later.

The objective optical system OBJ1 conduct focusing and tracking through operations of biaxial actuator AC. The reflected light flux modulated on information recording surface RL1 by information pits passes again through the objective optical system OBJ1, the second beam combiner BC2, collimating optical system COL, the first beam combiner BC1 and beam forming element BSH in succession to be converged on light-receiving surface of photodetector PD1. Thus, information recorded on high density optical disk by the use of output signals of the photodetector PD1 can be read.

When conducting recording/reproducing of information for DVD, red semiconductor laser LD2 is driven first to emit light as its light path is drawn with dotted lines in FIG. 1. A divergent light flux emitted from the red semiconductor laser LD2 is reflected on the first beam combiner BC1, then, is transmitted through the collimating optical system COL to be converted into a collimated light flux, and it passes through the second beam combiner BC2 to be converged by objective optical system OBJ1 on information recording surface. RL2 to become a spot through protective layer PL2 of DVD.

Then, the objective optical system OBJ1 conduct focusing and tracking through operations of biaxial actuator AC arranged on the periphery thereof. The reflected light flux modulated on information recording surface RL2 by information pits passes again through the objective optical system OBJ1, the second beam combiner BC2 and collimating optical system COL, and then, is branched by the first beam combiner BC1 to be converged on a light-receiving surface of photoreceptor PD2. Thus, information recorded on DVD can be read by the use of output signals of photodetector PD2.

When conducting recording/reproducing of information for CD, module MD3 for CD is operated so that infrared semiconductor laser LD3 may be driven to emit light as its light path is drawn with two-dot chain lines in FIG. 1. A divergent light flux emitted from the infrared semiconductor laser LD3 is reflected on the second beam combiner BC2 to be converged, then, is transmitted through the collimating optical system COL to be converted into a collimated light flux, and it passes through the second beam combiner BC2 to be converged by objective optical system OBJ1 on information recording surface RL3 to become a spot through protective layer PL3 of CD. Then, the objective optical system OBJ1 conducts focusing and tracking through operations of biaxial actuator AC arranged on the periphery thereof. The reflected light flux modulated on information recording surface RL3 by information pits passes is transmitted again through the objective optical system OBJ1, and then, is reflected by the second beam combiner BC2, to be converged on the light-receiving surface of photodetector PD3 of module MD3 for CD. Thus, information recorded on CD by the use of output signals of the photodetector PD3 can be read.

The structure of the objective optical system OBJ1 will be explained next, as follows.

Figure 2:
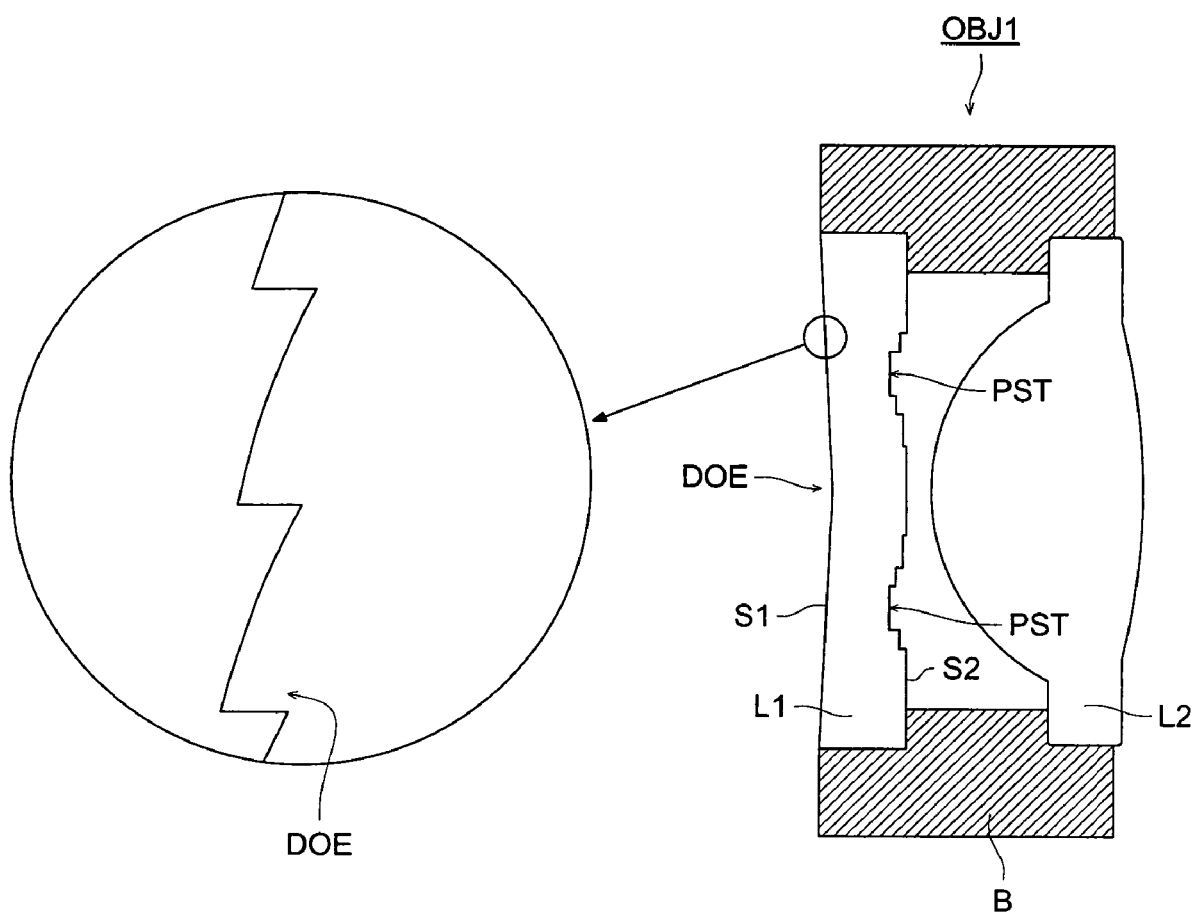
FIG. 2 is a diagram showing the structure of an objective optical system.

The objective optical system OBJ1 whose side view is shown in FIG. 2 is one that is composed of an optical element of the invention. The objective optical system OBJ1 is composed of aberration correcting element L1 representing a plastic lens and of light-converging element L2 representing an aspheric glass lens with NA 0.85 having a function to converge a laser light flux transmitted through the aberration correcting element L1 on an information recording surface of an optical disk.

On optical surface S1 of the aberration correcting element L1 on the laser light source side, there is formed diffractive structure DOE that is composed of plural ring-shaped zones (see the enlarged diagram in FIG. 2).

Further, on optical surface S2 of the aberration correcting element L1 on the optical disk side, there is formed optical path difference providing structure PST that is composed of plural ring-shaped zones. Incidentally, the aberration correcting element L1 and the light-converging element L2 are united solidly through holding member B.

The diffractive structure DOE is a structure to correct spherical aberration resulting from a difference of protective layer thicknesses between a high density optical disk meeting 0.1 mm standard requirements and DVD, and the diffractive structure DOE is formed on an aspheric surface for the purpose of correcting the spherical aberration properly. By using the second order diffracted light, the first order diffracted light and the first order diffracted light, respectively as a beam for recording/reproducing for the high density optical disk, a beam for recording/reproducing for DVD and a beam for recording/reproducing for CD, high diffraction efficiency is secured in the wavelength region for each optical disk.

Incidentally, in optical pickup device PU1, there is employed a structure wherein the third light flux enters the objective optical system OBJ1 under the condition of a divergent light flux, for correcting spherical aberration resulting from a difference of protective layer thicknesses between high density optical disk HD and CD. This makes it possible to secure a large working distance in the case of conducting recording/reproducing of information for CD.

Figure 3:
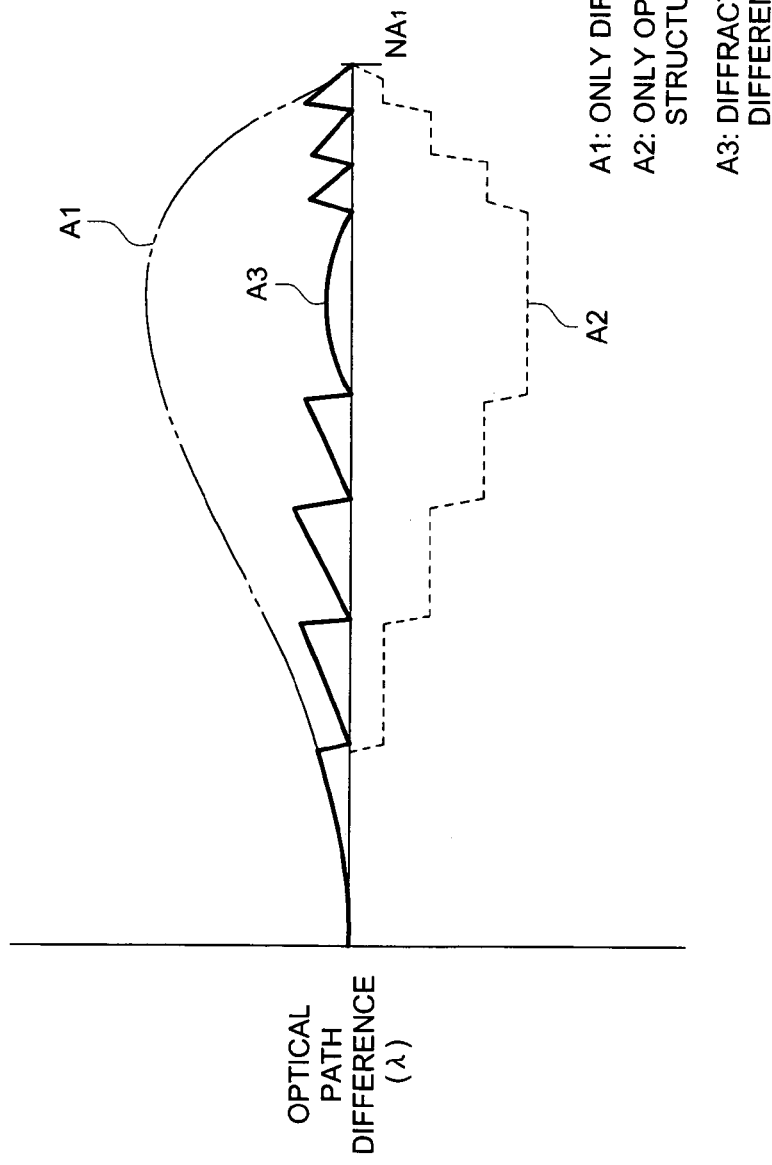
FIG. 3 is a graph showing the wavefront aberration in the case of wavelength fluctuations of the objective optical system.

Since the diffractive structure DOE satisfies expressions (1) and (2), when a wavelength of the light flux entering the diffractive structure DOE is shifted to the longer wavelength side by $\Delta\lambda$ from the design wavelength $\lambda 1$ on the high density optical disk side, as shown with two-dot chain lines A1 in FIG. 3, the diffractive structure DOE has spherical aberration characteristics that the spherical aberration changes toward the excessive correction.

Within a range of height up to 70% of the maximum effective diameter (corresponding to $NA_1$), each ring-shaped zone of optical path difference providing structure PST is changed in a way that an optical path length for the ring-shaped zone that is farther from the optical axis is shorter than that for the ring-shaped zone that is closer to the optical axis, while, in the area outside the aforesaid range, each ring-shaped zone is changed in a way that an optical path length for the ring-shaped zone that is farther from the optical axis is longer than that for the ring-shaped zone that is closer to the optical axis, thus, the optical path difference providing structure PST has spherical aberration characteristics that the spherical aberration changes toward the insufficient correction.

As stated above, with respect to the diffractive structure DOE that generates beams each having a different diffraction order for two wavelengths having a large wavelength difference, an amount of change of spherical aberration per a unit wavelength change is large. However, it is possible to cancel the wavelength-dependency of the spherical aberration as shown with solid lines A3 in FIG. 3, by causing the optical path difference providing structure PST to have spherical aberration characteristics opposite to the diffractive structure DOE so that wavelength-dependency of spherical aberration of the diffractive structure DOE may be cancelled.

Further, the diffractive structure DOE is blazed with prescribed wavelength $\lambda_B$ that is shorter than $\lambda_1$, and step $\Delta_D$ (μm) closest to the optical axis of the diffractive structure DOE satisfies expression (3).

Further, step $\Delta_P$ (μm) closest to the optical axis of the optical path difference providing structure PST satisfies expressions (28)-(30), and is established to the depth that does not give an optical path difference substantially, to design wavelength $\lambda_1$ on the high density optical disk side, design wavelength $\lambda_2$ on the DVD side and design wavelength $\lambda_3$ on the CD side.

Incidentally, optical pickup device PU1 is provided with dichroic filter DFL that restricts an aperture in the case of conducting recording/reproducing for DVD and CD, and this dichroic filter DFL is united with objective optical system OBJ1 through holding member B to be driven by biaxial actuator AC in the direction perpendicular to the optical axis.

Further, it is also possible to conduct aperture restriction in the case of conducting recording/reproducing for DVD, by giving a function to flare the second light flux to the diffractive structure DOE formed on an area outside numerical aperture $NA_2$ of DVD and to optical path difference providing structure PST, and it is also possible to conduct aperture restriction in the case of conducting recording/reproducing for CD, by giving a function to flare the third light flux to the diffractive structure DOE formed on an area outside numerical aperture $NA_3$ of CD and to optical path difference providing structure PST. Or, it may be possible to form, on an optical surface of objective optical system OBJ1, a diffractive structure having the function to restrict an aperture and an optical path difference providing structure PST, separately form the diffractive structure DOE and the optical path difference providing structure PST.

Further, collimating optical system COL is structured to be capable of being moved by uniaxial actuator UAC in the optical axis direction. This makes it possible to maintain excellent recording/reproducing characteristics constantly for high density optical disk HD, because it becomes possible to correct spherical aberration of a spot formed on information recording surface RL1 of high density optical disk.

Causes for occurrence of spherical aberration to be corrected by positional adjustment of collimating optical system COL include, for example, wavelength fluctuations caused by errors in manufacturing of violet semiconductor laser LD1, refractive index changes and refractive index distribution of objective optical system OBJ1 resulting from temperature changes, focus jump between layers in recording/reproducing for multi-layer disk such as two-layer disk and four-layer disk, and thickness fluctuations by manufacturing errors of protective layers PL1, and thickness distribution.

It is also possible to correct spherical aberration of a spot formed on information recording surface RL2 of DVD by positional adjustment of collimating optical system COL, which can improve recording/reproducing characteristics for DVD.

SECOND EMBODIMENT

Next, Second Embodiment of the invention will be explained, in which the same components as those in the First Embodiment will be given the same symbols, and explanations thereof will be omitted.

Figure 4:
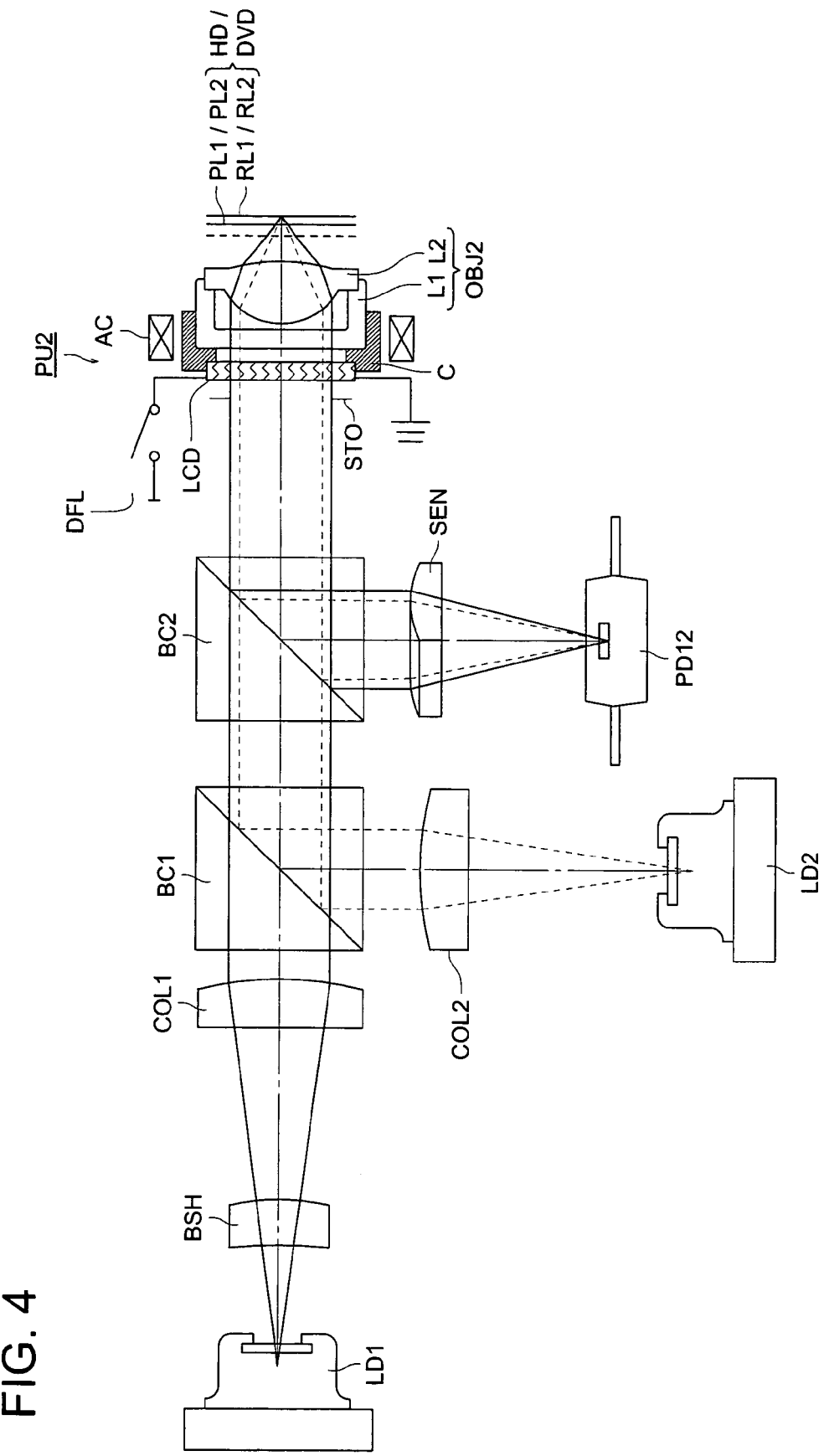
FIG. 4 is a plan view of primary portions showing the structure of an optical pickup device.

A second optical pickup device PU2 shown in FIG. 4 is an optical pickup device capable of conducting recording/reproducing of information properly for high density optical disk HD (first optical disk) and DVD (second optical disk). The second optical pickup device PU2 is composed of violet semiconductor laser LD1 (first light source) that emits the first light flux with 405 nm emitted in the case of conducting recording/reproducing of information for high density optical disk HD, red semiconductor laser LD2 (second light source) that emits the second light flux with 655 nm emitted in the case of conducting recording/reproducing of information for DVD, photodetector PD12 that is common to the first light flux and the second light flux, beam forming element BSH that forms a sectional shape of the laser light flux emitted from the violet semiconductor laser LD1 from an oval shape to a circular shape, objective optical system OBJ2 having a function to converge respective light fluxes on information recording surface RL1 and on information recording surface RL2 respectively, biaxial actuator AC, first beam combiner BC1, second beam combiner BC2, first collimating optical system COL1, second collimating optical system COL2, diaphragm STO, sensor lens SEN and liquid crystal element LCD.

When conducting recording/reproducing of information for high density optical disk HD in the optical pickup device PU2, violet semiconductor laser LD1 is driven first to emit light as its light path is drawn with solid lines in FIG. 4. A divergent light flux emitted from the violet semiconductor laser LD1 passes through the beam forming element BSH to be formed therein from an oval shape to a circular shape in terms of its sectional form, then, it is transmitted through the first collimating optical system COL1 to be converted into a collimated light flux. After that, it passes successively through the first beam combiner BC1, the second beam combiner BC2 and liquid crystal element LCD, and is converged by objective optical system OBJ2 on information recording surface RL1 through protective layer PL1 of high density optical disk HD to be a spot.

Incidentally, detailed explanation of objective optical system OBJ2 will be given later.

The objective optical system OBJ2 conduct focusing and tracking through operations of biaxial actuator AC. The reflected light flux modulated on information recording surface RL1 by information pits passes again through the objective optical system OBJ2 and liquid crystal element LCD, and is branched by the second beam combiner BC2, and is given astigmatism when passing through sensor lens SEN, to be converged on a light-receiving surface of photodetector PD12. Thus, information recorded on high density optical disk HD by the use of output signals of photodetector PD12 can be read.

When conducting recording/reproducing of information for DVD, red semiconductor laser LD2 is driven first to emit light as its light path is drawn with dotted lines in FIG. 4. A divergent light flux emitted from the red semiconductor laser LD2 is transmitted through the first collimating optical system COL1 to be converted into a collimated light flux, and then, is reflected on the first beam combiner BC1, and it passes successively through the second beam combiner BC2 and liquid crystal element LCD, to be converged by objective optical system OBJ2 on information recording surface RL2 through protective layer PL2 of DVD to be a spot.

Then, the objective optical system OBJ2 conducts focusing and tracking through operations of biaxial actuator AC arranged on the periphery thereof. The reflected light flux modulated on information recording surface RL2 by information pits passes again through the objective optical system OBJ2 and liquid crystal element LCD, then, is branched by the second beam combiner BC2, to be given astigmatism when passing through sensor lens SEN, and it is converged on a light-receiving surface of photodetector PD12. Thus, information recorded on DVD by the use of output signals of photodetector PD2 can be read.

Next, the structure of the objective optical system OBJ2 will be explained.

Figure 5:
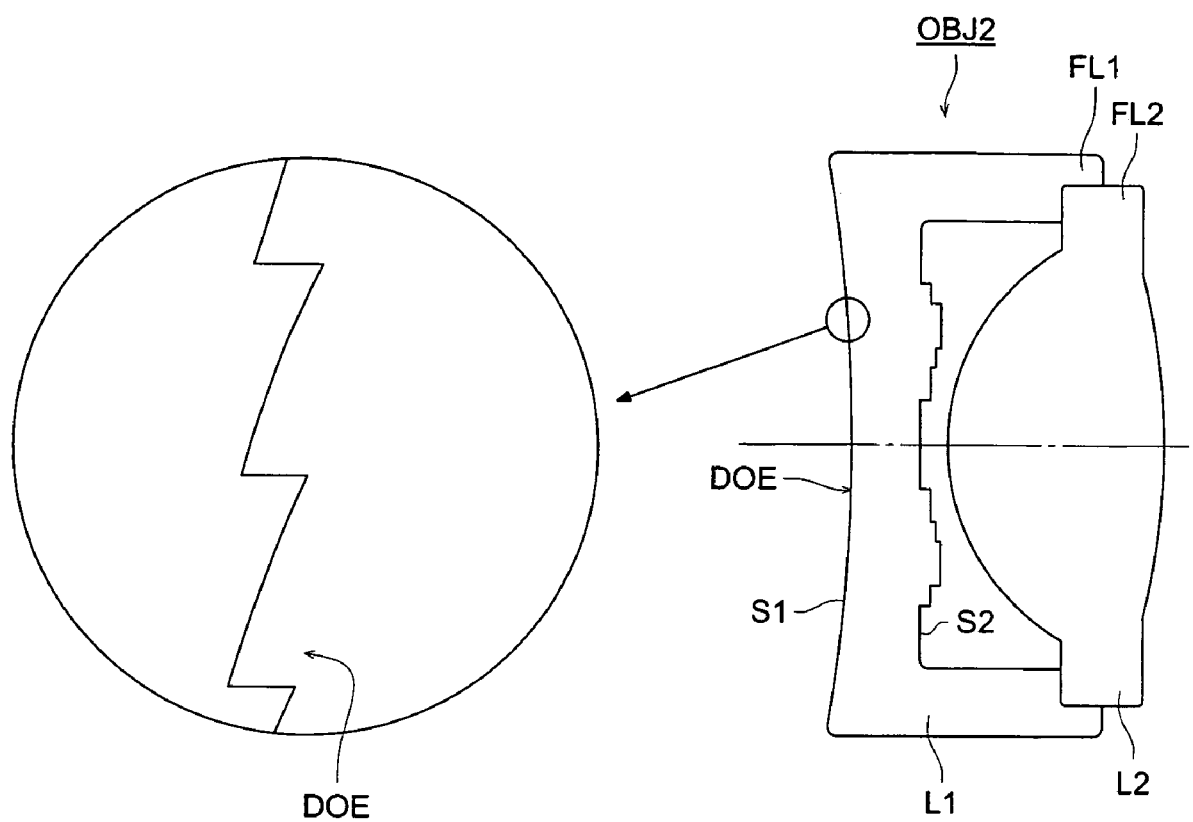
FIG. 5 is a diagram showing the structure of an objective optical system.

The objective optical system OBJ2 showing its side view in FIG. 5 is one whose constituent element is an optical element of the invention. The objective optical system OBJ2 is composed of aberration correcting element L1 representing a plastic lens and of light converging element L2 representing an aspheric plastic lens with NA 0.85 having a function to converge a laser light flux transmitted through the aberration correcting element L1 on an information recording surface of an optical disk. Optical surface Si of the aberration correcting element L1 closer to the laser light source is divided into first area AREA1 that includes an optical axis as shown in FIG. 6(a) and second area AREA2 surrounding a circumference of the first area AREA1, and diffractive structure DOE (see an enlarged diagram in FIG. 5) composed of plural ring-shaped zones is formed on the first area AREA1.

Figure 6C:
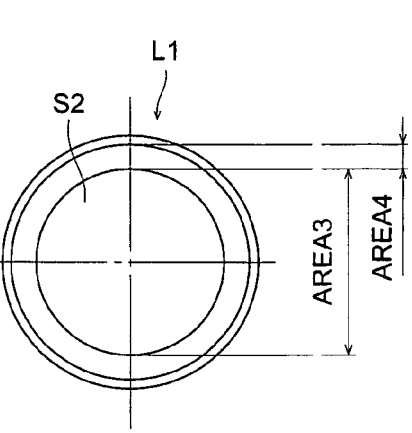

Optical surface S2 of the aberration correcting element L1 closer to an optical disk is divided into third area AREA3 that includes an optical axis as shown in FIG. 6(c) and fourth area AREA4 surrounding a circumference of the third area AREA3, and optical path difference providing structure PST composed of plural ring-shaped zones is formed on the third area AREA3. Incidentally, each of the first area AREA1 and the third area AREA3 corresponds to an area within NA of DVD, and the aberration correcting element L1 and the light-converging element L2 have respectively flange portion FL1 and flange portion FL2, each being formed to be solid with the optical functional area, on peripheral portions of their optical functional areas (areas through which a light flux emitted from a violet laser light source passes), and the aberration correcting element L1 and the light-converging element L2 are united when the flange portions FL1 and FL2 are fitted each other.

The diffractive structure DOE is a structure for correcting spherical aberration resulting from a difference of protective layer thickness between a high density optical disk meeting a 0.1 mm standard and DVD, and the diffractive structure DOE is formed on an aspheric surface so that the spherical aberration may be corrected properly. Further, a high diffraction efficiency is secured on wavelength areas for both optical disks, by using $6^{th}$ order diffracted light as a beam for recording/reproducing for a high density optical disk and by using $4^{th}$ order diffracted light as a beam for recording/reproducing for DVD. Incidentally, when a laser light flux with a wavelength of about 785 nm enters the diffractive structure DOE, $3^{rd}$ order diffracted light is generated at a high diffraction efficiency of 80% or more, and therefore, the objective optical system OBJ2 can be installed on an optical pickup device having compatibility for high density optical disk HD, DVD and CD, in addition to an optical pickup device having compatibility for high density optical disk HD and DVD like the present embodiment.

Since the diffractive structure DOE satisfies expressions (4) and (5), when a wavelength of a light flux entering the diffractive structure DOE is shifted toward the longer wavelength side by $\Delta\lambda$ from design wavelength $\lambda_1$ on the high density optical disk side as shown with two-dot chain lines A1 in FIG. 7, the diffractive structure DOE has spherical aberration characteristics wherein the spherical aberration changes toward insufficient correction direction.

Up to 70% within the first area AREA1, each ring-shaped zone of optical path difference providing structure PST is changed in a way that an optical path length for the ring-shaped zone that is farther from the optical axis is longer than that for the ring-shaped zone that is closer to the optical axis, while, in the area outside the aforesaid range, each ring-shaped zone is changed in a way that an optical path length for the ring-shaped zone that is farther from the optical axis is shorter than that for the ring-shaped zone that is closer to the optical axis, thus, the optical path difference providing structure PST has spherical aberration characteristics that the spherical aberration changes toward the excessive correction with shifting of incident light flux to the longer wavelength side, as shown with dotted lines A2 in FIG. 7.

As stated above, with respect to the diffractive structure DOE that generates beams having respectively different diffraction order numbers for two wavelengths which are different greatly each other, an amount of changes in spherical aberration per a unit wavelength change is large. However, it is possible to cancel wavelength-dependency of spherical aberration as shown with solid lines A3 in FIG. 7, by causing the optical path difference providing structure PST to have spherical aberration characteristics which are opposite to those of the diffractive structure DOE, so that wavelength-dependency of spherical aberration of the diffractive structure DOE may be canceled.

Further, the diffractive structure DOE is blazed by prescribed wavelength $\lambda_B$ within a range of $\lambda_1$-$\lambda_2$, and step $\Delta_D$ (μm) closest to the optical axis of the diffractive structure DOE satisfies expression (6).

In addition, $\Delta_D$ (μm) closest to the optical axis of the optical path difference providing structure PST satisfies expressions (17) and (18), and is set to the depth which does not give the optical path difference substantially to design wavelength $\lambda_1$ on the high density optical disk side, design wavelength $\lambda_2$ on the DVD side and design wavelength $\lambda_3$ on the CD side.

Since the diffractive structure DOE is formed only on the first area AREA1, the second light flux passing through the second area AREA2 is given spherical aberration resulting from a difference of protective layer thickness between high density optical disk HD and DVD to be a flare component that does not contribute to formation of a spot on information recording surface RL2 of DVD. Since this is equivalent to that objective optical system OBJ itself has an aperture restriction function for DVD, optical pickup device PU2 does not need to be provided with a diaphragm corresponding to $NA_2$ separately, which makes its structure to be simple.

Incidentally, the objective optical system OBJ2 is united solidly with liquid crystal element LCD through connecting member C (see FIG. 4), and the objective optical system OBJ2 conduct tracking and focusing together with liquid crystal element LCD. In this case, diffractive index distribution is generated in a liquid crystal molecule layer when voltage is impressed on electrodes arranged to interpose the liquid crystal molecule layer of liquid crystal element LCD, though an illustration thereof is omitted. On the wavefront that is transmitted through the liquid crystal molecule layer on which the refractive index distribution is formed, there is added spherical aberration. In this case, when the refractive index distribution in the liquid crystal molecule layer is controlled so that spherical aberration having a sign opposite to that of spherical aberration changes of a spot on information recording surface RL1 of high density optical disk HD may be added to the transmitted wavefront, the spot formed on information recording surface RL1 of high density optical disk HD can maintain the state of corrected spherical aberration constantly, and excellent recording/reproducing characteristics for high density optical disk HD can be obtained.

The technology to correct spherical aberration changes by liquid crystal element LCD of this kind is described, for example, in TOKKAI No. 2001-43549, and detailed description is not given here.

Incidentally, causes for generation of spherical aberration to be corrected by liquid crystal element LCD include wavelength fluctuations caused by errors in manufacturing of violet semiconductor lasers LD1, refractive index changes and refractive index distribution of objective optical system OBJ resulting from temperature changes, focus jump between layers in recording/reproducing for multi-layer disks such as 2-layer disk and 4-layer disk and thickness fluctuations and thickness distribution caused by errors in manufacturing of protective layers PL1.

Further, spherical aberration of a spot formed on information recording surface RL2 of DVD may also be corrected by the liquid crystal element LCD, which makes it possible to improve recording/reproducing characteristics for DVD.

By installing optical pickup device PU1 or PU2 shown respectively in the first or second embodiment, a rotation driving apparatus for holding an optical disk rotatably and a control apparatus that controls driving of the respective apparatuses, it is possible to obtain an optical information recording and reproducing apparatus capable of conducting at least one of recording of optical information for an optical disk and reproducing of information recorded on an optical disk.

EXAMPLE 1

Next, the example of an optical element that is optimum as the objective optical system OBJ1 will be explained.

Table 1 shows lens data of an optical element, and FIG. 8 is a diagram of an optical path. The present example is composed of aberration correcting element L1 on which diffractive structure DOE and optical path difference providing structure PST are formed and of light-converging element L2. The aberration correcting element L1 is a plastic lens and the light-converging element L2 is a glass lens.

TABLE 1-1

(Optical specifications)

| | |
|---|---|
| HD: | $NA_1 = 0.85$, $f_1 = 1.765$ mm, $\lambda_1 = 405$ nm, $m_1 = 0$, $t_1 = 0.1$ mm |
| DVD: | $NA_2 = 0.65$, $f_2 = 1.823$ mm, $\lambda_2 = 655$ nm, $m_2 = 0$, $t_2 = 0.6$ mm |
| CD: | $NA_3 = 0.45$, $f_3 = 1.824$ mm, $\lambda_3 = 785$ nm, $m_3 = -0.157$, $t_3 = 1.2$ mm |

(Paraxial data)

| Surface No. | r (mm) | $d_1$ (mm) | $d_2$ (mm) | $d_3$ (mm) | $N_{\lambda 1}$ | $N_{\lambda 2}$ | $N_{\lambda 3}$ | $v_d$ |
|---|---|---|---|---|---|---|---|---|
| OBJ | | ∞ | ∞ | 11.7000 | | | | |
| STO | | 0.5000 | 0.5000 | 0.5000 | | | | |
| 1 | −10.5405 | 1.0000 | 1.0000 | 1.0000 | 1.524694 | 1.506513 | 1.503235 | 56.5 |
| 2 | ∞ | 0.1000 | 0.1000 | 0.1000 | | | | |
| 3 | 1.2369 | 2.1400 | 2.1400 | 2.1400 | 1.622717 | 1.603175 | 1.599244 | 61.2 |
| 4 | −3.3104 | 0.5303 | 0.2794 | 0.1743 | | | | |
| 5 | ∞ | 0.1000 | 0.6000 | 1.2000 | 1.619495 | 1.577210 | 1.570423 | 30.0 |
| 6 | ∞ | | | | | | | |

(Aspheric surface coefficient)

| | First surface | Third surface | Fourth surface |
|---|---|---|---|
| κ | 0.00000E+00 | −0.65471E+00 | −0.111004+03 |
| A4 | 0.26599E−01 | 0.15588E−01 | 0.17200E+00 |
| A6 | 0.25977E−02 | −0.10498E−02 | −0.29168E+00 |
| A8 | 0.28635E−02 | 0.10874E−01 | 0.37347E+00 |
| A10 | 0.56637E−04 | −0.10146E−01 | −0.35736E+00 |
| A12 | 0.00000E+00 | 0.30385E−02 | 0.19402E+00 |
| A14 | 0.00000E+00 | 0.40266E−02 | −0.43722E−01 |
| A16 | 0.00000E+00 | −0.44036E−02 | 0.00000E+00 |
| A18 | 0.00000E+00 | 0.17306E−02 | 0.00000E+00 |
| A20 | 0.00000E+00 | −0.25435E−03 | 0.00000E+00 |

(Diffraction order number, manufacture wavelength, optical path difference function coefficient)

| | First surface |
|---|---|
| $n_1/n_2/n_3$ | 2/1/1 |
| λB | 390 nm |
| B2 | −0.12000E−01 |
| B4 | 0.65766E−02 |
| B6 | 0.77632E−03 |
| B8 | 0.66730E−03 |
| B10 | 0.23534E−04 |

TABLE 1-2

(optical path difference providing structure)

| i | $h_{iS}$(mm) | $h_{iL}$(mm) | $m_{iId}$(mm) | $m_{i1}$ | $m_{i2}$ | $m_{i3}$ |
|---|---|---|---|---|---|---|
| 1 | 0.00000 | 0.40000 | 0.000000 | 0 | 0 | 0 |
| 2 | 0.40000 | 0.58000 | −0.015438 | 20 | 12 | 10 |
| 3 | 0.58000 | 0.72000 | −0.030875 | 40 | 24 | 20 |
| 4 | 0.72000 | 0.86000 | −0.046313 | 60 | 36 | 30 |
| 5 | 0.86000 | 1.29000 | −0.061750 | 80 | 48 | 40 |
| 6 | 1.29000 | 1.36000 | −0.046313 | 60 | 36 | 30 |
| 7 | 1.36000 | 1.40000 | −0.030875 | 40 | 24 | 20 |
| 8 | 1.40000 | 1.44000 | −0.015438 | 20 | 12 | 10 |
| 9 | 1.44000 | 1.47000 | 0.000000 | 0 | 0 | 0 |
| 10 | 1.47000 | 1.55000 | 0.015438 | −20 | −12 | −10 |

The optical specifications in the case of using a high density optical disk include wavelength $\lambda_1 = 405$ nm, protective layer PL1 thickness $t_1 = 0.1$ mm, numerical aperture $NA_1=0.85$, focal length $f_1=1.765$ mm and magnification $m_1=0$, while, the optical specifications in the case of using DVD include wavelength $\lambda_2=655$ nm, protective layer PL2 thickness $t_2=0.6$ mm, numerical aperture $NA_2=0.65$, focal length $f_2=1.823$ mm and magnification $m_2=0$, and the optical specifications in the case of using CD include wavelength $\lambda_3=785$ nm, protective layer PL3 thickness $t_3=1.2$ mm, numerical aperture $NA_3=0.45$, focal length $f_3=1.824$ mm and magnification $m_3=-0.157$.

An aspheric surface of the optical surface is expressed by the following expression Numeral 1 wherein a coefficient in Table 1 (Table 3 in Example 2) is substituted, when X (mm) represents an amount of deformation from a plane that is tangent to the aspheric surface at its vertex, h (mm) represents a height in the direction perpendicular to the optical axis and r (mm) represents a radius of curvature, wherein, κ represents a conic constant and $A_{2i}$ represents an aspheric surface coefficient.

$$x = \frac{h^2/r}{1+\sqrt{1-(1+k)(h/r)^2}} + \sum_{i=2} A_{2i}h^{2i} \quad \text{(Numeral 1)}$$

In Table 1 (this applies also to lens data in the examples hereafter), $NA_1$, $NA_2$ and $NA_3$ represent numerical apertures respectively of high density optical disk HD, DVD and CD, $f_1$, $f_2$ and $f_3$ represent focal lengths (mm) respectively of high density optical disk HD, DVD and CD, $\lambda_1$, $\lambda_2$ and $\lambda_3$ represent design wavelengths (nm) respectively of high density optical disk HD, DVD and CD, $m_1$, $m_2$ and $m_3$ represent magnifications respectively of high density optical disk HD, DVD and CD, $t_1$, $t_2$ and $t_3$ represent protective layer thicknesses respectively of high density optical disk HD, DVD and CD, OBJ represents an object point (a luminous point of a semiconductor laser light source), STO represents a diaphragm, r represents a radius of curvature (mm), $d_1$, $d_2$ and $d_3$ represent surface distances respectively of high density optical disk HD, DVD and CD, $N\lambda_1$, $N\lambda_2$ and $N\lambda_3$ represent refractive indexes for design wavelengths respectively of high density optical disk HD, DVD and CD, $\upsilon_d$ represents Abbe's number for d line (587.6 nm), $n_1$, $n_2$ and $n_3$ represent diffraction order numbers of beams for recording/reproducing respectively of high density optical disk HD, DVD and CD, and $\lambda_B$ represents a blaze wavelength (nm) of diffractive structure DOE.

A diffractive structure in each example is expressed by an optical path difference that is added to the transmitted wavelength by this structure. The optical path difference of this kind is expressed by optical path difference function φb (mm) that is defined by the following Numeral 2, when λ represents a wavelength of an incident light flux, h (mm) represent a height in the direction perpendicular to the optical axis, $B_{2j}$ represents an optical path difference function coefficient, n represents a diffraction order number and $\lambda_B$ represents a manufacturing wavelength (which is also called a blaze wavelength).

$$\Phi_b = n \times \lambda/\lambda_B \times \sum_{j=1}^{5} B_{2j}h^{2j} \quad \text{(Numeral 2)}$$

Further, diffractive structure DOE formed on optical surface S1 closer to the laser light source on aberration correcting element L1 is a structure that generates a second order diffracted light for wavelength $\lambda_1$, a first order diffracted light for wavelength $\lambda_2$ and a first order diffracted light for wavelength $\lambda_3$. Diffraction efficiencies respectively for $\lambda_1$, $\lambda_2$ and $\lambda_3$ are 97.7%, 93.4% and 99.1%, which means that the diffraction efficiency is high for every wavelength.

With respect to optical path difference providing structure PST formed on optical surface S2 closer to an optical disk on the aberration correcting element L1, each step $_D\Delta_P$ is established to be in a depth satisfying $\Delta_P=m_{i1}\times\lambda_1\times10^{-3}/(N_1-1)$ (wherein, $m_{i1}=20$) (in the present example, $\Delta_P=0.015438$ mm, because of $N_1=1.524694$). Optical path difference $\Phi_{2P}$ to, be added to $\lambda_2$ by each step $\Delta_P$ is as follows, $$\begin{aligned}\Phi_{2P} &= \Delta_P \cdot (N_2-1)/(\lambda_2\times 10^{-3})\\ &= 20\times\lambda_1\times 10^{-3}/(N_1-1)\cdot(N_2-1)/(\lambda_2\times 10^{-3})\\ &= 20\times(\lambda_1/\lambda_2)\times[(N_2-1)/(N_1-1)]\\ &= 20\times(405/655)\times[(1.506513-1)/(1.524694-1)]\\ &= 11.93\\ &\approx 12\end{aligned}$$

and optical path difference $\Phi_{3P}$ to be added to $\lambda_3$ by each step $\Delta_P$ is as follows.

$$\begin{aligned}\Phi_{3P} &= \Delta_P \times (N_3-1)/(\lambda_3\times 10^{-3})\\ &= [20\times\lambda_1\times 10^{-3}/(N_1-1)]\times[(N_3-1)/(\lambda_3\times 10^{-3})]\\ &= 20\times(\lambda_1/\lambda_3)\times[(N_3-1)/(N_1-1)]\\ &= 20\times(405/785)\times[(1.503235-1)/(1.524694-1)]\\ &= 9.90\\ &\approx 10\end{aligned}$$

Namely, each step $\Delta_P$ of the optical path difference providing structure PST is established to be in a depth that does not give a phase difference substantially to each of wavelengths $\lambda_1$, $\lambda_2$ and $\lambda_3$.

Incidentally, the symbol i in Table 1 shows the number of each ring-shaped zone of the optical path difference providing structure, wherein i=1 is for the ring-shaped zone including the optical axis, i=2 is for the ring-shaped zone adjoining to the outside of the ring-shaped zone mentioned above (in the direction for getting away from the optical axis), and i=3 is for the ring-shaped zone adjoining to the outside of the ring-shaped zone mentioned immediately above, and the same rule applies correspondingly to the following. Namely, on the aberration correcting element L1 in the present example, there are formed ten ring-shaped shaped zones. The symbols $h_{iS}$ and $h_{iL}$ show respectively a height of starting point and a height of ending point. The symbol $m_{i1d}$ represents an amount of deviation of each ring-shaped zone in the optical axis direction, and its sign is "−" when the ring-shaped zone is shifted toward the laser light source side for the first ring-shaped zone (i=1), and its sign is "+" when the ring-shaped zone is shifted toward the optical disk side for the first ring-shaped zone (i=1). For example, the second ring-shaped zone (i=2) is shifted toward the laser light source side for the first ring-shaped zone by an amount of 0.015438 mm, and the tenth ring-shaped zone (i=10) is shifted toward the optical disk side by an amount of 0.015438 mm for the first ring-shaped zone.

FIG. 9 is a graph showing wavefront aberration for wavelength $\lambda_1+5$ (nm) (=410 nm) under the assumption that the optical path difference providing structure PST is not formed in the present example, while, FIG. 10 is a graph showing wavefront aberration for wavelength $\lambda_1+5$ (nm) (=410 nm) in the present example. The diffractive structure DOE in the present example has spherical aberration characteristics wherein spherical aberration changes toward the excessive correction if a wavelength of an incident light flux is shifted to the longer wavelength side, and a third order spherical aberration component of the wavefront aberration shown in FIG. 9 is 0.385 $\lambda$RMS ($\lambda$=410 nm). In contrast to this, a third order spherical aberration component of the wavefront aberration shown in FIG. 10 is 0.030 $\lambda$RMS ($\lambda$=410 nm), and it is understood that the spherical aberration characteristics of the diffractive structure DOE are canceled properly by the optical path difference providing structure PST having the spherical aberration characteristics wherein spherical aberration changes toward the insufficient correction if a wavelength of an incident light flux is shifted to the longer wavelength side.

Table 2 shows RMS values (square root of the sum of squares of spherical aberration components for the ninth order or less) of wavefront aberration for respective wavelengths $\lambda_1$ (nm), $\lambda_1\pm 5$ (nm), $\lambda_2$ (nm), $\lambda_2\pm 5$ (nm) and $\lambda_3$ (nm), $\lambda_3\pm 5$ (nm) in the present example. From this table, it is understood that the optical element of the present example has an excellent performance for each of a high density optical disk, DVD and CD.

TABLE 2

High density optical disk application (NA$_1$ = 0.85)

| | |
|---|---|
| $\lambda_1$ (nm) | 0.004 $\lambda$RMS |
| $\lambda_1$ + 5 (nm) | 0.033 $\lambda$RMS |
| $\lambda_1$ − 5 (nm) | 0.033 $\lambda$RMS |

DVD application (NA$_2$ = 0.65)

| | |
|---|---|
| $\lambda_2$ (nm) | 0.005 $\lambda$RMS |
| $\lambda_2$ + 5 (nm) | 0.025 $\lambda$RMS |
| $\lambda_2$ − 5 (nm) | 0.020 $\lambda$RMS |

CD application (NA$_3$ = 0.45)

| | |
|---|---|
| $\lambda_3$ (nm) | 0.028 $\lambda$RMS |
| $\lambda_3$ + 5 (nm) | 0.032 $\lambda$RMS |
| $\lambda_3$ − 5 (nm) | 0.025 $\lambda$RMS |

EXAMPLE 2

Table 3 shows lens data of Example 2 of the invention, and FIG. 11 shows an optical path diagram. The present example is composed of the first aberration correcting element L1 on which diffractive structure DOE is formed, the second aberration correcting element L2 on which optical path difference providing structure PST is formed and of light-converging element L3. Each of the first aberration correcting element L1 and the second aberration correcting element L2 is a plastic lens, and the light-converging element L3 is a glass lens.

TABLE 3

(Optical specifications)

HD: NA$_1$ = 0.85, f$_1$ = 1.765 mm, $\lambda_1$ = 405 nm, m$_1$ = 0, t$_1$ = 0.1 mm
DVD: NA$_2$ = 0.65, f$_2$ = 1.807 mm, $\lambda_2$ = 655 nm, m$_2$ = 0, t$_2$ = 0.6 mm (Paraxial data)

| Surface No. | r (mm) | d$_1$ (mm) | d$_2$ (mm) | N$_{\lambda 1}$ | N$_{\lambda 2}$ | $\nu_d$ |
|---|---|---|---|---|---|---|
| OBJ | | ∞ | ∞ | | | |
| STO | | 0.5000 | 0.5000 | | | |
| 1 | 22.5785 | 1.0000 | 1.0000 | 1.524694 | 1.506513 | 56.5 |
| 2 | ∞ | 0.1000 | 0.1000 | | | |
| 3 | ∞ | 1.0000 | 1.0000 | 1.524694 | 1.506513 | 56.5 |
| 4 | ∞ | 0.1000 | 0.1000 | | | |
| 5 | 1.2369 | 2.1400 | 2.1400 | 1.622717 | 1.603175 | 61.2 |
| 6 | −3.3104 | 0.5307 | 0.3015 | | | |
| 7 | ∞ | 0.1000 | 0.6000 | 1.619495 | 1.577210 | 30.0 |
| 8 | ∞ | | | | | |

(Aspheric surface coefficient)

| | First surface | Fifth surface | Sixth surface |
|---|---|---|---|
| κ | 0.00000E+00 | −0.65471E+00 | −0.111004+03 |
| A4 | −0.62107E−02 | 0.15588E−01 | 0.17200E+00 |
| A6 | 0.31256E−03 | −0.10498E−02 | −0.29168E+00 |
| A8 | −0.15630E−02 | 0.10874E−01 | 0.37347E+00 |
| A10 | 0.27716E−03 | −0.10146E−01 | −0.35736E+00 |
| A12 | 0.00000E+00 | 0.30385E−02 | 0.19402E+00 |
| A14 | 0.00000E+00 | 0.40266E−02 | −0.43722E−01 |
| A16 | 0.00000E+00 | −0.44036E−02 | 0.00000E+00 |
| A18 | 0.00000E+00 | 0.17306E−02 | 0.00000E+00 |
| A20 | 0.00000E+00 | −0.25435E−03 | 0.00000E+00 |

(Diffraction order number, manufacture wavelength, optical path difference function coefficient)

| | First surface |
|---|---|
| n$_1$/n$_2$ | 1/1 |
| $\lambda$B | 490 nm |
| B2 | 0.14000E−01 |
| B4 | −0.39555E−02 |
| B6 | 0.21095E−03 |
| B8 | −0.99732E−03 |
| B10 | 0.17650E−03 |

(Optical path difference providing structure)

| i | h$_{iS}$ (mm) | h$_{iL}$ (mm) | m$_{i1d}$ (mm) | m$_{i1}$ | m$_{i2}$ |
|---|---|---|---|---|---|
| 1 | 0.00000 | 0.46000 | 0.000000 | 0 | 0 |
| 2 | 0.46000 | 0.66000 | 0.003859 | −5 | −3 |
| 3 | 0.66000 | 0.88000 | 0.007719 | −10 | −6 |
| 4 | 0.88000 | 1.30000 | 0.011578 | −15 | −9 |
| 5 | 1.30000 | 1.38000 | 0.007719 | −10 | −6 |
| 6 | 1.38000 | 1.44000 | 0.003859 | −5 | −3 |
| 7 | 1.44000 | 1.48000 | 0.000000 | 0 | 0 |
| 8 | 1.48000 | 1.55000 | −0.003859 | 5 | 3 |

The optical specifications in the case of using a high density optical disk include wavelength $\lambda_1$=405 nm, protective layer PL1 thickness t$_1$=0.1 mm, numerical aperture NA$_1$=0.85, focal length f$_1$=1.765 mm and magnification m$_1$=0, while, the optical specifications in the case of using DVD include wavelength $\lambda_2$=655 nm, protective layer PL2 thickness t$_2$=0.6 mm, numerical aperture NA$_2$=0.65, focal length f$_2$=1.807 mm and magnification m$_2$=0.

Diffractive structure DOE formed on optical surface S1 of the first aberration correcting element L1 is a structure that generates the first order diffracted light for both of wavelength $\lambda_1$ and $\lambda_2$, and its blaze wavelength $\lambda_B$ is 490 nm. Diffraction efficiencies for $\lambda_1$ and $\lambda_2$ are respectively 83.5% and 79.0%, which means that a diffraction efficiency is high for every wavelength.

With respect to optical path difference providing structure PST formed on optical surface S4 of the second aberration correcting element L2, each step $\Delta_P$ is established to be in a depth that satisfies satisfying $\Delta_P = m_{i1} \times \lambda_1 \times 10^{-1}/(N_1-1)$ (wherein, $m_{i1}$=5) (in the present example, $\Delta_P$=0.003859 mm, because of $N_1=1.524694$). Optical path difference $\Phi_{2P}$ to be added to $\lambda_2$ by each step $\Delta_P$ is as follows.

$$\begin{aligned}\Phi_{2P} &= \Delta_P \times (N_2 - 1)/(\lambda_2 \times 10^{-3}) \\ &= [5 \times \lambda_1 \times 10^{-3}/(N_1 - 1)] \cdot [(N_2 - 1)/(\lambda_2 \times 10^{-3})] \\ &= 5 \times (\lambda_1/\lambda_2) \times [(N_2 - 1)/(N_1 - 1)] \\ &= 5 \times (405/655) \times [(1.506513 - 1)/(1.524694 - 1)] \\ &= 2.98 \\ &\approx 3\end{aligned}$$

Namely, each step $\Delta_P$ of the optical path difference providing structure PST is in a depth that does not give a phase difference substantially to both of $\lambda_1$ and $\lambda_2$.

Incidentally, the symbol i in Table 3 shows the number of each ring-shaped zone of the optical path difference providing structure, wherein i=1 is for the ring-shaped zone including the optical axis, i=2 is for the ring-shaped zone adjoining to the outside of the ring-shaped zone mentioned above (in the direction for getting away from the optical axis), and i=3 is for the ring-shaped zone adjoining to the outside of the ring-shaped zone mentioned immediately above, and the same rule applies correspondingly to the following. Namely, on the aberration correcting element L1 in the present example, there are formed eight ring-shaped zones. The symbols $h_{iS}$ and $h_{iL}$ show respectively a height of starting point and a height of ending point. The symbol $m_{i1d}$ represents an amount of deviation of each ring-shaped zone in the optical axis direction, and its sign is "−" when the ring-shaped zone is shifted toward the laser light source side for the first ring-shaped zone (i=1), and its sign is "+" when the ring-shaped zone is shifted toward the optical disk side for the first ring-shaped zone (i=1). For example, the second ring-shaped zone (i=2) is shifted toward the laser light source side for the first ring-shaped zone by an amount of 0.003859 mm, and the eighth ring-shaped zone (i=8) is shifted toward the optical disk side by an amount of 0.003859 mm for the first ring-shaped zone.

FIG. 12 is a graph showing wavefront aberration for wavelength $\lambda_1+5$ (nm) (=410 nm) under the assumption that the optical path difference providing structure PST is not formed in the present example, while, FIG. 13 is a graph showing wavefront aberration for wavelength $\lambda_1+5$ (nm) (=410 nm) in the present example. The diffractive structure DOE in the present example has spherical aberration characteristics wherein spherical aberration changes toward the insufficient correction if a wavelength of an incident light flux is shifted to the longer wavelength side, and a third order spherical aberration component of the wavefront aberration shown in FIG. 12 is 0.063 $\lambda$RMS ($\lambda$=410 nm). In contrast to this, a third order spherical aberration component of the wavefront aberration shown in FIG. 13 is 0.013 $\lambda$RMS ($\lambda$=410 nm), and it is understood that the spherical aberration characteristics of the diffractive structure DOE are canceled properly by the optical path difference providing structure PST having the spherical aberration characteristics wherein spherical aberration changes toward the excessive correction if a wavelength of an incident light flux is shifted to the longer wavelength side.

Table 4 shows RMS values (square root of the sum of squares of spherical aberration components for the ninth order or less) of wavefront aberration for respective wavelengths $\lambda_1$ (nm), $\lambda_1 \pm 5$ (nm), $\lambda_2$ (nm) and $\lambda_2 \pm 5$ (nm) in the present example. From this table, it is understood that the optical element of the present example has an excellent performance for each of a high density optical disk and DVD.

TABLE 4

| High density optical disk application (NA₁ = 0.85) | |
| --- | --- |
| $\lambda_1$ (nm) | 0.000 $\lambda$RMS |
| $\lambda_1$ + 5 (nm) | 0.015 $\lambda$RMS |
| $\lambda_1$ − 5 (nm) | 0.019 $\lambda$RMS |
| DVD application (NA₂ = 0.65) | |
| $\lambda_2$ (nm) | 0.001 $\lambda$RMS |
| $\lambda_2$ + 5 (nm) | 0.007 $\lambda$RMS |
| $\lambda_2$ − 5 (nm) | 0.007 $\lambda$RMS |

EXAMPLE 3

Table 5 shows lens data of Example 3 of the invention, and FIG. 14 shows an optical path diagram. The present example is an objective optical system wherein a light-converging element that is made up of one group has a function of the optical element of the invention, and it is a plastic lens wherein diffractive structure DOE is formed on optical surface S1 of the plastic lens closer to the laser light source, and optical path difference providing structure PST is formed on optical surface S2 of the plastic lens closer to an optical disk.

TABLE 5

| (Optical specifications) | | | | | |
| --- | --- | --- | --- | --- | --- |
| HD: | $NA_1 = 0.67$, $f_1 = 2.986$ mm, $\lambda_1 = 405$ nm, $m_1 = 0$, $t_1 = 0.6$ mm | | | | |
| DVD: | $NA_2 = 0.655$, $f_2 = 3.070$ mm, $\lambda_2 = 655$ nm, $m_2 = 0$, $t_2 = 0.6$ mm | | | | |

| (Paraxial data) | | | | | | |
| --- | --- | --- | --- | --- | --- | --- |
| Surface No. | r (mm) | $d_1$ (mm) | $d_2$ (mm) | $N_{\lambda 1}$ | $N_{\lambda 2}$ | $\nu_d$ |
| OBJ | ∞ | ∞ | | | | |
| STO | | 0.5000 | 0.5000 | | | |
| 1 | 2.0249 | 2.3000 | 2.3000 | 1.567015 | 1.547023 | 55.0 |
| 2 | −9.1652 | 1.3020 | 1.3590 | | | |
| 3 | ∞ | 0.6000 | 0.6000 | 1.619495 | 1.577210 | 30.0 |
| 4 | ∞ | | | | | |

| (Aspheric surface coefficient) | | | |
| --- | --- | --- | --- |
| | | Second surface | |
| | First surface | First ring-shaped zone | Second ring-shaped zone |
| κ | −0.75342E+00 | −0.16826E+03 | −0.36374E+02 |
| A4 | 0.33234E−02 | 0.22632E−02 | 0.17512E−01 |
| A6 | 0.59252E−03 | −0.47228E−02 | −0.47228E−02 |
| A8 | −0.10732E−03 | 0.54260E−03 | 0.54260E−03 |
| A10 | 0.41199E−04 | −0.21717E−04 | −0.21717E−04 |
| A12 | −0.60853E−05 | 0.00000E+00 | 0.00000E+00 |
| A14 | 0.00000E+00 | 0.00000E+00 | 0.00000E+00 |
| A16 | 0.00000E+00 | 0.00000E+00 | 0.00000E+00 |
| A18 | 0.00000E+00 | 0.00000E+00 | 0.00000E+00 |
| A20 | 0.00000E+00 | 0.00000E+00 | 0.00000E+00 |

| Second surface | | |
| --- | --- | --- |
| | Third ring-shaped zone | Fourth ring-shaped zone |
| κ | −0.41644E+02 | −0.45860E+02 |
| A4 | 0.17208E−01 | 0.17052E−01 |
| A6 | −0.47228E−02 | −0.47228E−02 |
| A8 | 0.54260E−03 | 0.54260E−03 |

TABLE 5-continued

| | | |
|---|---|---|
| A10 | −0.21717E−04 | −0.21717E−04 |
| A12 | 0.00000E+00 | 0.00000E+00 |
| A14 | 0.00000E+00 | 0.00000E+00 |
| A16 | 0.00000E+00 | 0.00000E+00 |
| A18 | 0.00000E+00 | 0.00000E+00 |
| A20 | 0.00000E+00 | 0.00000E+00 |

(Diffraction order number, manufacture wavelength, optical path difference function coefficient)

| | First surface |
|---|---|
| $n_1/n_2$ | 3/2 |
| $\lambda B$ | 420 nm |

| | |
|---|---|
| B2 | −0.35000E−02 |
| B4 | −0.32626E−03 |
| B6 | −0.23517E−04 |
| B8 | 0.54729E−06 |
| B10 | −0.72504E−06 |

(Optical path difference providing structure)

| i | $h_{iS}$ (mm) | $h_{iL}$ (mm) | $m_{i1d}$ (mm) | $m_{i1}$ | $m_{i2}$ |
|---|---|---|---|---|---|
| 1 | 0.00000 | 0.50000 | 0.000000 | 0 | 0 |
| 2 | 0.50000 | 1.20000 | 0.003554 | −5 | −3 |
| 3 | 1.20000 | 1.47000 | 0.000000 | 0 | 0 |
| 4 | 1.47000 | 1.60000 | −0.003706 | 5 | 3 |

The optical specifications in the case of using a high density optical disk include wavelength $\lambda_1$=405 nm, protective layer PL1 thickness $t_1$=0.6 mm, numerical aperture $NA_1$=0.67, focal length $f_1$=2.986 mm and magnification $m_1$=0, while, the optical specifications in the case of using DVD include wavelength $\lambda_2$=655 nm, protective layer PL2 thickness $t_2$=0.6 mm, numerical aperture $NA_2$=0.656, focal length $f_2$=3.070 mm and magnification $m_2$=0.

The diffractive structure DOE is of the structure that generates a third order diffracted light for wavelength $\lambda_1$ and generates a second order diffracted light for wavelength $\lambda_2$, and its blaze wavelength $\lambda_B$ is 420 nm. Diffraction efficiencies for $\lambda_1$ and $\lambda_2$ are respectively 95.0% and 94.0%, which means that a diffraction efficiency is high for every wavelength.

With respect to the optical path difference providing structure PST, each step $\Delta_P$ is established to be in a depth that satisfies $\Delta_P = m_{i1} \times \lambda_1 \times 10^{-3}/(N_1-1)$ (wherein, $m_{i1}$=5) (in the present example, $\Delta_P$=0.003571 mm, because of $N_1$=1.567015). Optical path difference $\Phi_{2P}$ to be added to $\lambda_2$ by each step $\Delta_P$ is as follows.

$$\Phi_{2P} = \Delta_P \times (N_2 - 1)/(\lambda_2 \times 10^{-3})$$
$$= [5 \times \lambda_1 \times 10^{-3}/(N_1 - 1)] \cdot [(N_2 - 1)/(\lambda_2 \times 10^{-3})]$$
$$= 5 \times (\lambda_1/\lambda_2) \times [(N_2 - 1)/(N_1 - 1)]$$
$$= 5 \times (405/655) \times [(1.547023 - 1)/(1.567015 - 1)]$$
$$= 2.98$$
$$\approx 3$$

Namely, each step $\Delta_P$ of the optical path difference providing structure PST is in a depth that does not give a phase difference substantially to both of $\lambda_1$ and $\lambda_2$.

However, in the present example, the optical path difference providing structure PST is formed on an optical surface which has a refractive power and which convergence light flux enters into. Therefore, steps of every ring-shaped zones and aspheric shapes of every ring-shaped zones are designed so that a spherical aberration for a wavelength $\lambda_1$ may takes the minimum in consideration of an incident angle variation of the incident light flux and a passing direction variation of a refracted light flux. Accordingly, $m_{i1}d$, a depth each ring-shaped zone of the optical path difference providing structure PST shown in Table 5 slightly differs from the value calculated from above-mentioned $\Delta_P$=0.003571 mm.

Incidentally, the symbol i in Table 5 shows the number of each ring-shaped zone of the optical path difference providing structure, wherein i=1 is for the ring-shaped zone including the optical axis, i=2 is for the ring-shaped zone adjoining to the outside of the ring-shaped zone mentioned above (in the direction for getting away from the optical axis), and i=3 is for the ring-shaped zone adjoining to the outside of the ring-shaped zone mentioned immediately above, and the same rule applies correspondingly to the following. Namely, on the objective optical element in the present example, there are formed four ring-shaped zones. The symbols $h_{iS}$ and $h_{iL}$ show respectively a height of starting point and a height of ending point. The symbol $m_{i1d}$ represents an amount of deviation of each ring-shaped zone in the optical axis direction, and its sign is "−" when the ring-shaped zone is shifted toward the laser light source side for the first ring-shaped zone (i=1), and its sign is "+" when the ring-shaped zone is shifted toward the optical disk side for the first ring-shaped zone (i=1). For example, the second ring-shaped zone (i=2) is shifted toward the laser light source side for the first ring-shaped zone by an amount of 0.003571 mm, and the fourth ring-shaped zone (i=4) is shifted toward the optical disk side by an amount of 0.003571 mm for the first ring-shaped zone.

Besides, in the present example, the displacement of each ring-shaped zone along to the optical axis $m_{i1}d$ shows the displacement of an intersection of an extended line of the i-th aspherical surface and the optical axis from an intersection of an extended line of the first aspherical surface and the optical axis, as shown in FIG. 15.

FIG. 16 is a graph showing wavefront aberration for wavelength $\lambda_1$+5 (nm) (=410 nm) under the assumption that the optical path difference providing structure PST is not formed in the present example, while, FIG. 17 is a graph showing wavefront aberration for wavelength $\lambda_1$+5 (nm) (=410 nm) in the present example. The diffractive structure DOE in the present example has spherical aberration characteristics wherein spherical aberration changes toward the insufficient correction if a wavelength of an incident light flux is shifted to the longer wavelength side, and a third order spherical aberration component of the wavefront aberration shown in FIG. 16 is 0.025 $\lambda$RMS ($\lambda$=410 nm). In contrast to this, a third order spherical aberration component of the wavefront aberration shown in FIG. 17 is 0.005 $\lambda$RMS ($\lambda$=410 nm), and it is understood that the spherical aberration characteristics of the diffractive structure DOE are canceled properly by the optical path difference providing structure PST having the spherical aberration characteristics wherein spherical aberration changes toward the excessive correction if a wavelength of an incident light flux is shifted to the longer wavelength side.

Table 6 shows RMS values (square root of the sum of squares of spherical aberration components for the ninth order or less) of wavefront aberration for respective wavelengths $\lambda_1$ (nm), $\lambda_1 \pm 5$ (nm), $\lambda_2$ (nm) and $\lambda_2 \pm 5$ (nm) in the present example. From this table, it is understood that the optical element of the present example has an excellent performance for each of a high density optical disk and DVD.

TABLE 6

| High density optical disk application (NA$_1$ = 0.67) | |
|---|---|
| $\lambda_1$ (nm) | 0.003 λRMS |
| $\lambda_1$ + 5 (nm) | 0.006 λRMS |
| $\lambda_1$ − 5 (nm) | 0.012 λRMS |
| DVD application (NA$_2$ = 0.655) | |
| $\lambda_2$ (nm) | 0.009 λRMS |
| $\lambda_2$ + 5 (nm) | 0.007 λRMS |
| $\lambda_2$ − 5 (nm) | 0.012 λRMS |

What is claimed is:

1. An optical element for use in an optical pickup device to conduct reproducing and/or recording information for a first disk including a protective substrate having a thickness $t_1$ by the use of a first light flux having a wavelength $\lambda_1$ (nm) emitted from a first light source and to conduct reproducing and/or recording information for a second disk including a protective substrate having a thickness $t_2$ ($t_2 \geq t_1$) by the use of a second light flux having a wavelength $\lambda_2$ ($\lambda_2 > \lambda_1$) (nm) emitted from a second light source, the optical element comprising:

an optical surface on which a first phase structure is formed to have a function to correct a spherical aberration caused by a difference in thickness of the protective substrate between the first optical disk and the second optical disk or a function to correct a spherical aberration caused by a difference in wavelength between the first light flux and the second light flux;

an optical surface on which a second phase structure is formed such that when the wavelength of the first light flux changes, the second phase structure generates a spherical aberration in a direction reverse to the direction of a spherical aberration generated by the first phase structure, wherein the first phase structure is a diffractive structure that generates $n_1^{th}$ order diffracted ray as a diffracted ray having the maximum diffraction efficiency when the first light flux comes in and generates $n_2^{th}$ order diffracted ray ($|n_1| \geq |n_2|$) as a diffracted ray having the maximum diffraction efficiency when the second light flux comes in, wherein when $N_1$ and $N_2$ are refractive indexes of the optical element for the first light flux having a wavelength $\lambda_1$ and the second light flux having a wavelength $\lambda_2$ respectively and INT(X) is an integer closest to X, the following formulas are satisfied:

$$\text{INT}(\delta\phi_D) - \delta\phi_D < 0$$

$$\delta\phi_D = \{n_1 \times \lambda_1/(N_1-1)\}/\{n_2 \times \lambda_2/N_2-1)\}, \text{ and}$$

wherein the first phase structure has a spherical aberration characteristic such that when the wavelength of an incident light of flux shifts to a longer wavelength side, a spherical aberration changes to be over corrected.

2. The optical element of claim 1, wherein the second phase structure is an optical path difference providing structure including a plurality of ring-shaped zones divided with stepped sections each formed in an optical axis direction.

3. The optical element of claim 1, wherein when the wavelength of the first light flux changes within a range of ($\lambda_1-5$) (nm) to ($\lambda_1+5$) (nm), the second phase structure has a function to generate a spherical aberration in a direction reverse to the direction of a spherical aberration generated by the first phase structure.

4. The optical element of claim 1, wherein a manufacturing wavelength $\lambda_B$ for the first phase structure satisfies the following formula:

$$\lambda_B < \lambda_1.$$

5. The optical element of claim 1, wherein the second phase structure has a spherical aberration characteristic such that when the wavelength of the first light flux shifts to a longer wavelength side within a range of ($\lambda_1-5$) (nm) to ($\lambda_1+5$) (nm), a spherical aberration changes to be under corrected.

6. The optical element of claim 5, wherein the second phase structure does not provide an optical path difference for the first light flux having a wavelength $\lambda_1$ and provides an optical path difference for the first light flux having a wavelength ($\lambda_1+5$) (nm) and the first light flux having a wavelength ($\lambda_1-5$) (nm).

7. The optical element of claim 1, wherein a manufacturing wavelength $\lambda_B$ for the first phase structure satisfies the following formula:

$$\lambda_1 < \lambda_B < \lambda_2.$$

8. The optical element of claim 1, wherein the first phase structure is formed on an aspherical surface formed such that as the position of an optical path on the aspherical surface is distant more from the optical axis, the length of the optical path becomes longer.

9. The optical element of claim 1, wherein when an added amount of an optical path length by the first phase structure is defined by the following formula with optical path difference function coefficients $B_2, B_4, B_6, B_8, B_{10} \ldots$, and a diffraction order n:

$$\phi_b = n \times (B_2 h^2 + B_4 h^4 + B_6 h^6 + B_8 h^8 + B_{10} h^{10} + \ldots)$$

where $B_2$ and $B_4$ have a different sign from each other and h is a height.

10. The optical element of claim 1, wherein on the optical surface on which the first phase structure is formed, the first phase structure is formed within at least a range of 0% to 70% of the maximum effective diameter of the optical surface and the first phase structure is not formed within at least a range of 85% to 100% of the maximum effective diameter.

11. The optical element of claim 1, wherein on the optical surface on which the second phase structure is formed, the second phase structure is formed within at least a range of 0% to 70% of the maximum effective diameter of the optical surface and the second phase structure is not formed within at least a range of 85% to 100% of the maximum effective diameter.

12. The optical element of claim 1, wherein the following formulas are satisfied:

$$|\lambda_2 - \lambda_1| > 50 \text{ nm and } |n_1| > |n_2|.$$

13. The optical element of claim 12, wherein $\lambda_1$ is within a range of 350 nm to 450 nm, $\lambda_2$ is within a range of 600 nm to 700 nm, and a combination ($n_1, n_2$) of $n_1$ and $n_2$ satisfies the following formula:

$$(n_1, n_2) = (2, 1), (3, 2), (5, 3), (8, 5) \text{ or } (10, 6).$$

14. The optical element of claim 13, wherein the optical element is made of a material whose refractive index for the first light flux having a wavelength $\lambda_1$ is within a range of 1.5 to 1.6 and Abbe constant for d-line (587.6 nm) is within a range of 50 to 60 and the diffractive structure includes a predetermined number of ring-shaped zones divided with stepped sections each formed in an optical axis direction, and a stepped section $\Delta_D$ (μm) closest to the optical axis among the stepped sections satisfies one of the following formulas:

$1.25 < \Delta_D < 1.65$ $2.05 < \Delta_D < 2.55$ $3.40 < \Delta_D < 4.10$ $5.70 < \Delta_D < 6.45$ $7.00 < \Delta_D < 8.00$.

15. The optical element of claim 1, wherein the first phase structure generates a $n_3^{th}$ order diffracted ray ($|n_2| \geq |n_3|$) when a third light flux having a wavelength $\lambda_3$ ($\lambda_3 > \lambda_2$) (nm) comes in.

16. The optical element of claim 15, wherein $\lambda_1$ is within a range of 350 nm to 450 nm, $\lambda_2$ is within a range of 600 nm to 700 nm, $\lambda_3$ is within a range of 700 nm to 850 nm, and a combination ($n_1$, $n_2$, $n_3$) of $n_1$, $n_2$ and $n_3$ satisfies the following formula:

($n_1$, $n_2$, $n_3$)=(2, 1, 1), (8, 5, 4), or (10, 6, 5).

17. The optical element of claim 16, wherein the optical element is made of a material whose refractive index for the first light flux having a wavelength $\lambda_1$ is within a range of 1.5 to 1.6 and Abbe constant for d-line (587.6 nm) is within a range of 50 to 60 and the diffractive structure includes a predetermined number of ring-shaped zones divided with stepped sections each formed in an optical axis direction, and a stepped section $\Delta_D$ (μm) closest to the optical axis among the stepped sections satisfies one of the following formulas:

$1.25 < \Delta_D < 1.65$ $5.70 < \Delta_D < 6.45$ $7.00 < \Delta_D < 8.00$.

18. The optical element of claim 15, wherein the second phase structure is an optical path difference providing structure including a plurality of ring-shaped zones divided with stepped sections each formed in an optical axis direction, and when $\Delta_p$ (μm) is a stepped section closest to the optical axis among the stepped sections in the second phase structure, $N_1$, $N_2$ and $N_3$ are refractive indexes of the optical element for the first light flux having a wavelength $\lambda_1$, the second light flux having a wavelength $\lambda_2$ and the third light flux having a wavelength $\lambda_3$ respectively and INT (X) is an integer closest to X, the following formula satisfies the following formulas:

$0 \leq |INT(\phi_{1P}) - \phi_{1P}| \leq 0.4$ $0 \leq |INT(\phi_{2P}) - \phi_{2P}| \leq 0.4$ $0 \leq |INT(\phi_{3P}) - \phi_{3P}| \leq 0.4$ $\phi_{1P} = \Delta_P \times (N_1 - 1)/(\lambda_1 \times 10^{-3})$ $\phi_{2P} = \Delta_P \times (N_2 - 1)/(\lambda_2 \times 10^{-3})$ $\phi_{3P} = \Delta_P \times (N_3 - 1)/(\lambda_3 \times 10^{-3})$.

19. The optical element of claim 18, wherein when $\lambda_1$ is within a range of 350 nm to 450 nm, $\lambda_2$ is within a range of 600 nm to 700 nm, $\lambda_3$ is within a range of 700 nm to 850 nm, the optical element is made of a material whose refractive index for the first light flux having a wavelength $\lambda_1$ is within a range of 1.5 to 1.6 and Abbe constant for d-line (587.6 nm) is within a range of 50 to 60 and p is a positive integer, the following formulas are satisfied:

$INT(\phi_{1P}) = 10p$ $INT(\phi_{2P}) = 6p$ $INT(\phi_{3P}) = 5p$.

20. The optical element of claim 1, wherein the optical element is a plastic lens.

21. The optical element of claim 1, wherein the optical element is a structural element of an objective optical system for use in an optical pickup device.

22. The optical element of claim 21, wherein the objective optical system comprises an aberration correcting element and a light converging element to converge a light flux emitted from the aberration correcting element on an information recording surface of an optical disk.

23. An optical pickup device to conduct reproducing and/or recording information for a first disk including a protective substrate having a thickness $t_1$ by the use of a first light flux having a wavelength $\lambda_1$ (nm) emitted from a first light source and to conduct reproducing and/or recording information for a second disk including a protective substrate having a thickness $t_2$ ($t_2 \geq t_1$) by the use of a second light flux having a wavelength $\lambda_2$ ($\lambda_2 > \lambda_1$) (nm) emitted from a second light source, the optical pickup device comprises the optical element described in claim 1.

24. The optical pickup device of claim 23, wherein the optical pickup device further conducts reproducing and/or recording information for a third disk including a protective substrate having a thickness $t_3$ ($t_3 \geq t_2$) by the use of a third light flux having a wavelength $\lambda_3$ ($\lambda_3 > \lambda_2$) (nm) emitted from a third light source, and the third light flux comes in the optical element on a state of a divergent light flux.

25. An optical information recording reproducing apparatus, comprising:
the optical pickup device described in claim 23 so as to conduct at least one of recording information for an optical disk and reproducing information for an optical disk.

26. An optical element for use in an optical pickup device to conduct reproducing and/or recording information for a first disk including a protective substrate having a thickness $t_1$ by the use of a first light flux having a wavelength $\lambda_1$ (nm) emitted from a first light source and to conduct reproducing and/or recording information for a second disk including a protective substrate having a thickness $t_2$ ($t_2 \geq t_1$) by the use of a second light flux having a wavelength $\lambda_2$ ($\lambda_2 > \lambda_1$) (nm) emitted from a second light source, the optical element comprising:
an optical surface on which a diffractive structure is formed to generate $n_1^{th}$ order diffracted ray as a diffracted ray having the maximum diffraction efficiency when the first light flux comes in and to generate $n_2^{th}$ order diffracted ray ($|n_1| \geq |n_2|$) as a diffracted ray having the maximum diffraction efficiency when the second light flux comes in; and
an optical surface on which an optical path difference providing structure including a plurality of ring-shaped zones divided with stepped sections each formed in an optical axis direction is formed;
wherein when the wavelength of the first light flux changes within a range of ($\lambda_1$−5) (nm) to ($\lambda_1$+5) (nm), the optical path difference providing structure has a function to generate a spherical aberration in a direction reverse to the direction of a spherical aberration generated by the diffractive structure, wherein when $N_1$ and $N_2$ are refractive indexes of the optical element for the first light flux having a wavelength $\lambda_1$ and the second light flux having a wavelength $\lambda_2$ respectively and INT (X) is an integer closest to X, the following formulas are satisfied:

$$INT(\delta\phi_D) - \delta\phi_D < 0$$

$$\delta\phi_D = \{n_1 \times \lambda_1/(N_1-1)\}/\{n_2 \times \lambda_2/N_2-1)\}, \text{ and}$$

wherein the diffractive structure has a spherical aberration characteristic such that when the wavelength of an incident light flux shifts to a longer wavelength side, a spherical aberration changes to be over corrected.

27. The optical element of claim 26, wherein the diffractive structure includes a plurality of ring-shaped zones divided with stepped sections each formed in an optical axis direction and when $\Delta_D$ (µm) is a stepped section closest to the optical axis among the stepped sections, a manufacturing wavelength is $\lambda_B$ (nm) ($\lambda_B < \lambda_1$), $N_B$ is a refractive index of the optical element for the manufacturing wavelength $\lambda_B$, the following formula is satisfied:

$$\Delta_D = n_1 \cdot \lambda_B \times 10^{-3}/(N_B-1).$$

28. The optical element of claim 26, wherein the diffractive structure has a spherical aberration characteristic such that when the wavelength of the first light flux shifts to a longer wavelength side within a range of $(\lambda_1-5)$ (nm) to $(\lambda_1+5)$ (nm), a spherical aberration changes to be under corrected.

29. The optical element of claim 26, wherein the optical path difference providing structure is formed on an aspherical surface formed such that as the position of an optical path on the aspherical surface is distant more from the optical axis, the length of the optical path becomes longer.

30. The optical element of claim 26, wherein on the optical surface on which the optical path difference providing structure is formed, the diffractive structure is formed within at least a range of 0% to 70% of the maximum effective diameter of the optical surface and the diffractive structure is not formed within at least a range of 85% to 100% of the maximum effective diameter.

31. The optical element of claim 26, wherein the optical element is made of a material whose refractive index for the first light flux having a wavelength $\lambda_1$ is within a range of 1.5 to 1.6 and Abbe constant for d-line (587.6 nm) is within a range of 50 to 60 and the diffractive structure includes a predetermined number of ring-shaped zones divided with stepped sections each formed in an optical axis direction, and a stepped section $\Delta_D$ (µm) closest to the optical axis among the stepped sections satisfies one of the following formulas:

$$1.25 < \Delta_D < 1.65$$

$$2.05 < \Delta_D < 2.55$$

$$3.40 < \Delta_D < 4.10$$

$$5.70 < \Delta_D < 6.45$$

$$7.00 < \Delta_D < 8.00.$$

32. The optical element of claim 26, wherein the diffractive structure generates a $n_3^{th}$ order diffracted ray ($|n_2| \geq |n_3|$) when a third light flux having a wavelength $\lambda_3$ ($\lambda_3 > \lambda_2$) (nm) comes in.

33. The optical element of claim 32, wherein $\lambda_1$ is within a range of 350 nm to 450 nm, $\lambda_2$ is within a range of 600 nm to 700 nm, $\lambda_3$ is within a range of 700 nm to 850 nm, and a combination $(n_1, n_2, n_3)$ of $n_1$, $n_2$ and $n_3$ satisfies the following formula:

$$(n_1, n_2, n_3) = (2, 1, 1), (8, 5, 4), \text{ or } (10, 6, 5).$$

34. The optical element of claim 33, wherein the optical element is made of a material whose refractive index for the first light flux having a wavelength $\lambda_1$ is within a range of 1.5 to 1.6 and Abbe constant for d-line (587.6 nm) is within a range of 50 to 60 and the diffractive structure includes a predetermined number of ring-shaped zones divided with stepped sections each formed in an optical axis direction, and a stepped section $\Delta_D$ (µm) closest to the optical axis among the stepped sections satisfies one of the following formulas:

$$1.25 < \Delta_D < 1.65$$

$$5.70 < \Delta_D < 6.45$$

$$7.00 < \Delta_D < 8.00.$$

35. The optical element of claim 32, wherein when $\Delta_p$ (µm) is a stepped section closest to the optical axis among the stepped sections in the optical path difference providing structure, $N_1$, $N_2$ and $N_3$ are refractive indexes of the optical element for the first light flux having a wavelength $\lambda_1$, the second light flux having a wavelength $\lambda_2$ and the third light flux having a wavelength $\lambda_3$ respectively and INT(X) is an integer closest to X, the following formula satisfies the following formulas:

$$0 \leq |INT(\phi_{1P}) - \phi_{1P}| \leq 0.4$$

$$0 \leq |INT(\phi_{2P}) - \phi_{2P}| \leq 0.4$$

$$0 \leq |INT(\phi_{3P}) - \phi_{3P}| \leq 0.4$$

$$\phi_{1P} = \Delta_P \times (N_1-1)/(\lambda_1 \times 10^{-3})$$

$$\phi_{2P} = \Delta_P \times (N_2-1)/(\lambda_2 \times 10^{-3})$$

$$\phi_{3P} = \Delta_P \times (N_3-1)/(\lambda_3 \times 10^{-3}).$$

36. The optical element of claim 35, wherein when $\lambda_1$ is within a range of 350 nm to 450 nm, $\lambda_2$ is within a range of 600 nm to 700 nm, $\lambda_3$ is within a range of 700 nm to 850 nm, the optical element is made of a material whose refractive index for the first light flux having a wavelength $\lambda_1$ is within a range of 1.5 to 1.6 and Abbe constant for d-line (587.6 nm) is within a range of 50 to 60 and p is a positive integer, the following formulas are satisfied:

$$INT(\phi_{1P}) = 10p$$

$$INT(\phi_{2P}) = 6p$$

$$INT(\phi_{3P}) = 5p.$$

37. The optical element of claim 26, wherein the optical element is a plastic lens.

38. An optical pickup device to conduct reproducing and/or recording information for a first disk including a protective substrate having a thickness $t_1$ by the use of a first light flux having a wavelength $\lambda_1$ (nm) emitted from a first light source, to conduct reproducing and/or recording information for a second disk including a protective substrate having a thickness $t_2$ ($t_2 \geq t_1$) by the use of a second light flux having a wavelength $\lambda_2$ ($\lambda_2 > \lambda_1$) (nm) emitted from a second light source, and to conduct reproducing and/or recording information for a third disk including a protective substrate having a thickness $t_3$ ($t_3 \geq t_2$) by the use of a third light flux having a wavelength $\lambda_3$ ($\lambda_3 > \lambda_2$) (nm) emitted from a third light source, the optical pickup device comprises the optical element described in claim 26 and the third light flux comes in the optical element on a state of a divergent light flux.

39. The optical element of claim 26, wherein the optical element comprises a first optical surface which is the optical surface on which the diffractive structure is formed, and a second optical surface which is the optical surface on which the optical path difference providing structure is formed.

40. An optical element for use in an optical pickup device to conduct reproducing and/or recording information for a first disk including a protective substrate having a thickness $t_1$ by the use of a first light flux having a wavelength $\lambda_1$ (nm) emitted from a first light source and to conduct reproducing and/or recording information for a second disk including a protective substrate having a thickness $t_2$ ($t_2 \geq t_1$) by the use of a second light flux having a wavelength $\lambda_2$ ($\lambda_2 > \lambda_1$) (nm) emitted from a second light source, the optical element comprising:

an optical surface on which a first phase structure is formed to have a function to correct a spherical aberration caused by a difference in thickness of the protective substrate between the first optical disk and the second optical disk or a function to correct a spherical aberration caused by a difference in wavelength between the first light flux and the second light flux;

an optical surface on which a second phase structure is formed such that when the wavelength of the first light flux changes, the second phase structure generates a spherical aberration in a direction reverse to the direction of a spherical aberration generated by the first phase structure, wherein on the optical surface on which the second phase structure is formed, the second phase structure is formed within at least a range of 0% to 70% of the maximum effective diameter of the optical surface and the second phase structure is not formed within at least a range of 85% to 100% of the maximum effective diameter.

* * * * *